US005157782A

United States Patent [19]

Tuttle et al.

[11] Patent Number: 5,157,782

[45] Date of Patent: Oct. 20, 1992

[54] SYSTEM AND METHOD FOR TESTING COMPUTER HARDWARE AND SOFTWARE

[75] Inventors: Myron R. Tuttle, Santa Clara; Danny Low, Mountain View, both of Calif.

[73] Assignee: Hewlett-Packard Company, Palo Alto, Calif.

[21] Appl. No.: 472,697

[22] Filed: Jan. 31, 1990

[51] Int. Cl.[5] .............. G06F 11/00

[52] U.S. Cl. .............. 395/575; 371/67.1; 371/22.4; 371/25.1

[58] Field of Search ... 364/200 MS File, 900 MS File; 371/67.1, 22.4, 25.1, 24, 71, 19, 15.1; 340/715

[56] References Cited

U.S. PATENT DOCUMENTS

| | | | |
|---|---|---|---|
| 4,312,066 | 1/1982 | Bantz | 364/200 X |
| 4,636,940 | 1/1987 | Goodwin | 371/19 X |
| 5,022,028 | 6/1991 | Edmonds | 371/19 |
| 5,045,994 | 9/1991 | Belfer | 364/200 |
| 5,047,926 | 9/1991 | Kuo | 364/200 |

OTHER PUBLICATIONS

"The Atron Evaluator." DADRE Technologies, Inc. 1989.

"Advanced Test System (ATS) For Software Test", IBM TAB, vol. 30, No. 9, Feb. 1988, pp. 134–137.

"Automated Video Test Card With Self-Test Machines", vol. 32, No. 5B, Oct. 1989, pp. 257–263.

*Primary Examiner*—Stephen M. Baker
*Assistant Examiner*—Ly V. Hua
*Attorney, Agent, or Firm*—Roland I. Griffin; Alan H. Haggard

[57] ABSTRACT

A computer related system and method uses regression testing techniques for testing computer hardware and/or software application(s). Input data and commands from a user are stored on a host, and sent to an interface device, which then sends them to a hardware/software system under test. Visual display data on a visual display device is thereby affected. Signatures (representative of the visual display data) are generated by the interface device as a result of input data and commands sent to the interface device and system under test. These signatures are received and stored by the host. On command of a user, the stored signatures, input data and commands are subsequently sent to the hardware/software system under test, and new signatures are generated. These new signatures are compared with the stored signatures, and the results of this comparison are used as an indication that the hardware/software system under test is performing as expected.

46 Claims, 31 Drawing Sheets

SYSTEM AND METHOD FOR TESTING COMPUTER HARDWARE AND SOFTWARE

This application relates to U.S. patent application Ser. No. 07/472,694, filed Jan. 31, 1991, entitled. "Software Modules For Testing Computer Hardware And Software" and U.S. patent application Ser. No. 07/472,689, filed Jan. 31, 1991 entitled "Visual Display Signal Processing System And Method" which are incorporated by reference herein.

BACKGROUND TO THE INVENTION

1. Field of the Invention

The present invention relates to a non-intrusive system for testing computer hardware and/or software, and specifically relates to the use of an automated form of testing known as regression testing.

2. Related Art

Computer-related regression testing systems used for testing hardware and/or software applications exist which can receive a series of test steps (input data) such as keystrokes and pointer movements recognized by the software application. Upon receipt of the input data, these systems have the ability to store the input data (into files called test scripts), and to replay them such that the software application functions as though a user were actually entering the input data into the software application. In this way, large amounts of input data can be repeatedly fed into the software application, with a user having only to create a test script by entering the input data only once.

By using such a system, a software application can be executed using a prepared test script, so as to verify that subsequent versions of the software application perform as expected. This can be accomplished by comparing previously stored (or known) results obtained from executing a software application, with results subsequently obtained by replaying the test script through a software application being tested. The fact that the software application being tested performs as expected can also be used as an indication that the hardware on which the software application runs is performing as expected. This ability to repeatedly enter previously stored input data into a software application and compare newly acquired results to some previously stored results is the essence of automated regression testing.

The purpose of regression testing can be better understood through the following explanation. In general, when a software application is normally executed on a computer system, a user enters input data into a computer in order for the user to manipulate the software application in a desired way. For example, in a text editor, the input data typically consists of text, and perhaps certain keystrokes having functions which cause text to be underlined or cause a change in the margins of the text. The object of automated regression testing is to allow a user to enter such input data only once. Thus, this input data is recorded, and can subsequently be played back on the software application over and over again, as if a user were actually entering the input data each time. Certain results or data obtained during the original recording phase are then compared against results or data obtained during a subsequent playback. Again, the purpose to playing back this input data is that different versions of the software application(s) and various hardware components can be tested against the same input data.

From the above, it can be appreciated that regression testing systems have important functions in the software development industry, where during the process of developing a software application, it is often desirable to run each new version of the software application through a long series of test steps. In addition, in the production of computer hardware, it is often desirable to test each manufactured unit by running a software application on the hardware through a series of steps. Manual entry of these steps was traditionally used, but was soon found to be ill-suited for performing regression testing because it was very time intensive, error-prone, and extremely inadequate for production testing or development purposes. In addition, an ability to make performance measurements and compatibility comparisons of the software application in real-time was also desired.

One system for automating the regression testing process was a system jointly developed by Hewlett Packard and Telamon Corporation of Oakland, Calif. This system provides automatic capture of test scripts in the form of keystrokes on a keyboard, movements of a mouse, etc. Automatic playback is provided to replay these test scripts, and this system replays the test scripts as captured on the test application. Automan then compares the data passed from the computer to the terminal, and checks it against the originally input data. However, Automan does not perform comparisons of the screen display. This is not sufficient, since it is still possible for the data to be typed in correctly, but for the screen output to be incorrect.

Some of these earlier systems were fixed pacing systems, which meant that the input data was sent to the software application at a fixed interval, rather than determining when the application was ready to retrieve the next step. Fixed pacing systems such as these were undesirable however, for several reasons. First, it may be important in many instances that each step of the input data reach the software application at the appropriate time (i.e. it is not enough to merely buffer the input data). Second, since feedback from the software application is not being gathered during fixed interval testing, performance measurements of the hardware running the software application cannot be measured.

In addition to the above-mentioned systems, attempts at applying software patches or modifying the software application itself to create performance measurement data were unsuccessful, since this changed the normal behavior of the software application in unpredictable ways. These behavior changes often prohibited accurate performance measurements of the application software.

SUMMARY OF THE INVENTION

The deficiencies of the above-noted conventional systems and methods led the inventors to invent an automated regression testing system and method which overcomes the following obstacles:

1. A full screen of display memory can be from 4K bytes for an alpha numeric display, to over 8M bytes for a high resolution color graphics display. This had been found to be a burdensome amount of memory to do comparisons with.

2. A display having more than one valid state (e.g., text and graphics) may often be between states at the time that the display memory is captured. Transferring, storing, and checking for such transitory states resulted in a large waste of time.

3. If captured display data is transferred to a separate machine from the one being tested (e.g., via serial port connections), transfer of data detrimentally affected the speed of the hardware executing the software application(s).

4. In general, regression testing software needed to be written to coexist with the software application(s) being tested and not to interfere with its normal operation in order to be non-intrusive.

5. Data transfer time and comparison time destroy the real time operation of the program being tested.

6. If several different visual display devices are to be tested in conjunction with hardware at different times, several sets of test scripts must be maintained. Updating and managing these test scripts is very time consuming and difficult to automate.

7. The test scripts should be portable. (The intent of this objective is to be able to port test scripts to various operating systems).

The present invention is a system and method for testing hardware and/or a software application(s) residing thereon. The present invention comprises a System Under Test (SUT), a Host, and an interface connecting the Host to the SUT. The Host itself comprises a Host computer, regression testing software running thereon, and a plurality of input devices. The SUT comprises an SUT computer, at least one software application running thereon, and a visual display device. A Digital Video Signal Processing Unit (DVPU) serves, in part, as the interface between the Host and the SUT. The SUT can also include a visual display screen.

During operation of the present invention, the user records input data into the software modules via one or more input devices attached to the Host computer. As the user inputs the input data, the input data is recorded and stored on the Host, and is simultaneously sent to the DVPU. The DVPU then sends the input data to the software application(s) residing on the SUT computer, which in turn sends corresponding signals to the visual display device.

At the command of the user, the DVPU can capture visual display signals from the visual display device. The visual display signals, or representations thereof, are then transferred to the host, and stored therein.

After the input data and visual display signals are stored on the host, the present invention allows the input data to be played back on the software application(s). At the command of the user, the stored input data is sent to the DVPU. As before, the DVPU then sends the input data to the software application(s). This causes the visual display device to generate new visual display signals, which are captured by the DVPU. The DVPU then compares the new visual display signals with those stored on the host, and sends to the host a signal indicating identity between the two signals.

BRIEF DESCRIPTION OF THE DRAWINGS

Various objects, features, and attendant advantages of the present invention can be more fully appreciated as the same become better understood with reference to the following detailed description of the present invention when considered in connection on with the accompanying drawings, in which.

DETAILED DESCRIPTION OF THE PREFERRED EMBODIMENTS

Table of Contents

I. GENERAL OVERVIEW
II. HARDWARE AND FIRMWARE
A. GENERAL OVERVIEW OF THE HARDWARE AND FIRMWARE
1. The Role of the DVPU
2. Implementation of the DVPU
a. The Digital Video Processing Unit (DVPU)
(1) Micro-controller Sub-system (SMP)
(2) Video Signature Analyzer Sub-system (VSA)
(3) Keyboard/HP-HIL Sub-system (KHE)
(4) System under Test Interface Port (SIF)
B. DETAILED DESCRIPTION OF THE SYSTEM
1. Microcontroller Sub-system (SMP)
a. Hardware
b. SMP Firmware
2. Video Signature Analyzer (VSA)
a. VSA Hardware
b. VSA Firmware
c. VSA Operation
3. The Keyboard/HP-HIL Emulator (KHE)
a. Hardware
b. Communication
4. The System Under Test Interface Port (SIF)
a. SIF Hardware
b. SIF Firmware
III. THE SYSTEM UNDER TEST
IV. VIDEO ADAPTER-DVPU INTERFACE
V. INPUT DEVICE-DVPU INTERFACE
VI. DVPU-HOST INTERFACE
VII. THE HOST
A. GENERAL OVERVIEW OF THE HOST
B. ARCHITECTURAL OVERVIEW
C. ARCHITECTURE IN MORE SPECIFIC DETAIL

I. General Overview

The present invention is a system and method for testing hardware and/or a software application(s) residing thereon. This combination of hardware and software application(s) is called the System Under Test (SUT). More specifically, the present invention relates to a system and method which utilizes regression testing techniques to test hardware and/or software application(s) running thereon. In a preferred embodiment, the present invention comprises the SUT, a Host, and an interface connecting the Host to the SUT.

Figure 1:
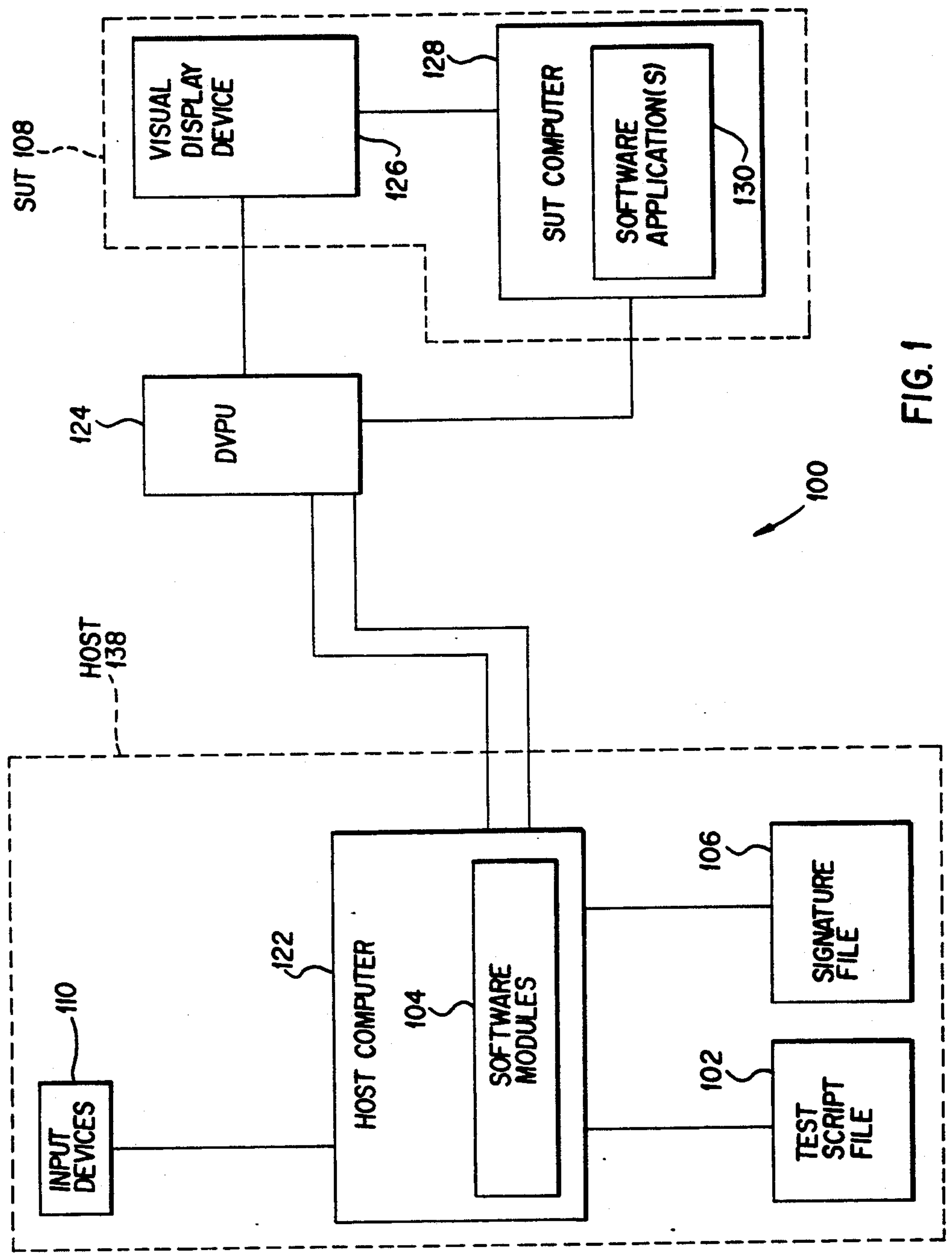
FIG. 1 is a high-level block diagram of the present invention.

Referring to a preferred embodiment as shown in FIG. 1, the Host 138 comprises a Host computer 122, regression testing software (which is comprised of software modules 104) running thereon, and a plurality of input devices 110. The SUT 108 comprises a SUT computer 128, at least one software application running thereon, and a visual display device 126. A Digital Video Signal Processing Unit (DVPU) 124 serves, in part, as an interface device between the Host 138 and the SUT 108. The SUT 108 can also include a visual display screen (not shown). In a preferred embodiment, the Host computer 122 and the SUT computer 128 are controlled by separate operating systems.

During operation of a preferred embodiment, the user (not shown) records input data into the software modules 104 via one or more input devices 110 attached to the Host computer 122. As the user inputs the input data, the input data is recorded and stored on the Host 138, and is simultaneously sent to the DVPU 124. The DVPU 124 then sends the input data to the software application(s) 130 residing on the SUT computer 128. This causes the visual display device 126 to generate visual display signals.

At the command of a user, the DVPU 124 captures the visual display signals generated from the visual display device 126. These visual display signals are signals which could be used as input for a visual display screen, and are representative of visual display data residing in the visual display device 126. Thus, the visual display signals are representative of a visual image.

Once captured, the visual display signals (or a representation thereof) are directed to the software modules 104 on the Host 138. The software modules 104 then record these visual display signals.

Once the input data and visual display signals are recorded, the present invention allows the input data to be played back on the software application(s) 130. At the command of the user, the stored input data is sent by the software modules 104 to the DVPU 124. The DVPU 124 again sends the input data to the software application(s) 130. This causes the visual display device 126 to generate new visual display signals, which are captured by the DVPU 124.

At those points during playback which correspond to the original command to capture visual display data, the software modules 104 send the DVPU 124 the previously stored visual display signals, and the DVPU 124 then captures new visual display signals from the visual display device 126. The previously stored visual display signals are compared by the DVPU 124 to the newly captured visual display signals. If these signals do not match, then the DVPU 124 sends an indication to the software modules 104 on the Host 138 that an error has occurred. This error is an indication that the software application(s) 130 and/or hardware of the SUT 108 is not functioning properly. Thus, in the present invention, it is the comparison of visual display signals (or representations thereof) which are used to verify that a subsequent replay of input data causes the constituent parts of the SUT 108 to react the same way as when the input data was originally input to the SUT 108.

As indicated above, the present invention includes a record mode and a playback mode. These modes are discussed in greater detail below. The present invention also includes a regeneration mode, which is also discussed below.

Figure 2:
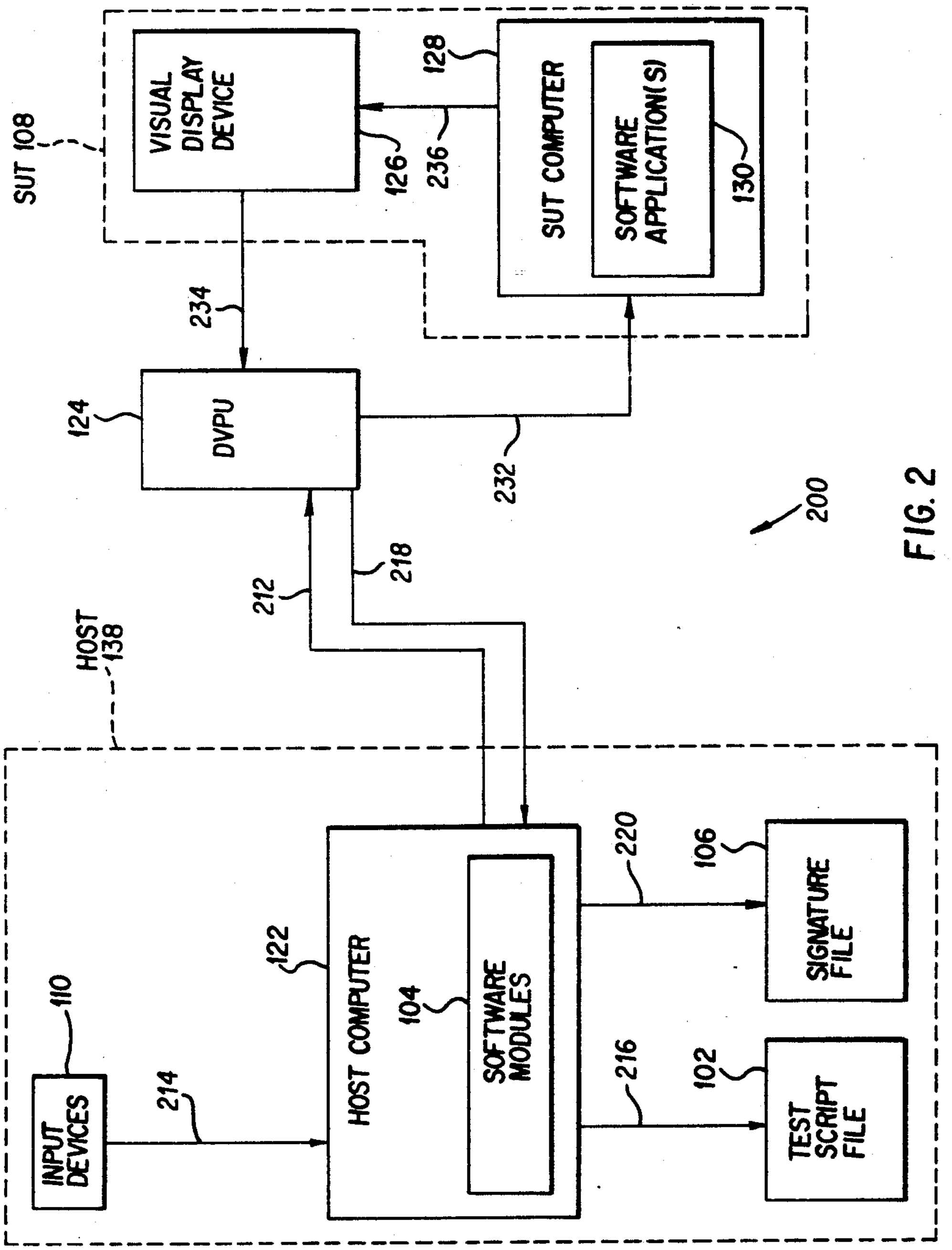
FIG. 2 is a high-level block diagram of the present invention, in Record Mode.
Figure 21:
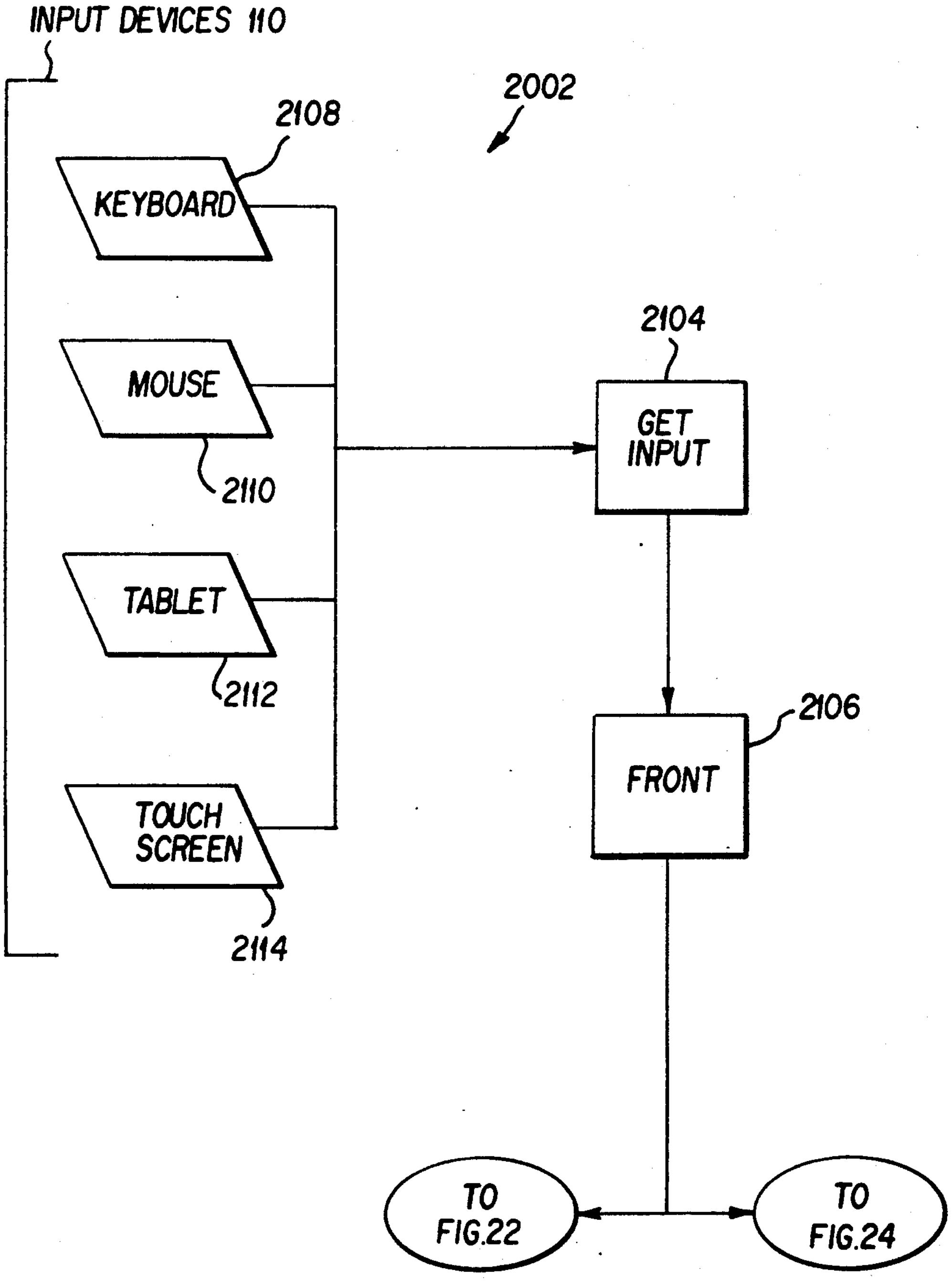
FIG. 21 is a block diagram of the input collection module 2002.

The basic operation of the record mode, especially regarding the flow of data, is shown in FIG. 2. In the record mode 200, a user inputs the input data into the software modules 104 using one or more input devices 110 (for example, a keyboard 2108 or a pointing device 2110, as shown in FIG. 21). As is shown in FIG. 2, the input data travels from the input devices 110 to the software modules 104 on the Host computer 122 via path 214. In addition to input data, special DVPU/Host commands and comments can also be entered via the input devices 110. The combination including input data, DVPU/Host commands, and comments are referred to herein as composite data. The DVPU/Host commands are commands which are directed at controlling the DVPU 124 on the SUT 108, or are directed at controlling various aspects of the software modules 104 residing on the host 138.

Once the software modules 104 have received composite data from one of the input devices 110, the composite data is sent to the DVPU 124 (minus any comments) via path 212. Input data received by the DVPU 124 is sent via path 232 to the software application(s) 130 residing on the SUT computer 128. The software applications(s) 130 then execute the steps specified by the input data, and send signals via path 236 to the visual display device 126 to respond appropriately.

In a preferred embodiment, the software application(s) 130 and the visual display device 126 respond to the input data as if it were entered to the SUT computer 128 directly, without first passing through the Host 138 or the DVPU 124. The reason this occurs is that the DVPU 124 emulates the input device which was originally used to enter the input data to the Host 138.

In addition to directing the composite data to the DVPU 124 along path 212, the software modules 104 also cause the composite data to be recorded and stored on the host 138 by directing the composite data along path 216. The stored composite data is referred to as a test script, and is stored in a test script file 102. The test script thus contains a sequence of input data, interspersed with DVPU/Host commands and comments. In a preferred embodiment, the user can designate a name which is to be associated with the test script file 102. In this way, many different test script files 102 can be created.

The most significant of the DVPU/Host commands is the take-signature command. When this command is entered by a user through one of the input devices 110, the command is stored in the test script file 102, and sent to the DVPU 124. The DVPU 124 then captures visual display signals from the visual display device 126 representative of, at that point in time, visual display data residing on the visual display device 126. In a preferred embodiment, the DVPU 124 generates a compact signature based upon the visual display signals, and then sends the signature to the host 138 via path 218. The software modules 104 then store the signatures by directing them along path 220. The file in which the signatures are stored is referred to as a signature file 106. It should be understood that the visual display signals could also be sent to the host 138, without being converted into a signature or other representative form.

Figure 3A:
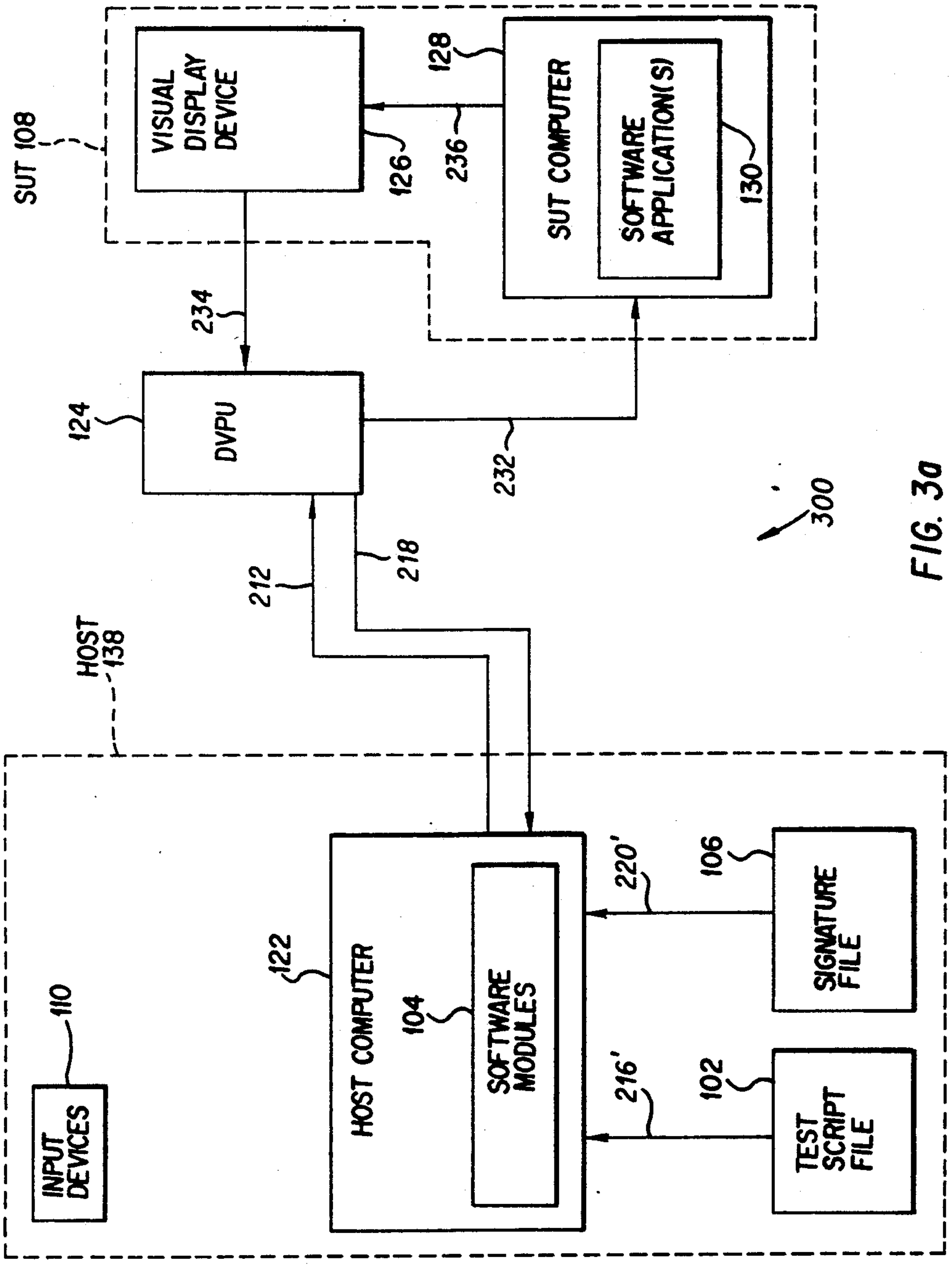
FIG. 3A is a high-level block diagram of the present invention, in Playback Mode.

FIG. 3A shows the basic operation of the Playback Mode 300 of the present invention. Referring to FIG. 3A, the software modules 104 read the stored composite data in the test script file 102 via path 216'. This composite data is then sent to the DVPU 124 via path 212, in the same sequence as originally entered by the user during the recording phase shown in FIG. 2. If all the hardware of the SUT 108 and software application(s) 130 work properly, the new signatures generated during playback mode 300 should match those generated during record mode 200.

More specifically, when a take-signature command is found in the test script file 102, the software modules 104 read the take-signature command in the test script file 102 and the associated stored signatures in the signature file 106 via paths 216' and 220' respectively. The software modules 104 then send a take-signature command and the stored signatures to the DVPU 124 via path 212. In a preferred embodiment, the DVPU 124 then captures a new visual display signals from the visual display device 126, and generate a signature therefrom. The DVPU 124 then compares the new signature with the stored signatures passed by the software modules 104. The DVPU 124 sends back to the software modules 104 via path 218 an indication as to whether the new signature and any of the stored signatures match. If they do not, the user receives an indication that an error has occurred. It should be understood, however, that any number of new signatures could also be compared to any number of stored signatures.

Figure 3B:
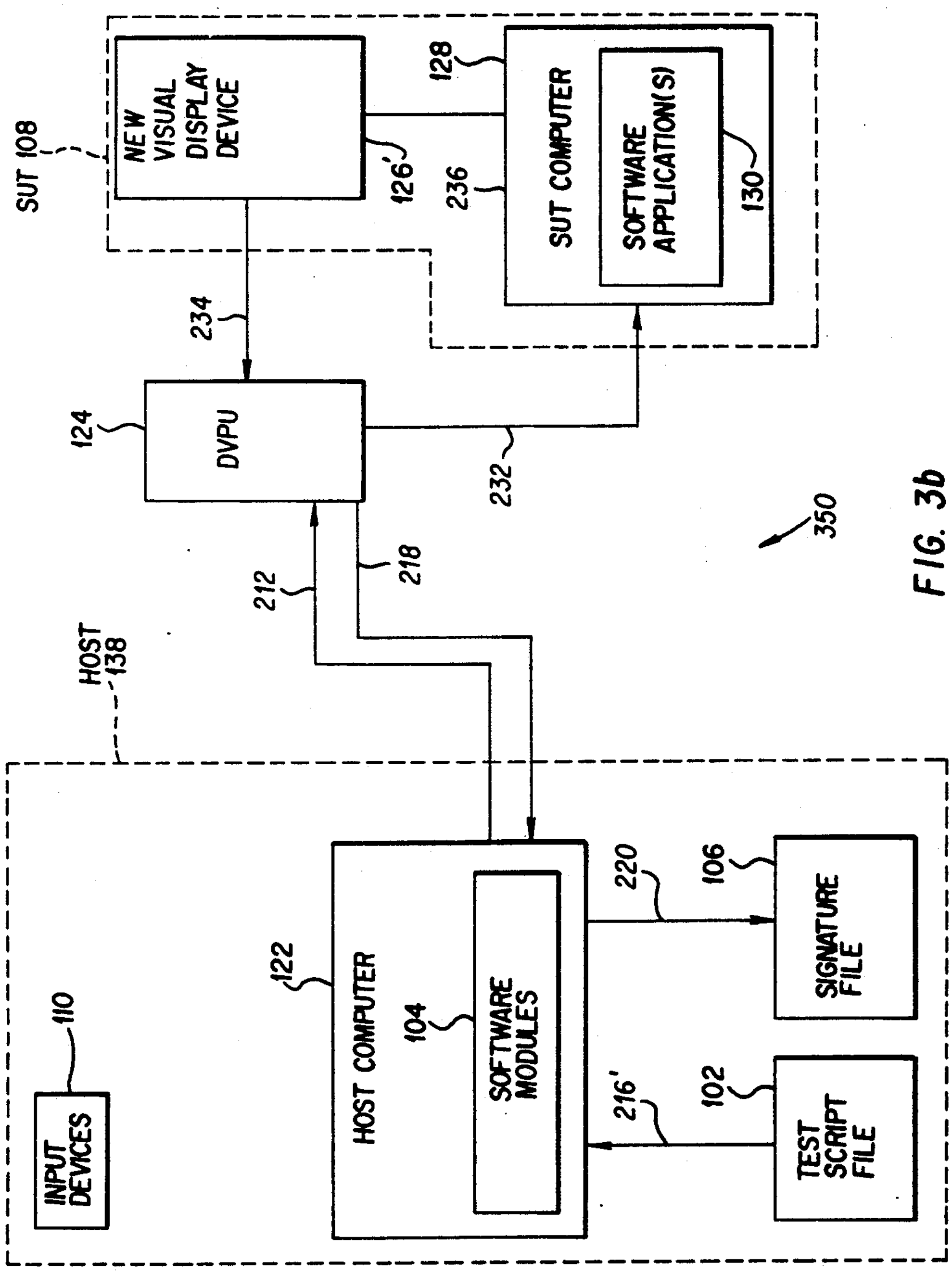
FIG. 3B is a high-level block diagram of the present invention, in Regeneration Mode.

Referring to FIG. 3B, it may be desirable to replay an existing test script and stored signatures using different visual device 126' which generate a different type of visual display signal than that used to create the original signatures. Rather than forcing a user to enter the composite data all over again to create a new signature file 106 for this new visual display device 126', a preferred embodiment of the present invention provides for a regeneration mode 350.

Referring again to FIG. 3B, the regeneration mode 350 acts in a similar manner as the playback mode 300. This is because the composite data from the test script file 102 is sent to the DVPU 124 by the software modules 104 via paths 216' and 212. Further, the input data is sent to the software application(s) 130, which cause the new visual display device 126' to generate new visual display signals. These new visual display signals are then captured by the DVPU 124, and a signature is generated. Unlike the playback mode 300, however, no signatures are sent to the DVPU 124 from the signature file 106, and no signatures are compared by the DVPU. Instead, the DVPU 124 sends the new signatures created by the new visual display device 126' to the software modules 104 via path 218. These new signatures can then either replace or be stored separately from the original signatures, via path 220. The new signatures can then subsequently be used in playback mode 300 in conjunction with the original test script file 102 and new visual display device 126'.

It should be understood that in a preferred embodiment of the present invention, although the composite data may be in a different format while in different paths of the present invention, that it always maintains the same representation throughout. For Example, although the letter "A" may be converted into a symbolic format, it nonetheless maintains its representation as the letter "A." In that sense, consistency is maintained throughout the present invention.

In addition, it should further be understood that the paths disclosed above comprise a preferred embodiment of the present invention, and that the present invention contemplates other path configurations as well.

It should also be noted that the term "SUT" is used consistently throughout the present application as described above, even though various portions of the SUT 108 can be tested. These portions vary with the application of the present invention. For example, the SUT computer 128 can be used to test software application(s) 130, but the SUT computer 128 is not tested. Consequently, software application(s) 130 can be used to test an SUT computer 128, but the software application(s) 130 is not tested.

II. HARDWARE & FIRMWARE

A. GENERAL OVERVIEW OF THE HARDWARE AND FIRMWARE

1. The Role of the DVPU

The role of the DVPU 124 relating generally to the testing of hardware and/or software application(s) running on a SUT is described below.

A computer system typically includes some type of visual display screen. An example of such a visual display screen is a CRT (cathode ray tube) monitor. As indicated in the General Overview Section (Section I) above, the image displayed by such a visual display screen is based upon visual display signals received by the visual display screen from a visual display device 126. These signals are in turn controlled by visual display data within the visual display device 126. An example of such a visual display device 126 is an EGA video adapter card. In a preferred embodiment, it is these visual display signals that the DVPU 124 is designed to capture.

The DVPU 124 of the present invention broadly operates as follows. When the DVPU 124 receives input data from the Host 138 as indicated above and directs the input data to the SUT 108, the input data is emulated such that it seems to the SUT 108 that the input data is being entered into the SUT 108 directly. In other words, it appears to the SUT 108 (or more specifically, to the SUT computer 128) that the input data is being entered from a directly-attached input device (for example, a keyboard) rather than being directed through the DVPU 124.

The above-noted command, to which the DVPU 124 is receptive, directs the DVPU 124 to capture visual display signals, representative of the visual display data on a visual display device 126 residing on the SUT 108. Once the visual display signals are captured, the DVPU 124 then converts these signals to a compact format which is representative of the captured visual display data. This compact representation, which is called a signature, utilizes less space than would the visual display data, and thus this signature representation easier to transfer and store. Thus, in a preferred embodiment, the visual display signals are converted into a signature, and this signature is sent to the Host 138.

In a preferred embodiment, the Host 138 can direct the DVPU 124 to capture visual display signals from the visual display device 126 several times by sending the DVPU 124 multiple commands. In this situation, the DVPU 124 then generates the appropriate number of signatures, and sends these signatures to the Host 138. This is useful in situations where the visual display signals are constantly in flux, such as when one or more blinking cursors are represented by the visual display data.

When the DVPU 124 receives a command and at least one signature from the Host 138 as indicated above, it again captures whatever visual display signals are being sent at that time from the visual display device 126 of the SUT 108, and generates a new signature from these newly captured visual display signals. This new signature is then compared to the signature(s) sent from the Host 138, and the results of this comparison are sent to the Host 138. It should be understood, however, that newly generated signatures can also be sent to the Host 138 so that the comparison of signatures can be preformed on the Host 138 itself. In a preferred embodiment, the command for capturing the original signatures subsequently transferred through the Host 138 is a different command from that for capturing the new signature. However, it should be understood that these commands could also be identical.

While a preferred embodiment of the DVPU 124 requires that a visual display device 126 be present, it is not necessary that a visual display screen also be present. In addition, while only the command relating to the capture of visual display data is mentioned above, it should be understood that a preferred embodiment of the DVPU 124 is receptive to other commands, which is described below. Also, it should be noted that while the DVPU 124 interacts with the Host 138 and SUT 108, that the DVPU 124 is a separate and distinct entity, and that the Host 138 and SUT 108 are not a part of the DVPU 124.

A preferred embodiment of the DVPU 124 also contemplates other useful features for performing automated regression testing. One such feature allows for the exclusion of certain portions of the visual display signals (which would correspond to portions of a visual display screen image) when capturing these signals from a visual display device 126. This feature prohibits time variant information, such as date stamps or variable paths, from being considered when capturing the visual display signals from the visual display device 126.

Advantageously, since the DVPU 124 performs its signature comparison substantially in real-time, performance measurements or response times of the SUT 108 can be made. Performance measurements and response times refer to the actual time it takes the visual display device 126 to generate the appropriate visual display signals after receiving the appropriate input data.

2. Implementation of the DVPU

Having explained the role of the DVPU 124 as it relates to regression testing of software applications, the actual implementation of the system and method of the DVPU 124 is generally described next.

a. The Digital Video Processing Unit (DVPU)

Figure 4:
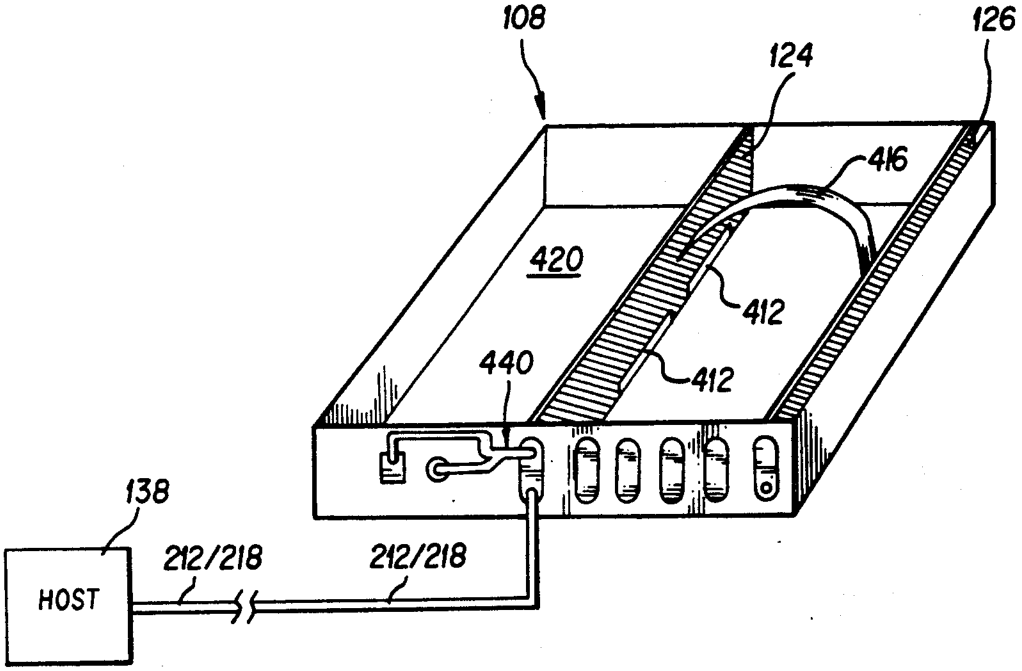
FIG. 4 is a perspective view of a preferred embodiment of the DVPU physically located within a system under test and interconnected with a host as it would appear in use.

FIG. 4 shows a preferred embodiment of the DVPU 124, physically positioned within SUT 108. In this embodiment, the DVPU 124 is implemented on a full length IBM Personal Computer accessory printed circuit board to be used within an IBM Personal Computer or compatible system as the SUT 108. Although an IBM Personal Computer System (or compatible) was selected as the SUT 108 to be used with a preferred embodiment of the DVPU 124, it is noted that the DVPU 124 encompasses technology which may be utilized with computer systems providing substantially equivalent video display signals. In fact, it is a feature of the DVPU 124, unlike prior related technology, that because of its non-intrusive architecture with respect to SUT 108, the DVPU 124 is adaptable for implementation on other computer systems.

FIG. 4 is primarily for illustrative purposes, and should be referred to throughout this general discussion to show the physical implementation of a preferred embodiment of the DVPU 124 with respect to Host 138 and SUT 108. For purposes of this general discussion, it is sufficient to understand that a datacomm channel 212/218 is a means for communication purposes between Host 138 and the DVPU 124; a user input cable 410 is a means for transmission of emulated user input data (in the form of input signals) from the DVPU 124 to SUT 108; an edge connector 412 is a means for interfacing the SUT backplane 420 to the DVPU 124; and a ribbon cable 416 is a means for accessing visual display signals from a visual display device 126. In a preferred embodiment, the visual display data from which the visual display signals emanate is in the form of digital video data. It is noted, however, that other embodiments of the DVPU 124 are contemplated using a variety of differing connecting arrangements of systems and signals not shown in this preferred embodiment.

Figure 5:
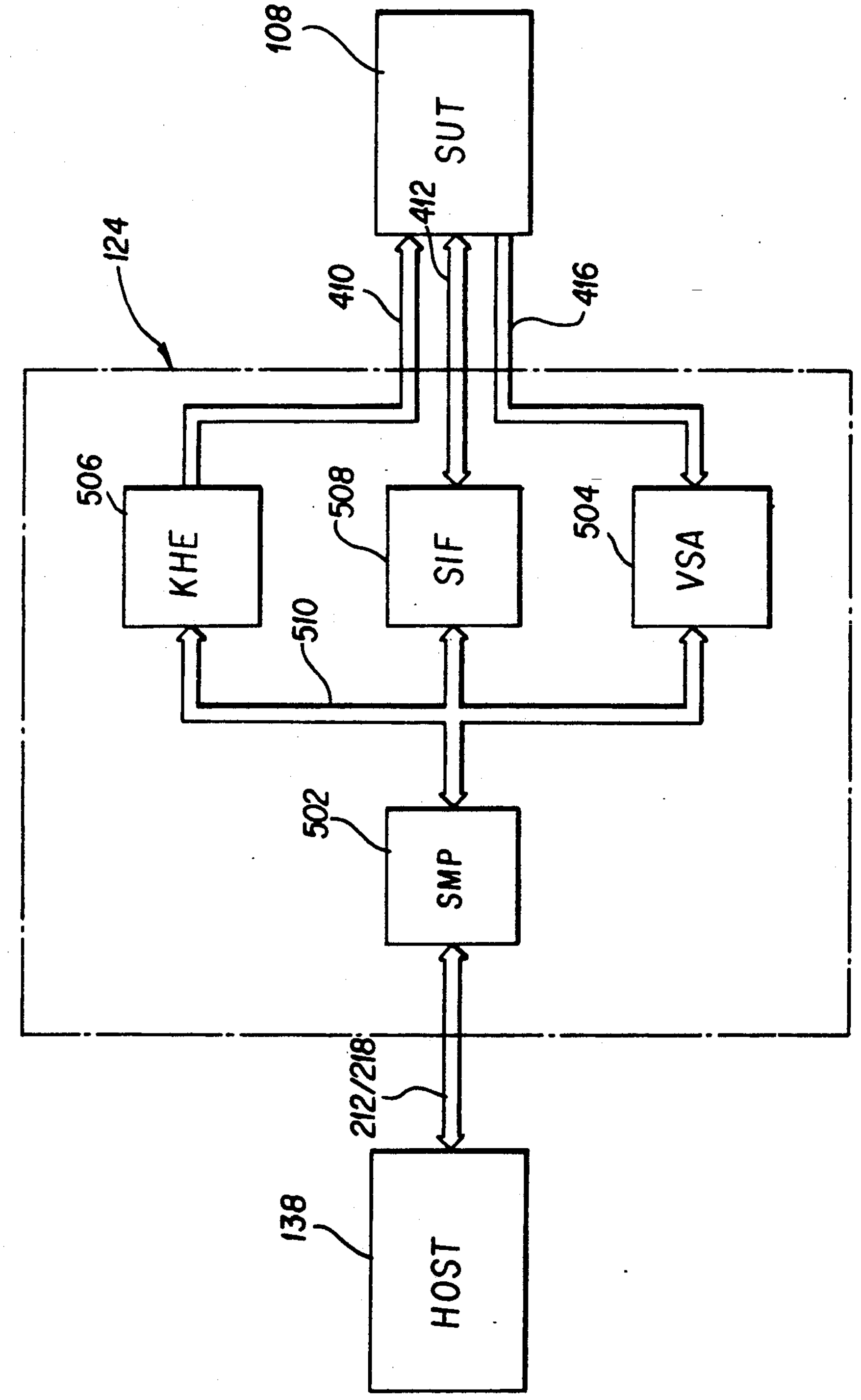
FIG. 5 is a block diagram of the DVPU showing its sub-systems and interface with host and SUT systems.

Referring to FIG. 5, a representative block diagram of the DVPU 124, according to a preferred embodiment of the DVPU 124, is shown. Also shown are Host 138, SUT 108, and associated bus-networking architecture between devices. FIGS. 4 and 5, viewed together, provide both the physical and architectural layout of a preferred embodiment of the DVPU 124 with respect to its sub-systems and peripheral systems.

The DVPU 124 draws its power from the power lines of the SUT backplane 420 and comprises four loosely coupled functional sub-systems. These sub-systems include: a system microcontroller (SMP) 502; a Video Signal Analyzer (VSA) 504; a Keyboard/HP-HIL Interface Emulator (KHE) 506; and a System Under Test Interface Port (SIF) 508.

This overview discussion now examines the general composition of each of the four sub-systems of the DVPU 124 separately while indicating correlations between sub-systems.

(1) Micro-controller Sub-system (SMP)

Figure 6:
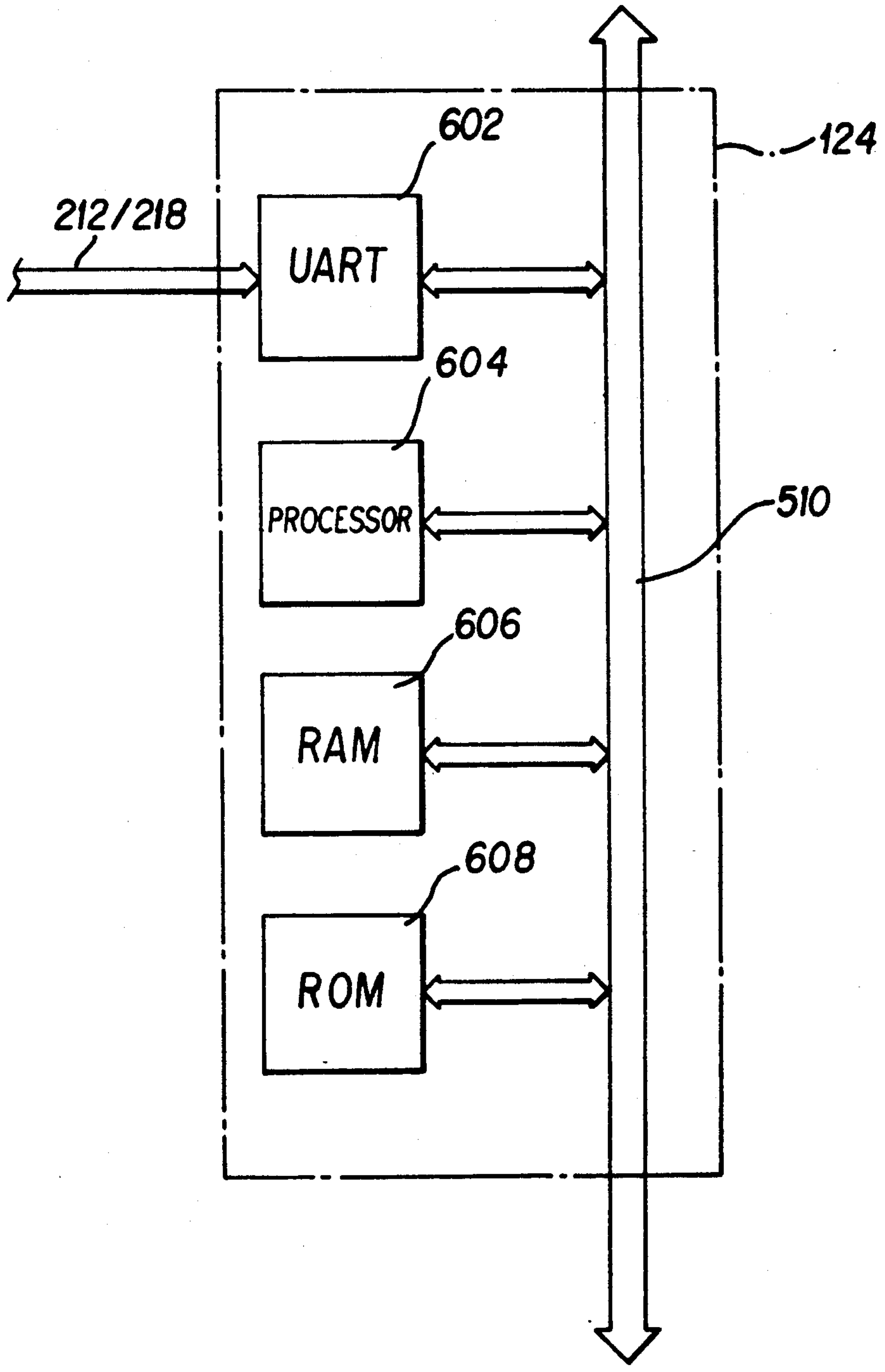
FIG. 6 is a detailed block diagram showing the circuit architecture of the microcontroller (SMP) sub-system of the DVPU.

Referring to FIGS. 5 and 6, SMP 502 is based on a simple microprocessor design architecture and essentially controls the visual display signal capture process and all data transfer between sub-systems within the DVPU 124 and between Host 138 and SUT 108.

During operation of a preferred embodiment of the DVPU 124, SMP 502 is provided with input data and commands via datacomm 212/218 from Host 138. While the commands are executed by SMP 502, the input data is processed and then delivered to SUT 108 as emulated signals corresponding to signals from an appropriate input device via KHE 506. Commands from Host 138 instruct SMP 502 to execute a variety of routines explained more fully below, but mentioned here generally. Routines which SMP 502 executes upon command from Host 138 include: a routine which instructs VSA 504 to capture visual display signals from the visual display device 126; a routine which performs a comparison of a representative signature against signatures transferred from Host 138; a routine which instructs KHE 506 to emulate an input device and transmit input data received from Host 138 to SUT input device ports; a routine which transfers the actual digital video data from visual display device 126 to Host 138 via SIF 508 in the event that a comparison between signatures fails.

The above-noted routines are accessed within the SMP code or firmware as a real-time interrupt driven system. That is, SMP 502 normally rests in an idle loop until a command needs to be processed or an interrupt serviced. Interrupts may be sent to SMP 502 by SUT 108 via SIF 508. In addition, some of the above-noted routines themselves introduce new interrupt service routines during their operation.

Upon completion of command execution, SMP 502 returns to its idle state and awaits the issuance of another command from Host 138, an interrupt from SUT 108, or an internal firmware interrupt.

(2) Video Signature Analyzer Sub-system (VSA)

Figure 11:
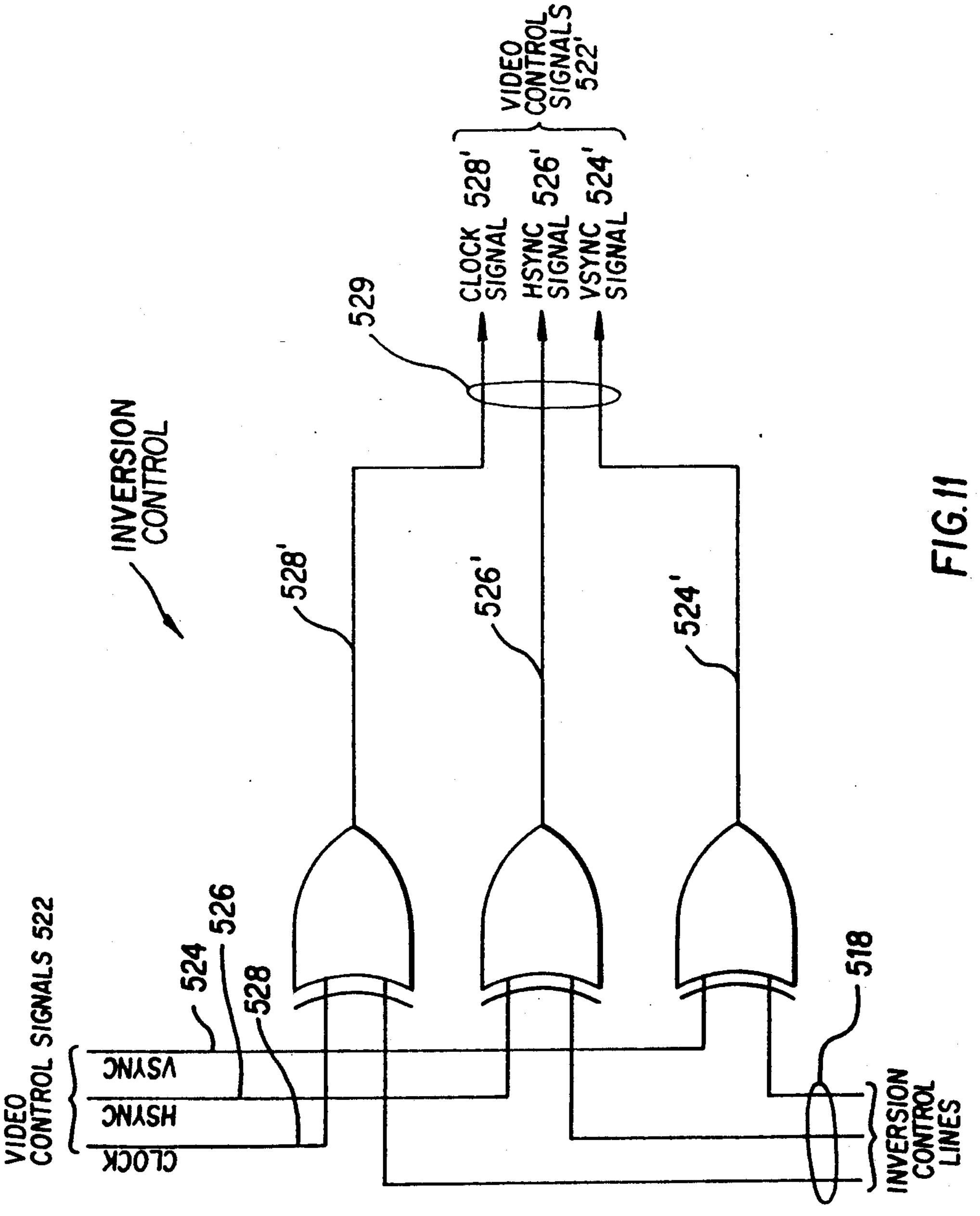
FIG. 11 is a logic diagram of the inversion control circuitry used to select the polarity of the vertical sync, horizontal sync, and dot rate clock signals of the visual display device of the system under test (SUT).

Referring to FIGS. 5 and 11, VSA 504 is the central sub-system of the DVPU 124. Driven by SMP 502, VSA 504 essentially contains all hardware control logic required for capture of visual display signals from visual display device 126. By improving upon the technique pioneered by U.S. Pat. No. 3,976,864 to Gordon et al., which is incorporated by reference herein, VSA 504 is capable of monitoring the digital video signals generated by visual display device 126 in a real-time and non-intrusive manner. VSA 504 is based upon a linear feedback shift register 802 (shown in FIG. 9). Shift register 802 captures the visual display signals received from the visual display device 126 on the SUT 108. The DVPU 124 them converts the visual display signals into a signature. A signature is, for example, a six-digit hexadecimal number which is generated from the visual display signals and, uniquely describes the digital video data in a compact form. Thus, such a signature requires less room to store, and less time to transfer.

In a preferred embodiment, shift register 802 is a pseudo-random number generator driven by video control signals 822 from visual display device 126. Video control signals 822 include: a horizontal synchronizing signal 826 referred to as HSYNC 826; a vertical synchronizing signal 824 referred to as VSYNC 824; and a Dot Rate Clock 828 referred to as Clock 828. Advantageously, since these signals are required of all computer systems utilizing digital video data on a visual display device, and since few computer systems lack some sort of visual display device, the DVPU 124 is uniquely compatible with most computer systems.

As a further preferred embodiment of the DVPU 124, the polarities of video control signals 822 are selectable. This feature allows the DVPU 124 compatibility with SUTs that output various polarities of video control signals by ensuring that the proper edge of each signal is consistently used within VSA 504. Polarity of video control signals 822 is selectable by means of an inversion control circuitry 814 explained in detail below. It suffices for purposes of this general overview to note that although video control signals VSYNC signal 824, HSYNC signal 826, and Clock signal 828 are selectably polarized by inversion control 814, the signals continue as VSYNC signal 824', HSYNC signal 826', and Clock signal 828' (referred to collectively as video control signals 822') throughout VSA 504.

Shift register 802 is controlled by a hardware state machine 804. Hardware state machine 804 is in turn manipulated by a firmware state machine 1502 (shown in FIG. 15) and video control signals 822'. Advantageously, a simple counter 808 is utilized in the visual display signal capture process so that portions of the visual display signals may be excluded from the resulting signature. This exclusion process is significant since some software application(s) put time variant data on the visual display screen (that is, in the digital video data) such as dates, a clock, or file names, which are not desired to become part of that particular representative signature.

To accommodate the various visual display devices used in a personal computer, VSA 504 has a multiplexer (MUX) 806 (shown in FIG. 8), from which to select separate visual data streams or planes for data input to shift register 802. Advantageously, MUX 806 minimizes testing when different planes contain redundant information, since only one signature of one plane would be necessary to uniquely represent a visual display screen. Moreover, MUX 806 allows for exhaustive testing of all image planes of a multi-plane visual display device, such as an Extended Graphics Adapter (EGA) which requires six planes, or a Video Graphics Array (VGA) which requires eight planes. In a preferred embodiment, MUX 806 is an 8:1 multiplexer which can accommodate up to eight planes of video data such as a VGA requires. SMP 502 keeps track of how many planes are to be signatured and generates a separate signature for each plane. During execution of a multi-plane comparison to valid signature(s), SMP 502 requires that all enabled planes match or a failure is reported.

At the completion of the signaturing process, SMP 502 may be instructed by Host 138 to either pass the signature back to Host 138 or execute an on-board comparison against other previously generated (that is, know valid) signatures received from Host 138. Passing the signature back to Host 138 is generally conducted when Host 138 is storing signatures. In a preferred embodiment, the on-board comparison method is preferred since data communication traffic between the DVPU 124 and Host 138 is kept to a minimum and comparisons can be more closely performed in real-time.

(3) Keyboard/HP-HIL Sub-system (KHE)

Referring again to FIG. 5, KHE 506 essentially contains the necessary controlling hardware to emulate input signals from input devices, such as but not limited to a keyboard, pointing device, touch screen or tablet. Generally, operation of KHE 506 involves SMP 502 conveying data to KHE 506 in which KHE 506, emulating a particular input device, transmits input data over a standard input device cable 410 to the appropriate input device port on SUT 108. By way of example and not limitation, in a preferred embodiment of the DVPU 124, Hewlett Packard HP-HIL (Human Interface Link), available from Hewlett Packard Corporation, is utilized to emulated the input devices of KHE 506. In addition to the HP-HIL input device ports, a standard DIN keyboard input device port is also available on KHE 506 of a preferred embodiment.

Thus, in a preferred embodiment of the DVPU 124, KHE 506 is capable of emulating input devices by utilizing the HP-HIL emulation scheme. For example, KHE 506 can be configured to emulate the IBM/AT keyboard input device (a DIN input device) or several HP-HIL devices (that is, devices that utilize the HP-HIL scheme). In the DIN mode, SMP 502 supports IBM-AT protocol for both the IBM mode and the DIN ENVOY mode (DIN ENVOY MODE is a Hewlett Packard keyboard layout). The IBM/XT protocol is also supported.

Other embodiments may, in order to emulate other input devices for input to a SUT 108, provide the appropriate control circuitry and protocol necessary for implementation with SMP 502.

(4) System under Test Interface Port (SIF)

The DVPU 124 is attached to backplane 420 via the SIF 508 by means of edge connector 412. In a preferred embodiment of the DVPU 124, SIF 508 is used primarily as an I/O port for reading switch settings configuring the DVPU 124, and as a communications port for transferring digital video data from the visual display device 126 to Host 138 via datacomm 212/218. Although this transfer of information is intrusive to SUT 108, it is performed only after a SUT 108 fails regression testing. During normal operation, information is transferred via the other sub-systems noted above. Thus, Host 138 has direct access to the digital video data corresponding to the actual "failed" display screen of SUT 108.

Both memory and input/output (I/O) devices are present in SIF 508. Basically, SIF 508 acts as an interface port between SUT 108 and Host 138. SIF 508 is an 8-bit bi-directional port with provisions for generating an interrupt when written to. Also included in SIF 508 are 8K bytes of ROM and 8K bytes of RAM. This 16K-byte address space and the I/O ports of SIF 508 can be located at any of several addresses normally reserved for the IBM prototype card. Both the memory and the I/O ports of SIF 508 can be relocated to avoid conflicts with hardware installed on SUT 108.

SIF 508 also provides all the necessary hardware for users of the DVPU 124 to create routines for special-purpose testing requirements. For example, routine may be stored within ROM of SIF 508 which may instruct SUT 108 to carry out certain specialized tasks.

B. DETAILED DESCRIPTION OF THE SYSTEM

As Section I(A), "General Overview of the Hardware and Firmware" generally describes, a preferred embodiment of the DVPU 124 is comprised of four sub-systems as shown in FIG. 5. It should be understood that the DVPU 124 of the present invention contemplates that features implemented by these sub-systems could also be implemented by an arrangement of sub-systems different from that prescribed by this preferred embodiment.

The features of this preferred embodiment of the DVPU 124 are implemented on a full-length IBM/AT Personal Computer style accessory board which can also be used within an IBM/XT Personal Computer with its top cover removed. During normal operation, the DVPU 124 derives power off the +5 Vdc, −12 Vdc, and +12 Vdc lines of SUT backplane 42 via edge connector 412. Aside from drawing its power from SUT 108, the DVPU 124 executes its primary role of capturing visual display signals, generating a representative signature therefrom, and emulating input devices of SUT 108 in a non-intrusive manner.

Although SIF 508 interfaces SUT 108 through backplane edge connector 412 and thereby may intrude SUT 108, such intrusion is seen as a feature of the DVPU 124 and selectively occurs if SUT 108 has failed regression testing. For example, intrusion to the digital video data on the visual display device 126 via SIF 508 advantageously allows Host 138 to retrieve this digital video data. Thus, although SIF 508 does not play a role in the pass/fail regression testing of the software application(s) on the SUT 108, it does offer significant advantages. If unwanted, the SIF 508 can be disabled.

The following discussion is a detailed description of each individual sub-system and its associated firmware.

Figure 7:
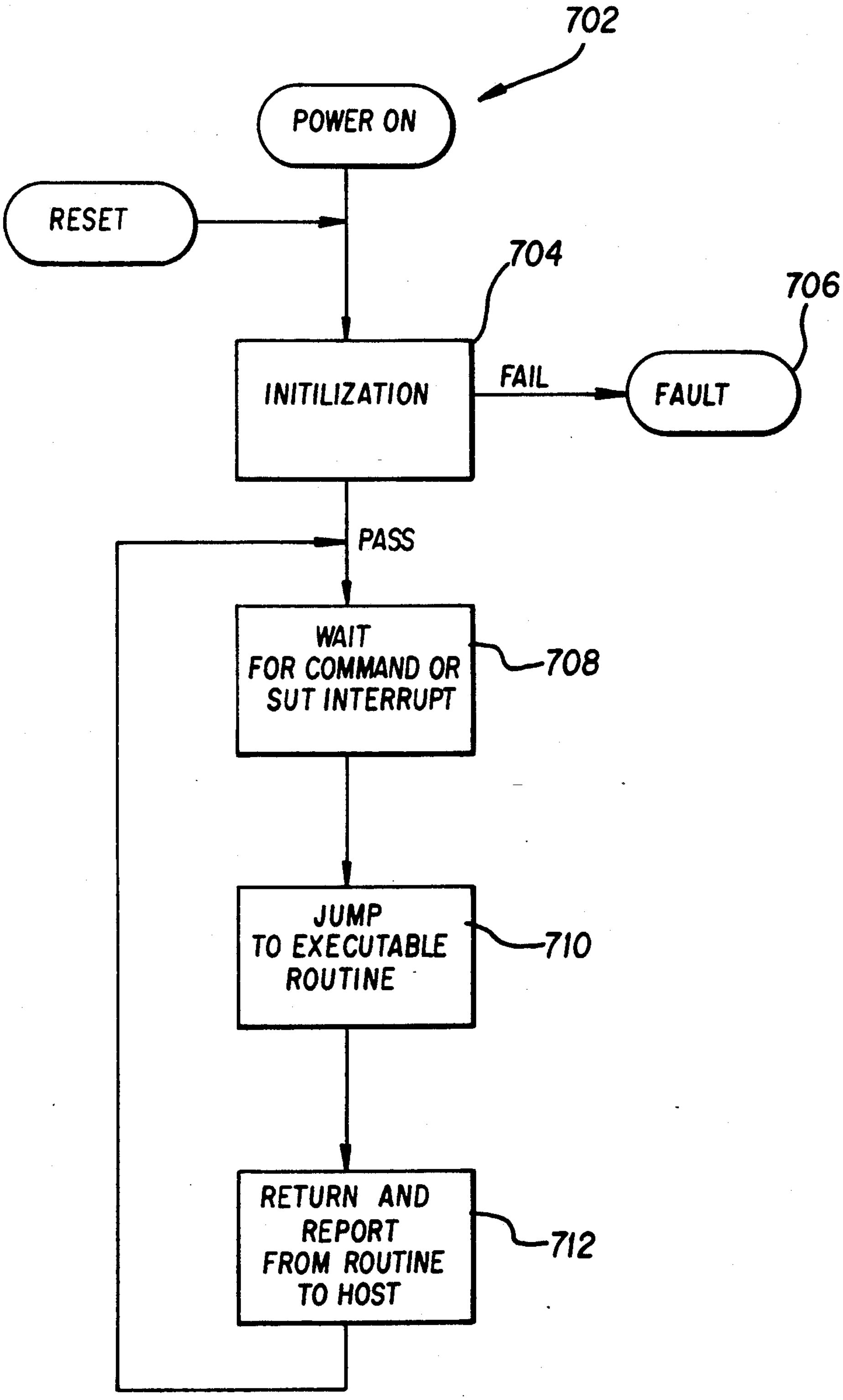
FIG. 7 is a high level flow chart of the operation of the main code on-board the system microcontroller (SMP) sub-system of FIG. 6.

1. Microcontroller Sub-system (SMP) (FIGS. 5–7)

a. Hardware

Referring to FIG. 5, SMP 502 is shown as the central processing unit of the DVPU 124. As such, SMP 502 is responsible for all data transfers between sub-systems on-board the DVPU 124, and between peripheral systems such as Host 138 and SUT 108. SMP 502 also functions as a controlling device and is responsible for controlling VSA 504 regarding visual display signal capture and processing.

Referring to FIG. 6, a detailed block diagram of SMP 502 alone is shown. In a preferred embodiment, the processor 604 used by SMP 502 is an Intel 80188 microprocessor. The Intel 80188 microprocessor is preferred over other processors because of its low cost, high level of integration and compatibility with Intel's 80×86 line of microprocessors, the prominent microprocessor family used throughout the personal computer industry. It is noted, however, that while the Intel 80188 is a preferred controller device, other hardware controlling devices could be utilized in its place.

Processor 604 accesses its memory and peripheral devices via SMP-bus 510. In a preferred embodiment, it is contemplated that SMP-bus 510 is a typical microprocessor bus for an 8-bit microprocessor and comprises address, control, and data lines. Memory used by processor 604 comprises a 32 kbyte Read Only Memory (ROM) block 608 and an 8 kbyte Random Access Memory (RAM) block 606. Although these memory sizes and arrangements are a feature of a preferred embodiment, various other memory sizes and arrangements could also be used. In a preferred embodiment of the DVPU 124, processor 604, an Intel 80188 microprocessor, has access to this memory.

SMP 502 communicates with Host 138 via RS-232 data communications channel 212/218. Processor 604 interfaces with datacomm 212/218 through a UART 602. A simple terminal emulator routine is present onboard processor 604 (for example, part of the SMP firmware described below) for communication with RS-232 protocol. UART 602 is configured in the same mode as the IBM-AT 9 pin serial port. All the RS-232 handshake lines (CD, DTR, RTS, CTS) are present. Several jumpers located on the DVPU 124, are accessible by the SMP firmware for use in configuration of UART 602.

b. SMP Firmware

Processor 604 of SMP 502 executes code typically referred to as firmware. This code, herein referred to as a main SMP Code 702 (shown in FIG. 4) is located in an Erasable Programmable Read Only Memory (EPROM) chip of ROM 608. In a preferred embodiment of the DVPU 124, main SMP Code 702 is written in Intel 80188 assembly language. It is understood that in other embodiments, different languages and storage devices could be used to achieve a substantially equivalent result.

Referring to FIGS. 6 and 7, the modular format of main SMP Code 702 is shown. Main SMP Code 702 is written in modular format with all main routines reached via a jump table located in RAM 606. Such a jump table is built during initialization procedures and contains the address locations through which all routine calls are made. Advantageously this facilitates patching or adding new or extended routines. Main SMP Code 702 begins its execution with initialization routines 704. Initialization routines 704 include: an initialization of processor 604 internal registers; a ROM 608 check sum test; a RAM 606 read/write test; an initialization of system interrupt vectors; initialization of a RAM jump table; initialization of UART 602; and initialization of other interrupt driven routines. Configuration of KHE 506 and SIF 508 is also performed during initialization 704 and is discussed below.

If a fault 706, during initialization 704 does not occur, main SMP Code 702 enters a wait state 708. Main SMP Code 704 remains idle in wait state 708 until a command is received from Host 138 or an interrupt is triggered by SUT 108. An interrupt from SUT 108 would indicate that data is to be read at SIF 508 by SMP 502.

Advantageously, in a preferred embodiment, all data transmission between Host 138 and SMP 502 are in ASCII hexadecimal character format so as to allow complete independence from Host 138 data communications. Such format also allows for test scripts onboard Host 138 to be stored in easily readable form, assists porting test scripts among other Hosts, and eases editing of scripts since no de-compilation is required.

All communication between Host 138 and SMP 502 is executed in fixed record formats. Host 138 issues commands to the DVPU 124 which are received by SMP 502. SMP 502 then executes the command by performing various routines such as generating a signature or doing a comparison of a signature against earlier recorded signature(s). In a preferred embodiment, the fixed record format of these commands sent from Host 138 to SMP 502 is: *<COMMAND><RECORD LENGTH><DATA SPECIFIC TO COMMAND><CHECKSUM>CR Where:

* Is a start of command mark;

<COMMAND> is a one letter command code;

<RECORD LENGTH> is the length in bytes (characters) of the data field;

<DATA SPECIFIC TO COMMAND> contains data which may be needed for SMP 502 to execute the command such as input data to be sent to SUT 108 via KHE 506;

<CHECK SUM> is the two's complement of the 8-bit sum of the <COMMAND>, <RECORD LENGTH>, and <DATA> fields.

The <RECORD LENGTH> and <CHECK SUM> fields are each two characters wide. The CR (ASCII ODH) delimits the command and is not counted in its length. The maximum length of any record is 128 characters (thus the maximum width of the data field is 122).

Each record is validated upon receipt by SMP 502 and acknowledgment to Host 138 is made if an error occurs. Error messages or error codes can be selected to be sent to Host 138 when such an error condition occurs. Host 138 can further request a retransmission of the last record sent if an error is reported. A 128-byte buffer memory is provided on-board SMP 502 for receiving data from Host 138. Such a buffer allows for more efficient data transmission between Host 138 and SMP 502.

Once SMP 502 receives a command from Host 138, it executes that command by jumping to the desired executable routine, designated by 710, via the address jump table in RAM 606. SMP 502 performs the routine and returns from it sending its results to Host 138, designated by 712. A partial listing of the preferred routines which are performed by SMP 502 include those routines listed in TABLE 1.0 below.

TABLE 1.0

DUMP: Implements a dump of visual display device 126 digital video data contents by uploading it to Host 138.

HP_HIL: Sends an HI-HIL device X, Y, and button data to SUT 108 via KHE 506.

INCLUDE: Sets the start and stop limits of the visual display signals to be included in a signature. Used to exclude portions of visual display signals representative of time variant information.

LOAD: Implements downloading of code routines to SMP 502.

LOAD_SIGLIST: Implements downloading of valid signature lists for comparison of generated signatures on-board the DVPU 124.

RESEND: Re-sends the last data record to Host 138 in case of datacomm error.

SET_ATTRIBUTE: Allows Host 138 to change default settings on-board the DVPU 124.

SIGNATURE: Generates a signature representative of the digital video data residing on the visual display device 126.

TEST_&_REPORT: Uploads sets of variables from SMP 502 to Host 138.

WAIT_MATCH: a generated signature against a downloaded list of signature(s) from Host 138 until a match or time-out occurs.

As designated by 712, SMP 502 responds to Host 138 with the results of the executed routine in the preferred fixed record format:

<+/−><OPTIONAL DATA>CR LF

Here + indicates successful completion of the command and − indicates failure. Optional data of the record varies by command. For successful completion of a command, the optional data field may contain actual data in a format similar to command records. In case of failure, an error code followed by an optional verbose error message is reported.

Upon completion of command execution, SMP 502 returns to idle state 708 to await the issuance of another command from Host 138 or an interrupt from SUT 108.

2. Video Signature Analyzer (VSA)

In a preferred embodiment of the DVPU 124, VSA 504 is a combination of both hardware and firmware. The purpose of VSA 504 is to capture visual display signals representative of digital video data on the visual display device 126 on the SUT 108, and to generate a CRC (Cyclical Redundancy Check) or signature. As described above, a signature is a compact value uniquely representative of digital video data. By manipulating video control signals 822 of SUT 108, a signature is generated from the visual display signals (which result in the image on the visual display screen of SUT 108, if there is one). Once generated by VSA 504, a signature is then retrieved from VSA 504 by SMP 502. SMP 502 may, upon instruction from Host 138, transmit the signature to the Host 138 or compare it against previously acquired (and known valid) signature(s) downloaded from Host 138.

a. VSA Hardware (FIGS. 8–11)

Figure 8:
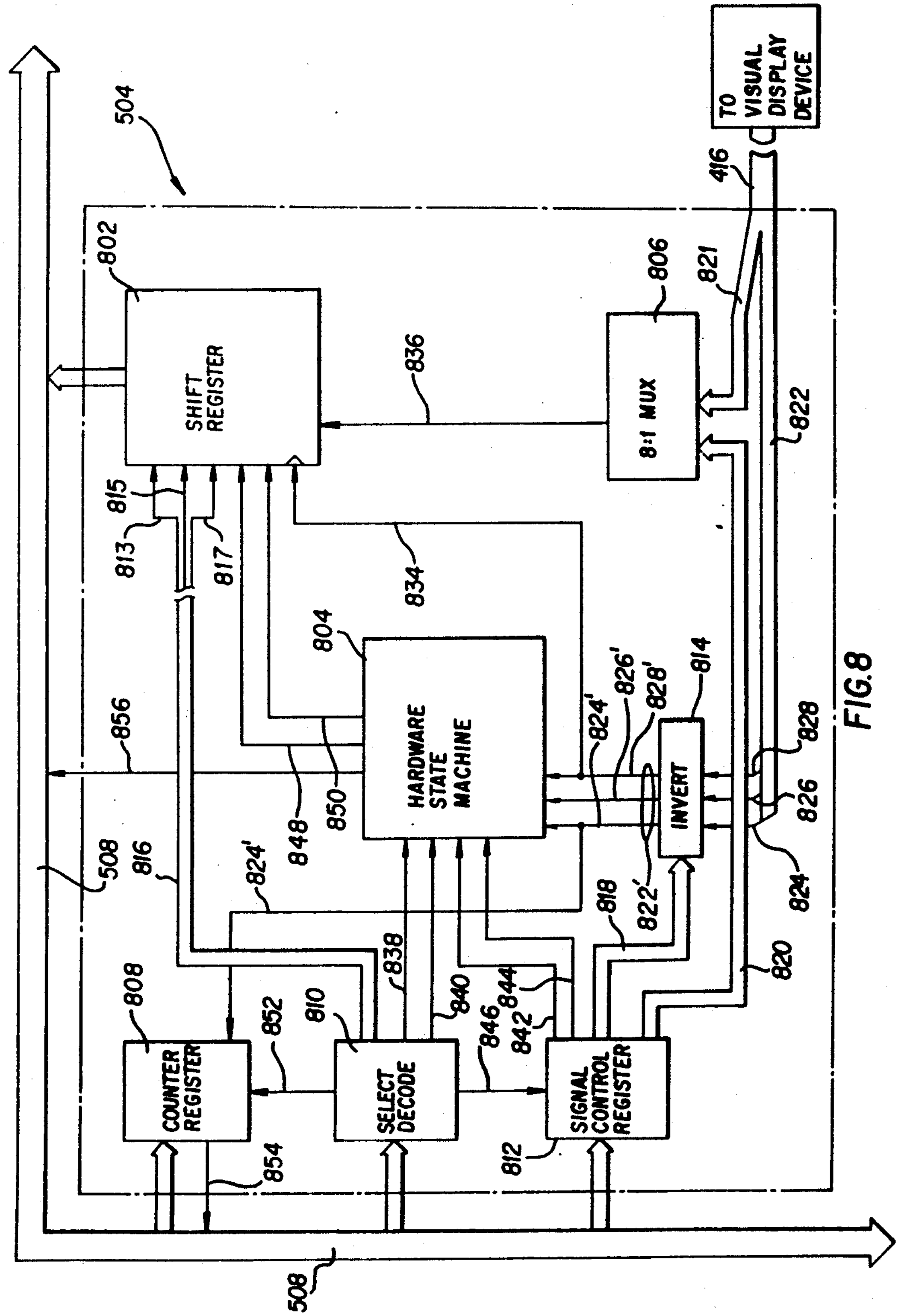
FIG. 8 is a detailed block diagram showing the circuit architecture of the video signal analyzer (VSA) sub-system of FIG. 6.

Referring to FIG. 8, data transfer throughout VSA 504 is shown generally. VSA 504, driven by SMP 502, essentially contains all hardware control logic required for the capture of visual display signals from the visual display device 126 of SUT 108. VSA 504, executes its primary function of generating a CRC or signature by means of a liner feedback shift register 802. Shift register 802 is essentially a pseudo-random number generator which accumulates a 24-bit digital representation of a stream of visual display signals. Implementation of shift register 802 is based on Equation 1 below.

$$x^0 = x^1 \text{ XOR } x^{22} \text{ XOR Data} \quad \text{EQU. 1.}$$

where:

$x^0$ = Input Data to be latched through shift register 802

$x^1$ = Current contents of the lowest bit in shift register 802

$x^{22}$ = Current contents of the twenty-second bit of shift register 802.

Data = Stream of visual display signals of SUT 108.

To get the best resolution with the minimum number of parts, a length of 22 bits was chosen for a preferred embodiment of shift register 802, although it should be understood that other lengths may be used depending on the resolution desired.

Figure 9:
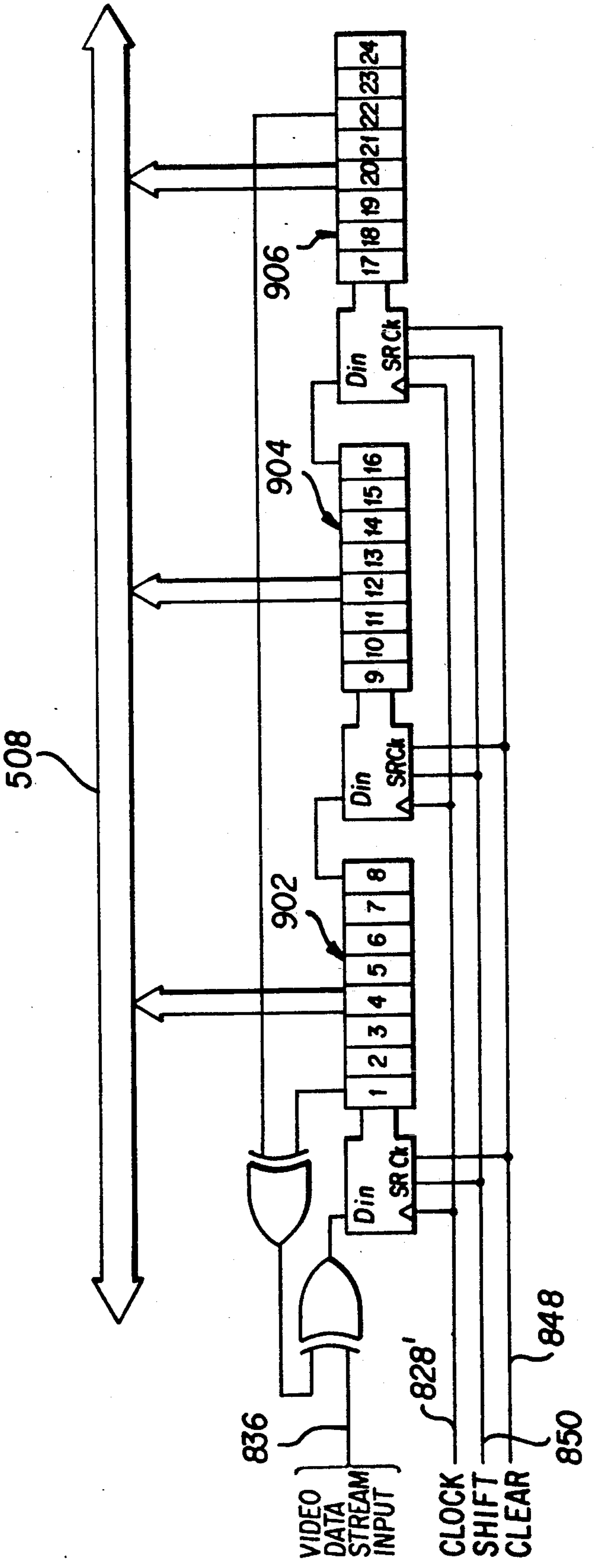
FIG. 9 is a logic diagram of the shift register of FIG. 8 used to generate signatures from captured streams of visual display signals.

Shift register 802, shown more clearly in FIG. 9, comprises (in a preferred embodiment) three 8-bit shift registers: a Low-Sig register 902, a Mid-Sig register 904, and a Hi-Sig register 906, and is clocked synchronously with Clock signal 828'. Bits 23 and 24 of Hi-Sig register 906 are not placed in the feedback path and cause the total number of states to be multiplied by four. The result of this preferred implementation of shift register 802 is a 100% certainty of detecting any single bit error in data streams up to 8 million bits and a greater than 99.9998% certainty of detecting multiple bit errors.

Referring back to FIG. 8, shift register 802 is controlled by a simple hardware state machine 804 which samples a video data input 836 by Clock signal 828'. Hardware state machine 804 is in turn controlled by a firmware state machine 1502 (shown in FIG. 15) located aboard SMP 502. Firmware state machine 1502 is a set of interrupt service routines (ISRs) and is described in detail in section II(B)(2)(b) (VSA Firmware) below.

To accommodate various visual display devices used in the computer industry, in a preferred embodiment, VSA 504 utilizes an 8:1 multiplexer (MUX) 806. This MUX 806 channels at least one of eight separate visual data streams or plane lines 821 to video data input 836 of shift register 802. Video data plane lines 821 contain TTL level input signals from the visual display device 126 of the SUT 108. Video data plane lines 821 are the equivalent digital signals which can be output from visual display device 126 to a SUT monitor for video display purposes. It is noted that in a preferred embodiment an IBM-PC or compatible system is utilized as the SUT 108 and a visual display device 126 adaptable to that system is required to generate video control and data signals. However, it should be understood that other hardware may be used for the SUT 108 and visual display device 126.

MUX 806 is offered in a preferred embodiment for visual display signals accumulation for visual display devices which utilize a plurality of video data planes. Advantageously, MUX 806 minimizes testing when different planes contain redundant information since a signature of one plane would be equivalent to a signature of the other planes. MUX 806 also allows for exhaustive testing at all image planes of multiplane visual display devices.

MUX 806 is controlled by MUX control lines 820. These control lines 820 are driven by SMP 502, wherein SMP 502 selects the appropriate video data plane for the capture of visual display signals. SMP 502 then writes to a signature control register 812 and latches the address of the desired input channel to MUX 806. Latching the data from SMP-bus 510 is accomplished by an address decoded signal designated as a load signature control register (SCR) 846. Address decoding of SCR 846 is performed with a commercially available programmable array logic (PAL) device referred to as a select decode 810. It should be noted, however, that a variety of methods may be chosen to implement the output control signals of SMP 502. For example, another type of control register could be used.

Address decoding of select decode 810 is also utilized by SMP 502 to: activate a counter register 808 by means of a load counter register (CTR) signal 852; latch the contents of shift register 802 by means of a Rd_Lo signal 813, Rd_Mid signal 815, and Rd_Hi signal 817; check VSA 504 busy status by means of a Rd_Busy signal 838; and synchronize the visual display signals capture process by means of a pulse GO signal 840.

Select decode 810 generates these control signals upon instruction from SMP firmware during the visual display signals capture process. Rd_Busy signal 838 is a pulse signal which latches a busy signal 856 to SMP-bus 510. SMP 502 can then determine the status of busy signal 856 which reflects the status of VSA 504. GO signal 840 is a pulsed signal which synchronizes the beginning of the visual display signals capture process. Load counter register signal (CTR) 852 is a pulse signal from select decode 810 which latches a numeric value from data bus of SMP-bus 510 into a counter register 808 during the exclusion process. This numeric value pertains to the count of scan lines to be excluded from the signature representative of digital video data. The operation of these signals with respect to the visual display signals capture process is discussed in detail in Section II(B)(2)(c) (VSA Operation) below.

Video control lines 822 from visual display device 126 comprise a vertical synchronizing signal or VSYNC signal 824, a horizontal synchronizing signal or HSYNC signal 826, and a Dot Rate Clock signal 828. VSYNC signal 824 is a pulse signal which indicates to a visual display device the beginning of each screen (or vertical trace of a CRT). Similarly, HSYNC signal 826 is a pulse signal which indicates to a visual display device the beginning of each scan line (or horizontal trace of a CRT). Dot Rate Clock signal 828 is the synchronizing clock of both VSYNC 824, and HSYNC 826 signals and the visual display signals.

Inversion control 814 allows SMP 502 to selectively control the polarity of video control signals 822. Thus, by selectively inverting video control signals 822 to form inverted video control signals 822', any polarity combination of video control signals inherent in various visual display devices can be accommodated.

As shown in more detail in FIG. 11, inversion control 814 is implemented in simple XOR logic. Inversion control 814 is driven by SMP 502 in the same manner as MUX 806 is driven by SMP 502. That is, SMP 502 inverts any of video control signals 822 by latching the appropriate value into signature control register 812. A plurality of inversion control lines 818, requiring three latched output bits of select decode 810, provide the polarity signals to inversion control 814. Advantageously, through firmware, SMP 502 can selectively change the polarity of each video control signal 822 as an SUT monitor switches modes during the visual display signals capture process. The resulting signals, VSYNC signal 824', HSYNC signal 826', and Clock signal 828 , enter VSA 504 in a known polarized state, namely, rising edge active. Advantageously, this feature of a preferred embodiment, allows for compatibility with various visual display devices by bringing all video data control signals to a known polarity.

As discussed above in the General Overview of the Hardware and Firmware section II(A), VSA 504 is capable of excluding portions of the visual display signals representative of portions of the digital video data residing on a visual display device. Such visual display signals can start on any scan line (as would be displayed by an attached visual display screen) and end on any other scan line. Counter register 808 is utilized for this exclusionary purpose. Although in a preferred embodiment, counter register 808 is physically located onboard processor 604, it should be understood that counter register 808 can also be implemented using most commercially available data counters.

If portions of the visual display signals are to be excluded, SMP 502 sets counter 808 to a value equal to the number of scan lines of the visual display screen (as represented by the digital video data) that are desired to be excluded. Counter register 808 is then started by SMP 502 when it reaches the first scan line of the excluded portion of the visual display screen image. While counter 808 counts down, shift register 802 is held idle, thereby pausing the visual display signals capture process.

Counter 808 generates an interrupt, referred to as a terminal count signal 854, to SMP 502 when it has counted down from its instructed value and shift register 802 resumes shifting. In this way SMP 502 can start and stop the signature process according to the portions of the digital video data desired to be excluded.

If no portions of the digital video data are to be excluded, counter 808 is set to an appropriately large value preventing it from generating an interrupt until capture of the visual display signals, representative of that image on the entire visual display screen is completed.

Reset signal 842, active signal 844, inversion control lines 818 and MUX control lines 820 are all signals which leave signature control register 812 and are considered stable at all times. Reset signal 842 resets hardware state machine 804 by resetting a "Run" flip-flop 1002, a "Busy" flip-flop 1004, and a "Shift" flip-flop 1006. (Shown in FIG. 10). Active signal 844 is asserted by SMP 502 to arm or set "J" of "J-K" or "Shift" flip-flop 1006. Again, the operation of both these signals with respect to the visual display signal capture process is described in section II(B)(2)(c) (VSA Operation) below.

Both signals, VSYNC signal 824' and terminal count signal 854 of VSA 1381, are capable of generating an interrupt to SMP 502. As disclosed in section II(B)(2)(c) (VSA Operation) below, VSYNC signal 824' interrupts SMP 502 when it pulses. Each pulse represents the beginning of each new image on the visual display screen. Terminal count signal 551 interrupts SMP 502 when counter register 808 has reached zero (for example, at the end the desired number of skipped scan lines during the exclusion of portions of visual display signals).

Signals leaving hardware state machine 804 to shift register 802 include: a clear signal 848 and a shift signal 850. Clear signal 848 is asserted by hardware state machine 804 shortly before visual display signal capture occurs and is a pulse signal occurring while Run 708 is set and Busy 856 is not set and clears shift register 802 to a known state of zeros. Shift signal 850 is asserted by "Shift" flip-flop 1006. While asserted, shift signal 850 activates shift register 802 resulting in the shifting of the visual display signals at shift register input 836 through shift register 802. Operation of these signals during the visual display signal capture process is discussed further in section II(B)(2)(c) (VSA Operation) below.

b. VSA Firmware

Figure 13:
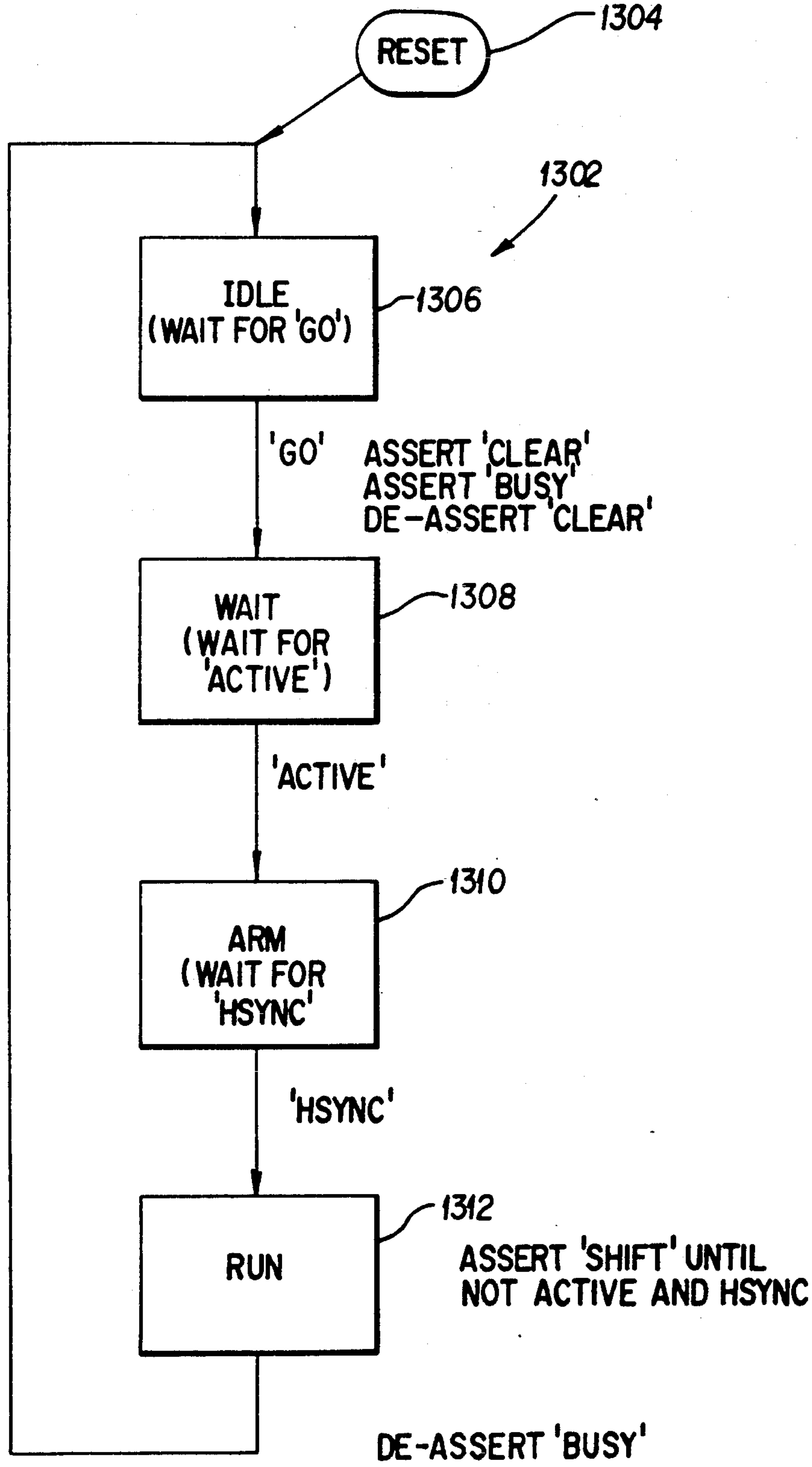
FIG. 13 is a flow chart of the states which the hardware state machine executes during visual display signal capture.
Figure 14:
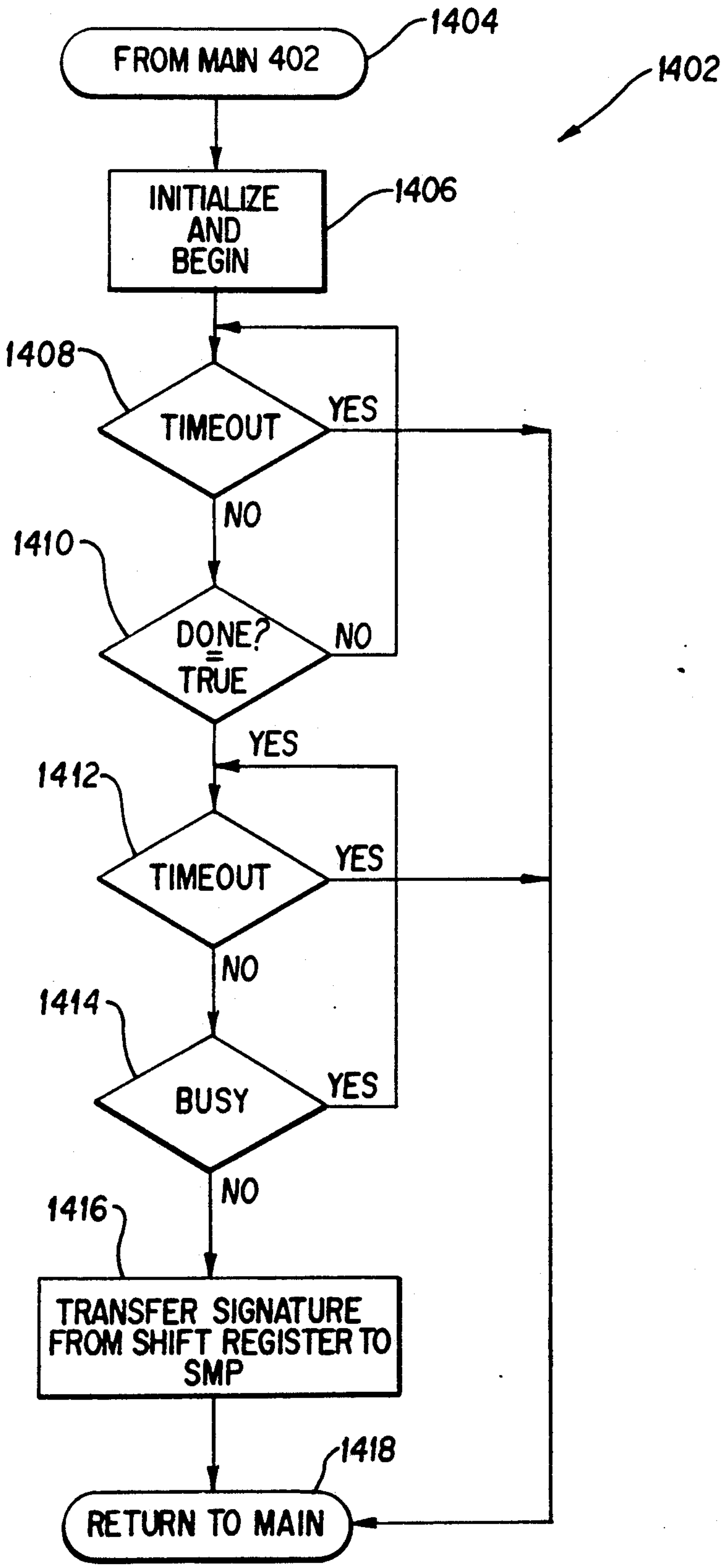
FIG. 14 is a flow chart of the visual display signal capture routine on-board the system microcontroller (SMP).
Figure 15:
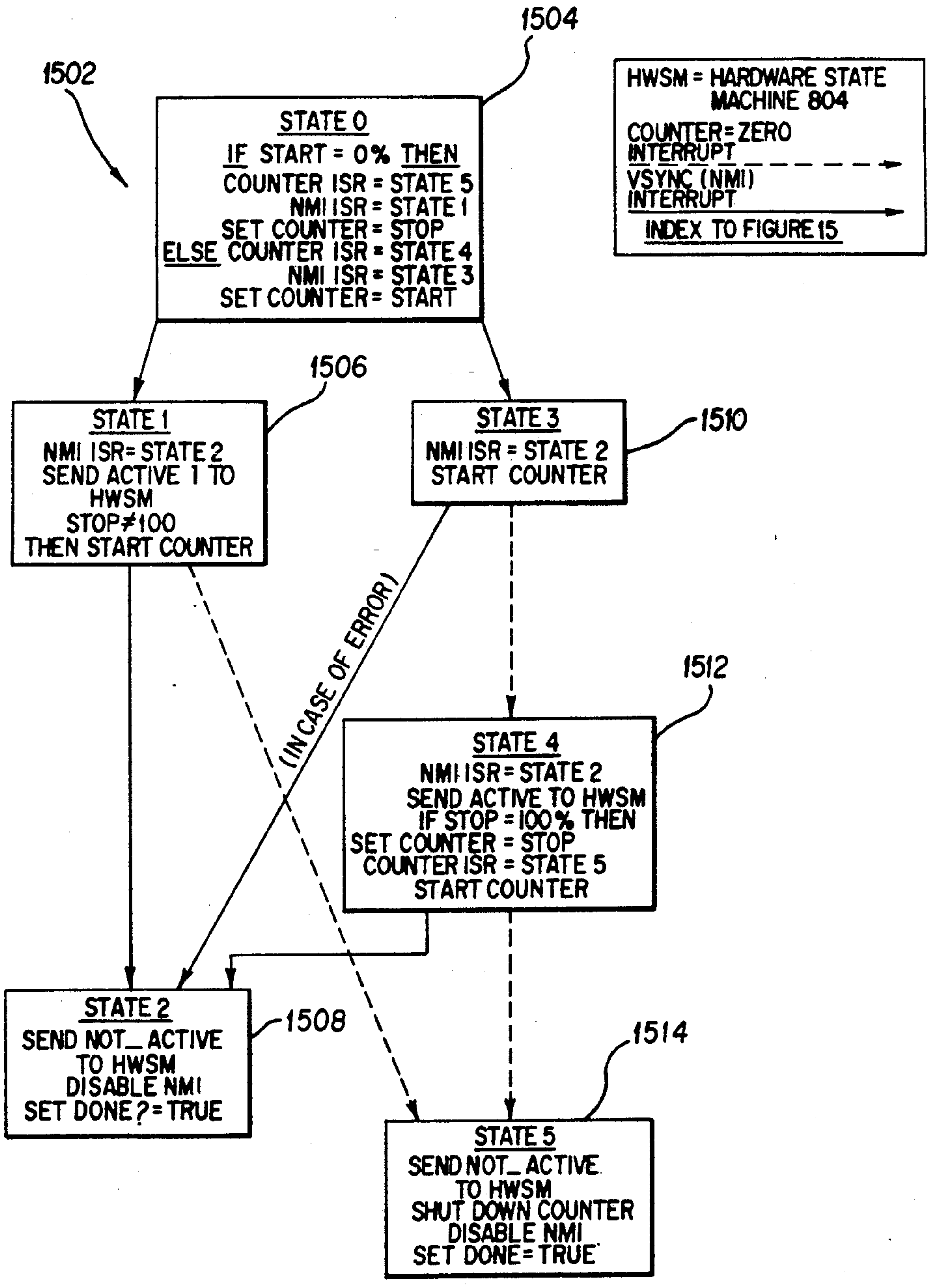
FIG. 15 is a flow chart of the states which the firmware state machine sub-routine executes during visual display signal capture.

The VSA firmware is comprised of routines called by main SMP code 702. As stated above in section II(B)(1)(B) (SMP Firmware) a main visual display signal capture routine 1402 (as shown in FIG. 14) is called by main SMP code 702 for the purpose of having VSA 504 capture visual display signals representative of the visual display screen on the SUT 108. Main visual display signal capture routine 1402 is basically a series of continuous loops which are entered and departed depending on the outcome of various interrupt service routines (ISRs). Such an arrangement of loops and ISRs is considered a firmware state machine 1502, as shown by FIG. 15. Firmware state machine 1502 in turn is responsible for controlling hardware state machine 804. The states which hardware state machine 804 move through are shown in the hardware state machine flow chart of FIG. 13, whereas the states of firmware state machine 1502 is shown in FIG. 15. Hardware state machine 804 has a resolution of one dot rate clock period while firmware state machine 1502 has a resolution of one scan line.

c. VSA Operation

The visual display signal capture process begins with the execution of main visual display signal capture routine 1402 on-board SMP 502. The structure of main visual display signal capture routine 1402 is generally shown in FIG. 14. FIG. 15 shows a more detailed block diagram of firmware state machine 1502 which main visual display signal capture routine 1402 implements during the visual display signal capture process.

Figure 12:
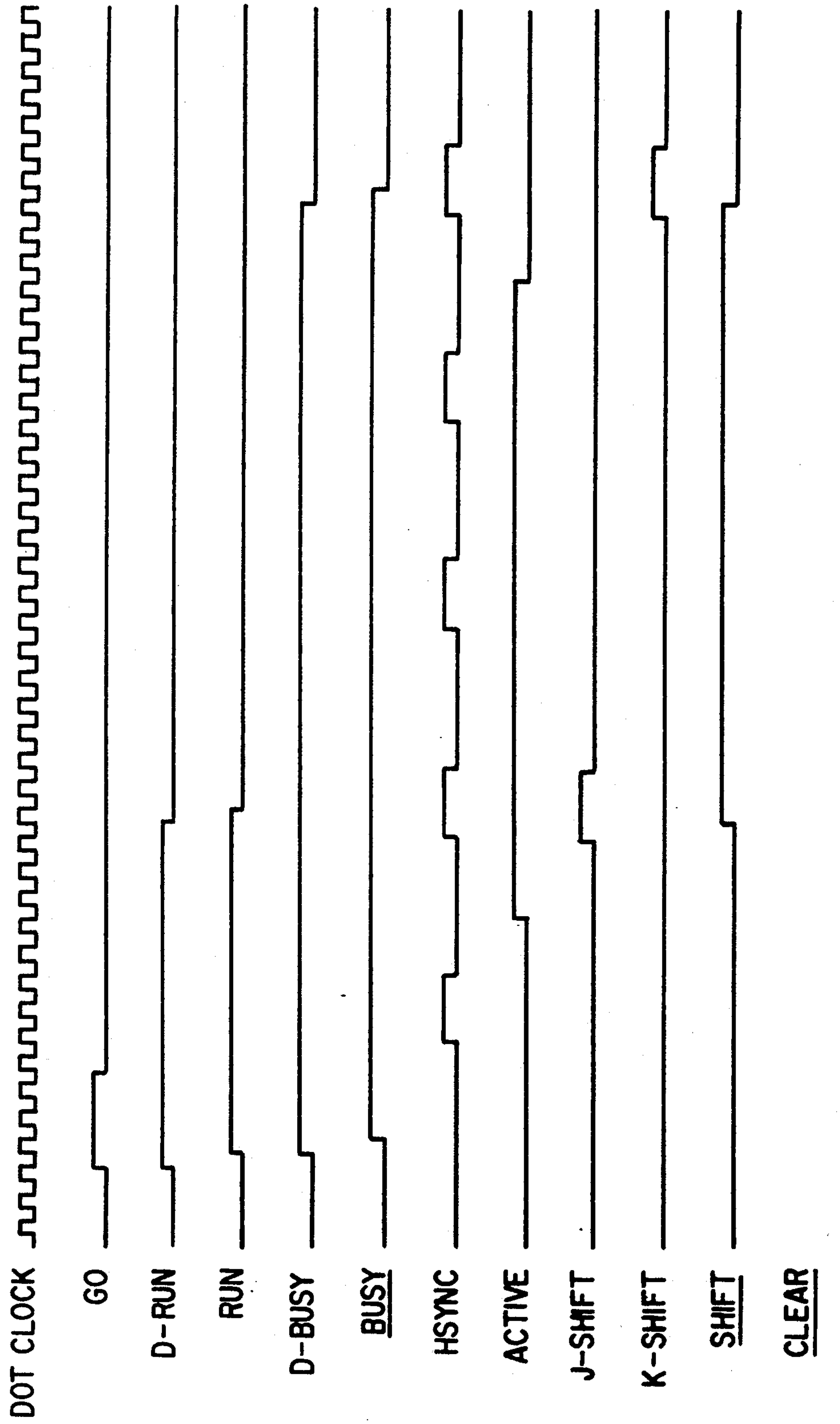
FIG. 12 is a timing diagram showing critical timing moments during visual display signal capture.

Visual display signal accumulation routine 1402 is entered from main SMP code 702, designated as 1404. Visual display signal capture routine 1402 next executes a series of initialization steps and begins visual display signal capture, as designated by 1406. Initialization and begin 1406 can be visualized by referring to FIGS. 8, 10 .and 12, and is responsible for: resetting hardware state machine 804, resetting firmware state machine 1502, sending a 'GO' pulse or GO signal 840 to hardware state machine 804, and entering a wait state or timeout loop designated as 1408. FIG. 12 is a timing chart of all signals changing state during visual display signal capture process and should be referred to throughout this discussion of VSA operation.

Figure 10:
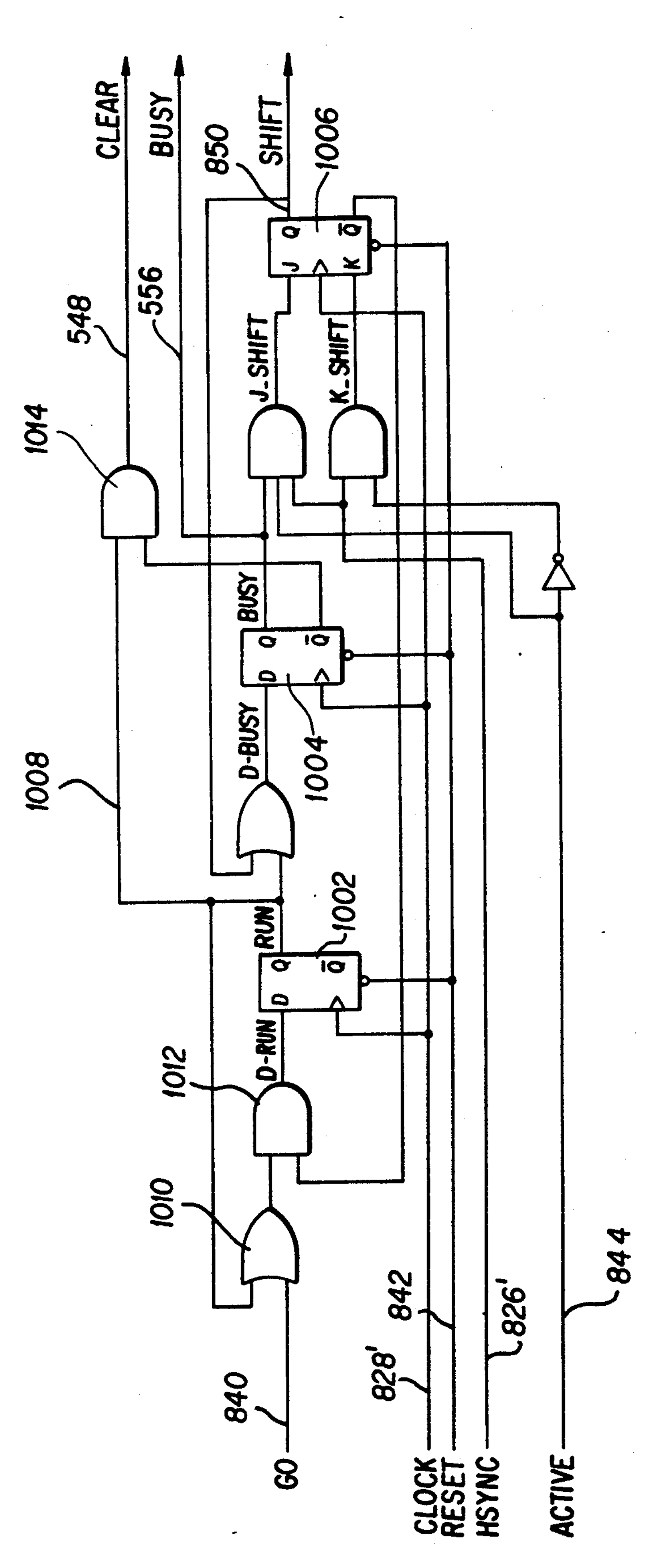
FIG. 10 is a logic diagram of the hardware state machine used to control visual display signal capture regarding the video signature analyzer (VSA) sub-system of FIG. 8.

Reset of hardware state machine 804, designated as a reset state 1304, is accomplished by SMP 502 pulsing reset signal 842. Referring to FIG. 10 and FIG. 12, a pulse of reset signal 842 results in a hardware reset of 'RUN' flip-flop 1002, 'BUSY' flip-flop 1004, and 'SHIFT' flip-flop 1006 SMP 502 checks the state of busy signal 856 to ensure it goes false, indicating a successful reset of hardware state machine 804. Busy signal 856 is read by SMP 502 after SMP 502 latches it to SMP-bus 510 by means of Rd_busy signal 838. If busy signal 856 has not gone false within a fixed period of time, an error condition is assumed and the process is terminated with an error indication. Once reset, hardware state machine 804 enters an Idle state 1306, as shown in FIG. 13.

Reset of firmware state machine 1502 is accomplished by SMP 502 initializing its interrupt service routines state to a state '0' designated as 1504.

Having reset both hardware state machine 804 and firmware state machine 1502, the signature process begins on the next active pulse of GO signal 840. The sequence of states which firmware state machine 1502 executes depends on the portions of visual display screen image to be excluded from its representative signature. For example, if the starting line of the visual display screen image is greater than 0% and the stopping line is less than 100%, then a middle portion of the visual display screen image forms the representative signature and firmware state machine 1502 moves through certain appropriate states (shown in FIG. 15). In other words, if the representative signature is to include the entire image displayed on the visual display screen, firmware state machine 1502 is started and stopped by VSYNC Interrupt signal 824' and the state sequence is 0-1-2, shown in FIG. 15. If the start line is not at 0% (for example, a portion of the top of the visual display screen is set to be excluded), then state 3 is entered and counter 808 is loaded with the proper number of scan lines to be skipped. When counter 808 reaches zero, state 4 is entered, shown as 1510, and visual display signal capture is started. If the stop scan line is not 100% (for example, a portion of the bottom of the video display screen is set to be excluded), then either state 1 or state 4 sets up counter 808 to interrupt at the start of the desired portion to be excluded.

Referring to FIGS. 10 and 12, while GO signal 840 is active and 'SHIFT' flip-flop 1006 is reset (two signals combined by an AND gate 1012), 'RUN' flip-flop 1002 is latched, activating a Run signal 708, on the next rising edge of Clock signal 828'. Feedback from Run signal 708 is provided to keep 'RUN' flip-flop 1002 from responding to a GO signal 840 pulse while hardware state machine 804 is in any state other than Idle 1306. GO While Run signal 708 is active and before the next rising of Clock signal 828' or while 'BUSY' flip-flop 1004 is reset (two signals combined by an AND gate 1014), Clear signal 848 is asserted. While Clear signal 848 is asserted, the contents of shift register 802 are cleared to a known state of zeros. On the next rising edge of Clock signal 828' while Run signal 708 is active, 'BUSY' flip-flop 1004 is latched, activating Busy signal 856.

Upon assertion of Busy signal 856, Clear signal 848 is deasserted by 'BUSY' flip-flop 1004 and hardware state machine 804 enters a Wait state 1308.

Referring back to FIG. 14, main visual display signal capture routine 1402 enters a Timeout state 1408 where it waits for hardware state machine 804 to respond to Initialize and Begin sequence 1406. Such a response is denoted by assertion of Busy signal 856. If Busy signal 856 is not asserted within a fixed timeout period, designated 1408, main visual display signal capture routine 1402 assumes an error condition and returns to main SMP 502 code, designated 1418.

Upon assertion of Busy signal 856, main visual display signal capture routine 1402 exits its initialization loop, designated by 1406, and begins a visual display signal capture loop shown as 1412 and 1414. At this point, firmware state machine 1502 awaits the beginning of the next visual display screen image indicated by the rising edge of VSYNC signal 824'.

As mentioned above, firmware state machine 1502 asserts Active signal 844 (for example, starts visual display signal capture) depending on the areas of the visual display screen image to be excluded. In any case, assertion of Active signal 844 by SMP 502, while Busy signal 856 is asserted, initially sets the 'J' input of 'SHIFT' flip-flop 1006. In this state, hardware state machine 804 is considered to be in an 'ARM' state designated as 1310 in FIG. 13. Shift signal 850 is asserted on the next pulse of HSYNC signal 826' while Busy signal 856 and Active signal 844 are asserted. While Shift signal 850 is asserted, hardware state machine 804 is considered to be in a Run state, designated 1312 in FIG. 13. While in Run state 1312, the visual display signals are shifted through shift register 804.

During visual display signal capture, Shift signal 850 remains asserted until the first rising edge of HSYNC signal 826' after Active signal 844 is deasserted. The resultant signature generated from the visual display signals is the resultant 24-bit digital data within shift register 804 when Shift signal 850 is deasserted.

The final states of firmware state machine 1502, states 2 and 5, designated as 1508 and 1514 respectively, shut down hardware state machine 804, disable any further VSYNC or counter interrupts, and signals main visual display signal capture routine 1402 when Busy signal 856 is deasserted (shown in FIG. 14).

As a fail-safe mechanism, a second timer on-board SMP 502 runs while visual display signals are being captured, and signature generated. If this second timer expires before a signature is reported as done, an error is assumed, the entire process shuts down, and an error message is issued.

One clock period after Shift signal 850 is deasserted, Busy signal 856 is deasserted indicating the visual display signals have been captured. If Busy signal 856 is not deasserted within a fixed period of time after Active signal 848 is deasserted by SMP 502 an error condition is assumed and the process is terminated with an error indication.

Once Busy signal 856 is deasserted, SMP 502 reads the signature from shift register 602 as a 24 bit (6 hex digit) value, designated by 1416 in FIG. 14. A signature is read from shift register 802 in three eight-bit transfers onto SMP-bus 510. Each eight-bit Byte, a Lo-byte, Mid-byte, and Hi-byte is read by SMP 502 off of the data bus of SMP-bus 510. SMP 502 executes this read by asserting Rd_Lo signal 813, Rd_Mid signal 815, and Rd_hi signal 817 control signals respectively.

At the completion of the signaturing process, SMP 502 can either pass the signature back to Host 138 or compare it against a list of valid signatures downloaded from the Host 138.

3. The Keyboard/HP-HIL Emulator

As discussed above in the General Overview of the Hardware and Firmware section, KHE 506 contains the hardware devices and firmware routines necessary to emulate various input device signals. These device signals are then provided to the input device ports of SUT 108 via input cables 410. The structure of KHE 506 sub-system is shown in detail in FIG. 161.

a. Hardware

KHE 506 is essentially comprised of commercially available HP-HIL devices and is directly driven by driver firmware on-board SMP 502. In a preferred embodiment of the DVPU 124, KHE 506 is capable of emulating HP-HIL device signals and the personal computer industry standard DIN interface protocol.

By way of example and not limitation are the HP-HIL and DIN interface protocols implemented in a preferred embodiment of the DVPU 124. It is noted that other embodiments may include the necessary hardware and firmware to accommodate various other input devices.

Figure 16:
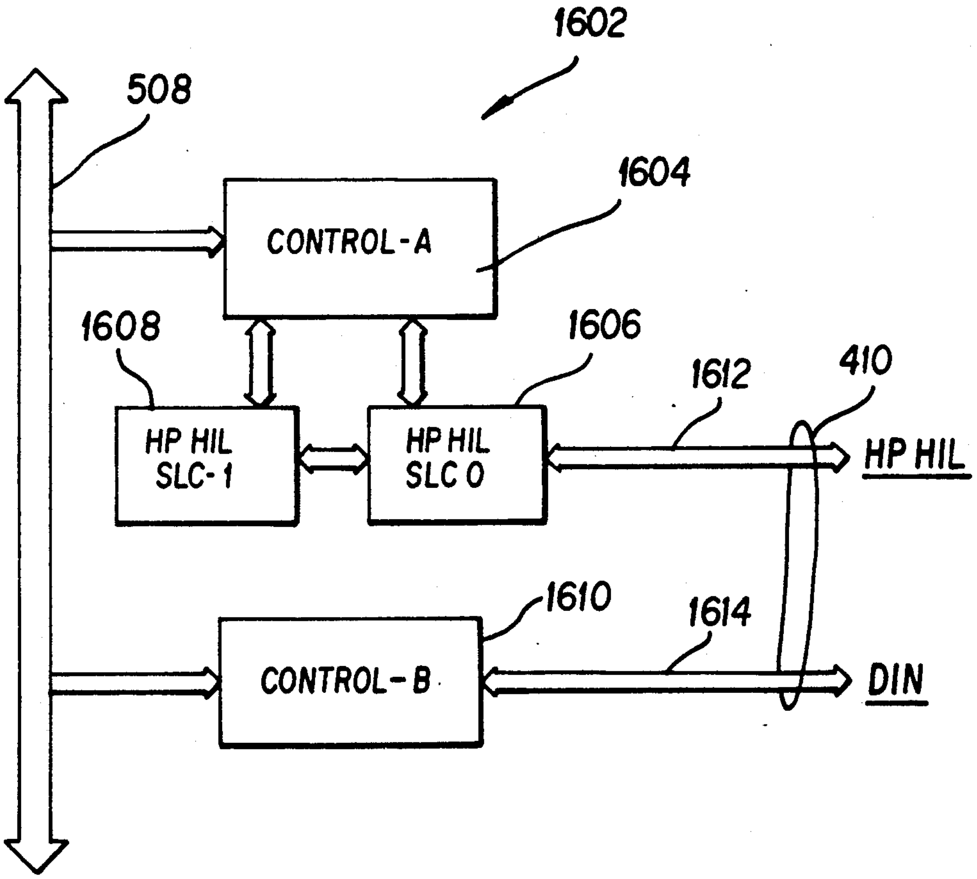
FIG. 16 is a block diagram of the keyboard/HPHIL emulation (KHE) sub-system.

Referring now to FIG. 16, in a preferred embodiment, the HP-HIL interface of KHE 506 comprises a control-A 1604, a HP-HIL SLC-1 chip set 1608, a HP-HIL SLC-0 chip set 1606, and an interface cable 1612.

Control-A 1604 contains the commercially available HP-HIL devices which transfer data between SMP 502 via SMP-bus 510 and the HP-HIL individual device driver chip sets referred to herein as HP-HIL SLC-1 1608 and HP-HIL SLC-0 1606. Control-A 1604 interprets the data to be sent to the input device ports of SUT 108 and conveys it to the appropriate HP-HIL device driver to be further processed and conveyed to SUT 108 as recognizable signals from an appropriate input device such as a mouse, touch screen, tablet, etc.

A control-B 1610 likewise contains commercially available hardware which is responsible for interfacing data from SMP 502 via SMP-bus 510 with a DIN interface port of SUT 108. In other embodiments this port may be multiplexed via additional hardware to emulate other DIN devices—such as PS/2 style DIN mouse.

b. Communication

Input data sent from the Host 138 to the KHE 506 is a series of keystrokes in either of the following formats:

*J<nn>[<mm><kk>]+<cc> CR

*K<nn>[<ww><mm><kk><pp>]+<cc>CR where

* is the record start mark

<nn> is the record length

<ww> is the wait time before the key is pressed

<mm> is the shift modifier

<kk> is the keycode

<pp> is the key press time

<cc> is the checksum of the record

+ is [. . . ] one or more times.

The time parameters are either explicitly given with the *K command, or are implicit (using the default values) with the *J command.

The keycode is a "generic" code which is translated by KHE 506 into proper code for the keyboard that is being emulated. The time that the key will be pressed or wait is determined by the formula $$\text{time}=(t+1)^*32 \text{ ms},$$

where:

$t$ is <ww> or <pp> which offers a range of 32 ms to 8.192 seconds. The shift modifier is a byte with the following bit assignments:

| 7 | 6 | 5 | 4 | 3 | 2 | 1 | 0 |
|---|---|---|---|---|---|---|---|
| R | L | LA | LC | LS | RA | RC | RS |

where a 1 in a bit position has the following meaning:

R—Raw mode. Keycode passed untranslated.

L—Last key. Keycode ignored. Use to reset shifts.

LA—left ALT pressed

LC—left CTRL pressed

LS—left SHIFT pressed

RA—right ALT pressed

RC—right CTRL pressed

RS—right SHIFT pressed

In a preferred embodiment, as each key command is processed the last shift state is compared to the new shift state. Shifts that were "pressed" for the last key and are still pressed for the new key are left "pressed". Shifts that were pressed but are not for the new key are released. Shifts that were not pressed but are for the new key are pressed. These are processed in a left to right manner across the bits of the modifier byte.

The "Last-key" bit causes only shift key codes to be sent.

Figure 17:
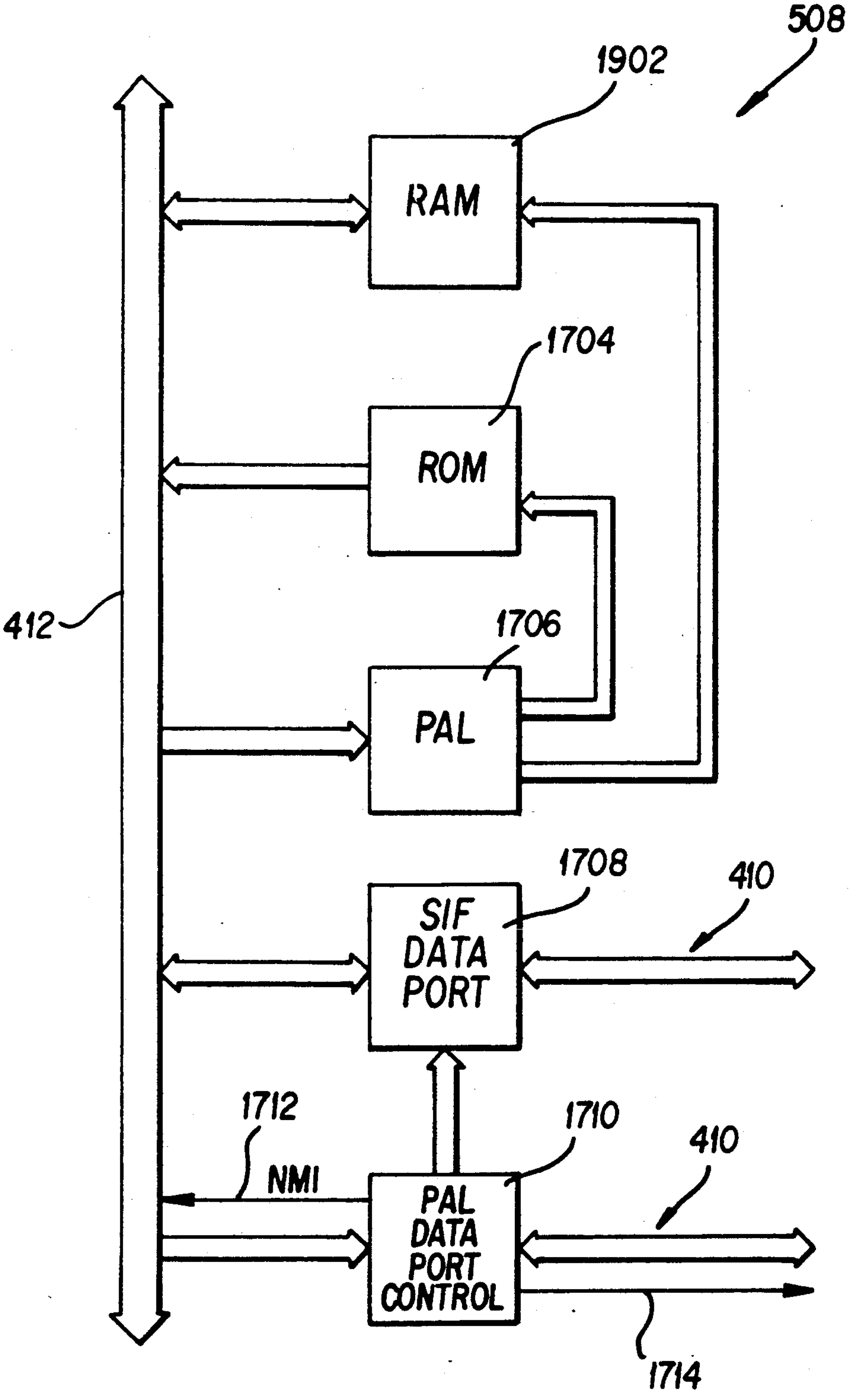
FIG. 17 is a block diagram of the System Under Test Interface (SIF) sub-system showing memory, address decoding and interface ports.

The data sent from Host 138 to KHE 506 for HP-HIL or devices other than the keyboard is in the following format:

*H<nn>
<d>[<xxxx><yyyy><bb>]+<cc>CR where
* is the record start mark
<nn> is the record length
<d> is the device code
<xxxx> is the x value
<yyyy> is the y value
<bb> is the button value
<cc> is the record checksum
+ is [. . . ] one or more times 4. The System Under Test Interface SIF 508, shown generally in FIG. 5 and in detail in FIG. 17, is essentially an interface port providing a communication path between the DVPU 124 and SUT 108. Advantageously, in a preferred embodiment of the DVPU 124, the backplane of SUT 108 is accessed via edge connector 412 of the DVPU 124. This access in the preferred embodiment allows for a parallel communications port between the processors of the DVPU 124 and SUT 108. SIF 508 is a peripheral to SUT 108 residing in its backplane in conformance with standard IBM/PC Input/Output (I/O) protocol. Both memory and I/O devices are present in SIF 508.

a. SIF Hardware

In a preferred embodiment, SIF 508 is an 8-bit bidirectional port with provisions for generating an interrupt to either Host 138 or SUT 108 when written to by the other. For example, in SUT 108, the interrupt can be either a nonmaskable interrupt (NMI) or any of the interrupt (INTRn) lines of the SUT backplane.

In a preferred embodiment, SIF 508 occupies a 16K byte portion of SUT 108 memory space. Jumpers are provided on the DVPU 124 which are read during initialization of SUT 108, and move SIF 508 memory block to any of 8 different locations. Moving SIF 508 memory block to different locations within SUT 108 memory space avoids potential conflict with any other accessory boards which may be within SUT 108. The first 8K bytes of SIF 508 address space is a ROM 1704 and the second 8K bytes is a RAM 1702. In a preferred embodiment, a 27128 EPROM is used as ROM 1704. Although the 27128 is a 16K byte EPROM, a jumper is provided to allow either the first or second half to be active. In this way, two different programs in ROM 1704 may be selected.

Advantageously, since SIF 508 is implemented as an 8-bit port, a fixed minimum number of WAIT states are generated by SUT 108 backplane state machine. This allows 300 ns parts to be used on SIF 508 if desired.

In a preferred embodiment, RAM 1702 is implemented with either 2K byte or 8K byte static parts. A jumper is provided on the DVPU 124 which is set according to which part is installed.

The starting address of the ROM 1704 and RAM 1702 can be set by jumpers so that it does not conflict with other hardware in the SUT 108. ROM 1704 is at offset 0 in the segment selected by the jumpers. RAM 1702 is at offset 2000H (8K) in that segment. The eight different selectable address space locations include those shown in Table 2.0 below.

TABLE 2.0

| ROM/RAM Address Selection | |
|---|---|
| ROM 1704 address space (8K) | RAM 1702 address space (8K) |
| C000:0000 - C000:1FFF | C000:2000-C000:3FFF |
| C400:0000 - C400:1FFF | C400:2000-C400:3FFF |
| C800:0000 - C800:1FFF | C800:2000-C800:3FFF |
| CC00:0000 - CC00:1FFF | CC00:2000-CC00:3FFF |
| D000:0000 - D000:1FFF | D000:2000-D000:3FFF |
| D400:0000 - D400:1FFF | D400:2000-D400:3FFF |
| D800:0000 - D800:1FFF | D800:2000-D800:3FFF |
| DC00:0000 - DC00:1FFF | DC00:2000-DC00:3FFF |

Address selection is implemented with a commercially available Programmable Array Logic device (PAL), designated 1706, which executes the address decoding and selects the appropriate address space within ROM 1704 and RAM 1702.

It is noted that SIF 508 memory size and location within SUT 108 memory space is defined with respect to an IBM/PC or compatible as the SUT. Other embodiments may choose any substantially equivalent memory size and address locations to achieve substantially equivalent results.

In a preferred embodiment, ROM 1704 contains SIF code which is installed during the MS-DOS boot sequence of SUT 108. Normal installation of SIF 508 firmware takes over the NMI interrupt vector (0000:0008), shown as a NMI interrupt signal 1412. Any NMI not generated by a write to an SIF data port 1708 is passed along to the normal NMI routine within SUT 108.

RAM 1702 is used as a stack and scratch by SIF 508 firmware. Other than the return address and flags pushed onto SUT 108 system stack when a NMI occurs, SUT 108 system memory is not used by the DVPU 124. Thus, the DVPU 124 maintains a virtually transparent system to any application running on SUT 108.

SIF 508 operates as a series of I/O ports between the DVPU 124 and SUT 108. Within SIF 508 I/O space are six ports. Each port is accessed by address decoding. The address decoding or I/O port access is also implemented with a commercially available Programmable Array Logic (PAL) device located within a PAL Data Port Control 1710. The I/O ports addresses are within the range IBM has reserved for prototyping cards. This range is 300H-31FH. SIF 508 I/O ports can be located in any one of 4 ranges of 8 contiguous addresses: 300H-307H, 608H-30FH, 310H-317H, 318H-31FH. If another address range is desired, the address decode PAL within PAL Data Port Control 1710 can be reprogrammed.

The six input/output data parts of SIF 508 include: a STATUS PORT, a ID PORT, a SCRATCH PORT, a TX DATA PORT, a RX DATA PORT, and a CONFIGURATION JUMPERS PORT. The ports are address decoded by PAL Data Port Control 1710 and are located within the reserved memory address space for prototyping cards on SUT 108.

The STATUS PORT and SCRATCH PORT are located at the same address. The two most significant bits at that address make up the STATUS PORT which pertain to the state of the TX and RX DATA PORTS. The less significant six bits at that address space are utilized as the SCRATCH register.

The ID port is a hardwired data port addressed by SUT 108 which identifies the DVPU 124 board. TX and RX DATA PORTS or registers comprise the communication path between SUT 108 and the DVPU 124. TX and RX DATA PORT flags are set when the port is written to. The flags are cleared when the port is read and are utilized as the handshake between SIF 508 and the DVPU 124. Bit 6 of the SCRATCH register is SUT 108 interrupt enable. Writing a one to this port enables the NMI or IRQ interrupts. Writing a zero to it disables them.

Whenever data is written into the RX DATA register, an interrupt is generated to SUT 108. This is normally NMI interrupt signal 1412. The NMI interrupt can be disabled by a jumper and the IRQ interrupt lines selected. The IRQ line that is used is selected by a set of jumpers.

SIF 508 firmware locates the DVPU 124 board by doing writes to the SCRATCH register and reads from the ID register and the STATUS register. The board is found when the DVPU 124 board ID can be read correctly after a write to the SCRATCH register and the SCRATCH register is intact. The choice of these addresses should not have any harmful effects.

The JUMPERS CONFIGURATION PORT contains eight jumpers and is read by SUT 108 during initialization at power-on or boot time. This port can be used for various purposes by the SIF firmware.

Power-up state of the SIF is with the scratch register cleared to zeros (thereby disabling interrupts to SUT 108), the RX Data_Register_Full and the TX Data_Register_Full flags cleared to zero, and the state of the RX_Data and the TX_Data registers unknown.

b. SIF Firmware

SIF 508 firmware installs itself during the power up or boot sequence and contains routines which perform self tests and determine what type of visual display device is present with SUT 108. The routines for doing screen dumps are contained in this firmware, as is a loader.

All of the major routines in controlling each processor are accessed via a jump table set up in RAM. In this way, any of them can be patched by substitution of new RAM-based code.

It is noted that in other embodiments of the DVPU 124 (that is, other than the IBM/PC implementation) implementation at SIF 508 data I/O parts require system specific modifications.

III. THE SYSTEM UNDER TEST

As indicated above, the System Under Test includes a visual display device 126, an SUT Computer 128, and at least one software application 130. Also as indicated above, a preferred embodiment for the SUT computer 128 is an IBM PC or compatible.

Those portions of the SUT 108 which are not actually used to test hardware or software are not considered part of the present invention. These portions vary with the application of the present invention. For example, if the SUT computer 130 is being used to test a software application, but not vise versa, then the software application 130 is not part of the present invention. If, however, a software application 130 is being used to test an SUT computer 128 and not vise versa, then the SUT computer 130 is not part of the present invention.

With regard to the visual display device 126, a preferred embodiment of the DVPU 124 expects the following digital signals from the visual display device 126: a dot-rate clock, an H-synch signal, a V-synch signal, and a plurality of digital video data stream lines. Any visual display device 126 which outputs these types of signals can be used with the DVPU 124. It should be understood, however, that other embodiments of the DVPU 124 are contemplated by the present invention which would not require the visual display device 126 to generate the exact above-noted digital signals.

In a preferred embodiment, microcomputer-related adapters are contemplated for use as the visual display device 126. Examples of such types of video adapters are CGA, EGA and VGA adapters. Any appropriate visual display screen can be used in conjunction with these video adapters. Again, it should be noted that it is not necessary for the operation of the present invention for there to be a visual display screen attached to the SUT 108.

IV. VIDEO ADAPTER-DVPU INTERFACE

In a preferred embodiment, the visual display signals are directly captured from the visual display device 126 by the DVPU 124. In general, any type of suitable connection medium can be used to connect the visual display device 126 with the DVPU 124. In a preferred embodiment, a 14 pin ribbon cable is used.

V. INPUT DEVICE—DVPU INTERFACE

The present invention requires a connection between the DVPU 124, and the appropriate input device inputs on the SUT 108 in order for the DVPU 124 to emulate various input devices as described above. For example, if a keyboard and a mouse are contemplated for use as input devices in conjunction with the present invention, then connections must be made between the DVPU 124 and the inputs in the SUT computer 128, which are normally designated for direct input by a mouse, and by a keyboard. Accordingly, it should be understood that in a preferred embodiment of the present invention, the actual input devices being emulated are not directly connected to the SUT 108, since the signals of these devices are emulated by the DVPU 124.

In a preferred embodiment, a single connection for all emulated input devices can be made from the DVPU 124, which then branches off to each of the input connections on the SUT 108, as shown by the input cables 410. For example, a single connection would be made to the DVPU 124, which would then branch off into the mouse and keyboard input connections of the SUT 108.

A preferred embodiment of the above-noted connection encompasses Hewlett Packard HP/HIL bus architecture as well as the necessary control circuitry for DIN keyboard devices, as discussed above.

VI. DVPU—HOST INTERFACE

In a preferred embodiment, data communications between the Host 138 and DVPU 124 are implemented used the industry-standard RS232 serial data communications. Thus, the Host 138 has an RS232 serial datacomm port through which data communications is sent to the DVPU 124 through the DCLS module 2020 (as will be shown in FIG. 20).

VII. THE HOST

A General Overview Of The Host

In a preferred embodiment, the host 138 comprises a host computer 122, software modules 104 executing thereupon, input devices 10 connected to the host computer 122, and a storage mechanism preferably comprising a test script file 102 and a signature file 106. The host computer 122 is preferably an IBM PC or compatible, but virtually any computer capable of executing a computer program and interacting with an outside device can be used.

The other constituents of the host 138, particularly the software modules 104, are discussed below. It should be understood that the software modules 104 are executed using the host computer 122, although for purposes of clarity the host computer 122 is not mentioned in the discussion of the software modules 104. Also for the purpose of discussion of the software modules, the SUT 108 and DVPU 124 will be discussed as a single unit, known as the DVPU/SUT 1812.

As indicated above, the primary modes of the software modules are the Record Mode and the Playback Mode. There is also a Regeneration Mode, which is discussed toward the end of this section.

Figure 18:
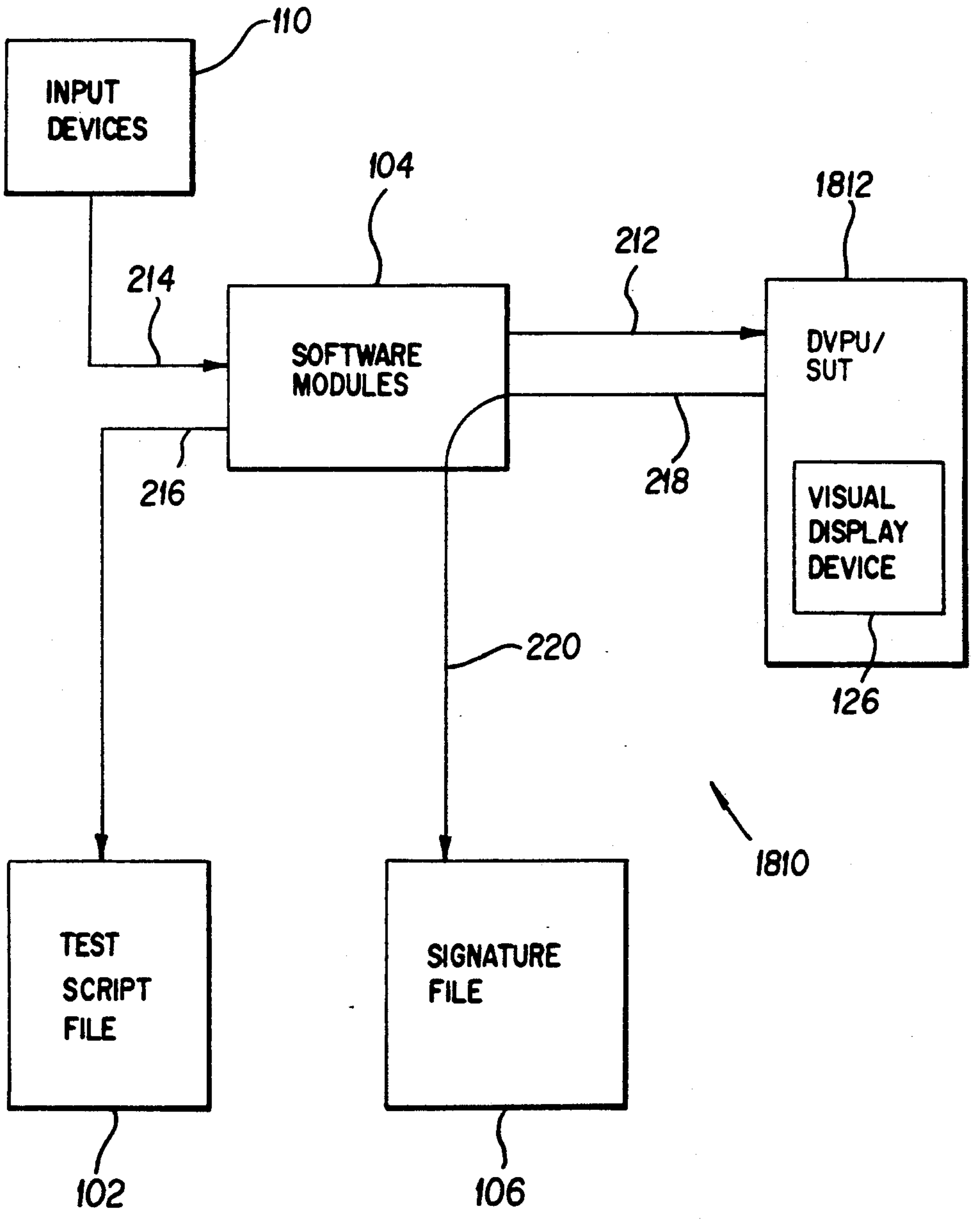
FIG. 18 is a block diagram of the Record Mode of the regression testing software.

The basic operation of the Record Mode is shown in FIG. 18. In the Record Mode 18101, the user (not shown) enters the composite data into the software modules 104 using one or more input devices 10 (for example, a keyboard 2108 or a pointing device 21101, as shown in FIG. 4). As is shown in FIG. 18, the composite data travels from the input devices 110 to the software modules 104 via path 214. As indicated above, this composite data can include special DVPU/Host commands, comments (which are inserted into the stored composite data), and input data (which is generally anything which is not a DVPU/Host command or a comment).

Once the software modules 104 have received composite data from one of the input devices 10, the composite data (minus any comments) is sent to the software application(s) 130 on the DVPU/SUT 1812 via path 212. As the composite data is received by the software application(s) 30, the visual display device on the DVPU/SUT 1812 responds appropriately (that is, the visual display device responds as if the composite data were entered into the software application(s) 130 directly, without first passing through the software modules 104). In addition to routing the composite data to the DVPU/SUT 1812 along path 212, the software modules 104 also cause the composite data (including comments) to be recorded and stored by directing the composite data along path 216. The stored composite data is referred to as a test script, and is stored in a test script file 102. The test script thus contains a sequence of input data, interspersed with DVPU/Host commands and comments. In a preferred embodiment, the user can designate a name which is to be associated with the test script file 102. In this way, many different test script files 102 can be created.

The most significant of the DVPU/Host commands is the take-signature command. When this command is entered by a user, it is stored in the test script file 102, and is sent to the DVPU/SUT 1812. The DVPU/SUT 1812 is then induced to generate at least one signature, which is then received by the software modules 104 via path 218. The software modules 104 then store the signature(s) by directing it along path 220. The file in which the signature(s) is stored is referred to as a signature file 106. During the record mode 1810, the user can enter the take-signature command as many times as desired, and each time it causes a signature representative of the present visual display data to be sent to the software modules 104, and stored in signature file 106.

The software modules 104 contemplates the use of virtually any type of input device 10, and thus virtually any type or brand of keyboard, pointer device, etc. In order to accommodate these input devices, it is contemplated in a preferred embodiment of the present invention that the composite data is converted into symbolic data so that a specific representation for a particular character or coordinate is uniform regardless of what input device 110 was used. For example, if the letter "A" were entered using a keyboard 2108, the result would be that a scan code representative of the letter "A" would be received by the software modules 104. However, different keyboards may produce different scan codes representative of the letter A. Thus, the letter "A" would be converted by the software modules 104 into a particular symbolic representation of the letter "A", and that representation wo ıld be the same regardless of the particular keyboard used. It should be understood that the letter "A" or any other composite data can be entered by any number of input devices 110, and converted into symbolic data.

The software modules 104 also contemplate that the software application(s) 130 may produce one or more blinking fields, such as blinking cursors, on the visual display device. The problem with blinking fields is that it is possible for a signature to be generated while the cursor is on, the cursor is off, or some transient state in between.

To represent the signatures most accurately without storing an over-abundance of them, in a preferred embodiment, a single take-signature command causes signatures to be generated a given number of times. The number of signatures generated per take-signature command is set by the user. A determination is then made as to which of the signature states are most prevalent. In a preferred embodiment, a histogram is used for this purpose. Only those most prevalent signature states are stored in the signature file 106. The frequency at which signatures are stored can be set by a user.

For example, in the case of a single blinking cursor, most of the time the cursor is either on or off, while only a small fraction of the time it is in a transient state (i.e. neither completely on nor completely off). Consequently, using a histogram as noted above, only a signature representing the cursor fully on or fully off (each of which, for example, may account for 46% of the captured signatures) is stored in the signature file 106. In a preferred embodiment, the software modules 104 always assumes that there may be blinking fields, and a histogram is always produced.

In addition to storing only the most frequently occurring signature(s), the software modules 104 also have the capability of calling for, and receiving signatures representative of only specific portions of visual display data of the visual display device. In a preferred embodiment, the software modules 104 can be set only to call for, and receive, representative portions of visual display data consisting of specific scan lines of a CRT visual display device. A user sets the first and last scan line to be captured. Consequently, all scan lines between those first and last scan lines are captured and stored in the signature file 106.

Also, the software modules 104 can be set to call for, and receive, signatures representative of only specific planes of the visual display device. For example, in a visual display device which has four planes (for example, red, green, blue and intensity), the software modules 104 can be set to call for, and receive, the signatures representative of only one of the planes (for example, the blue plane).

The software modules 104 executing on the host computer 122 are very versatile, in that they can be used to test software application(s) 130 and hardware ranging from microcomputers to supercomputers. Part of this versatility is attributed to their ability to handle a variety of input devices 110. With specific regard to keyboard input, the software modules 104 have the ability to process keyboard signals which do not send composite data to a keyboard buffer. Example of such non-buffered input occurs when the CTRL or ALT keys are pressed in conjunction with other keys.

The software modules 104 allow for two methods which can be used to generate non-buffered keystrokes. The first is to simply press the key or key-combination on the keyboard (for example, CTRL C). This method can create a problem, however, if there are RAM-resident programs residing on the Host which respond to those non-buffered keystrokes.

In order to avoid conflicts with RAM-resident devices, the software modules 104 allow a second method of entering non-buffered keystrokes, in which certain composite data can be identified by the software modules 104 as representing a particular non-buffered keystroke. In a preferred embodiment, a special sequence of keystrokes can be entered into the software modules 104 using designated marker keys which designate the beginning and end of the special sequence of keystrokes. For example, the marker keys can consist of a "<" key to designate the beginning of the special sequence, and a ">" key to designate the end of the special sequence. Thus, to symbolize the pressing of the Ctrl key followed by the letter C, the user would enter "<CTRL C>". It should be understood that a variety of different combinations of keystrokes could be used to represent the non-buffered keys, and that the input device 10 used to represent these non-buffered keystrokes is not limited to a keyboard 2108.

As stated above, the software modules 104 allow DVPU/Host commands to be entered from an input device 10. To demonstrate a preferred method for entering these DVPU/Host commands, the input of a take-signature command of the present invention is described below. In a preferred embodiment, this DVPU/Host command would be executed by entering "getcrc" into keyboard 2108, and it would be recognized as a DVPU/Host command by the software modules 104 when it is followed and preceded by a "(cmd)". Thus, the form would be {cmd}getcrc{cmd}. It should be understood, however, that the input of DVPU/Host commands is not limited to this specific format, and that a variety of input devices 110 can be used to enter such commands.

In a preferred embodiment, comments can be inserted into the test script file 102 in a manner similar to entering the non-buffered keystrokes. Specifically, a "<COMMENT>" marker would be entered at the beginning and end of each comment. Thus, the format to enter a comment would be <COMMENT>comment text<COMMENT>. In addition, the software modules 104 provide for a similar facility to enter a title-type comment into the test script file 102.

Figure 19A:
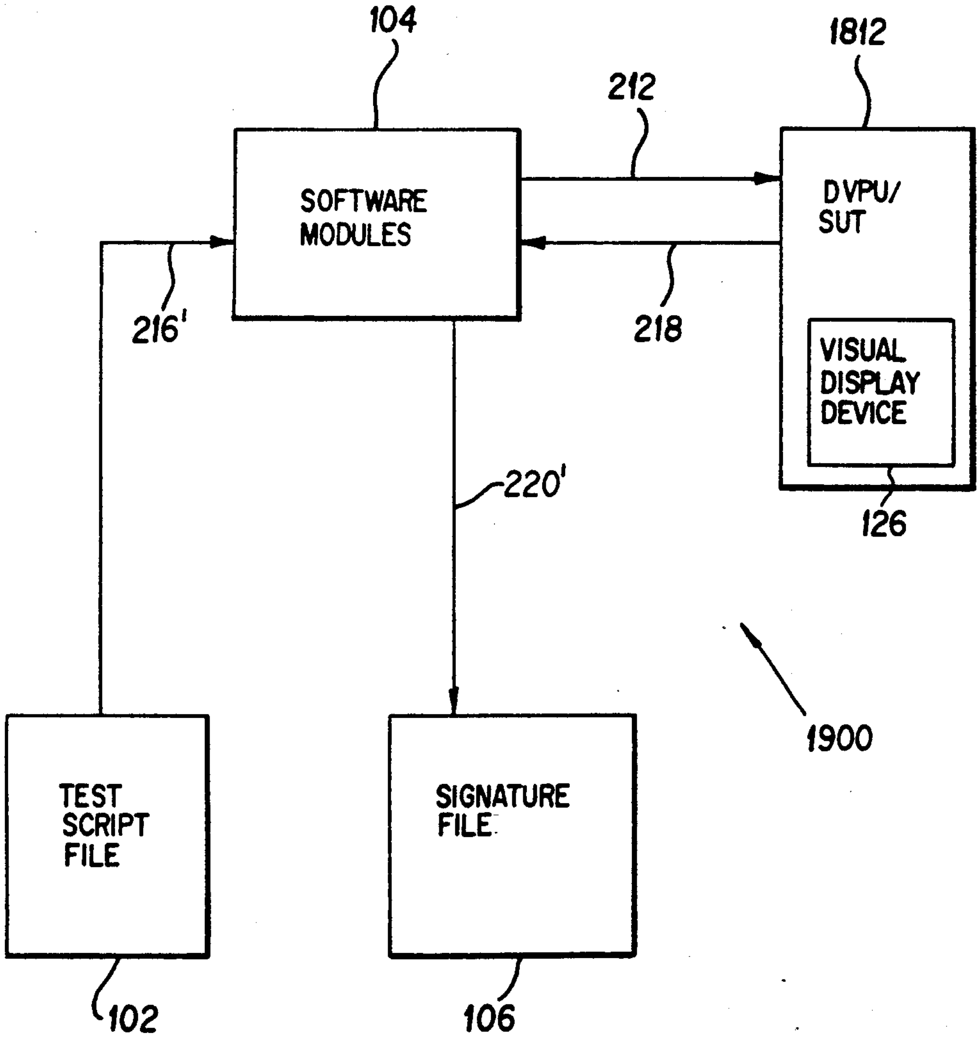
FIG. 19A is a block diagram of the Playback Mode of the regression testing software.

FIG. 19A shows the basic operation of the Playback Mode 1900 of the software modules 104. Referring to FIG. 19A, the software modules 104 read the stored composite data in the test script file 102 via path 216'. This composite data is then sent to the software application(s) 130 residing on the DVPU/SUT 1812 via path 212, in the same sequence as originally entered by the user during the Record Mode 1810 in FIG. 18. If all the hardware and software application(s) 130 work properly, the signatures generated during Playback Mode 1900 should match corresponding signatures generated during Record Mode 1810.

More specifically, when a take-signature command is found in the test script file 102, the software modules 104 send the take-signature command and the associated stored signatures in the signature file 106 to the DVPU/SUT 1812. The stored signatures are read via path 220'. The sending of the take-signature command and associated stored signatures to the DVPU/SUT 1812 by the software modules 104 cause the DVPU/SUT 1812 to generate a new signature, and to compare the new signature with the stored signatures passed by the software modules 104. It should be understood that the software modules 104 contemplate that other items or signals can also be sent by the software modules 104 to the DVPU/SUT 1812 to cause the DVPU/SUT 1812 to compare the new signature with the stored signatures. It should further be understood that the comparison of the signatures can be done by the software modules 104 rather than the remote device.

After comparing the new signatures with the stored signatures, the DVPU/SUT 1812 sends back to the software modules 104, via path 218, an indication as to whether the new signature and at least one of the stored signatures are identical. If none of the stored signatures are identical to the new signature, the present invention indicates to a user that an error has occurred.

It may be desired to replay an existing test script and stored signatures using a different visual display device than the one used to originally create the stored signatures. Rather than having a user enter the composite data all over again to create a new signature file 106 for the new visual display device, a preferred embodiment of the present invention provides for a Regeneration Mode 1950, as shown in FIG. 19B.

Figure 19B:
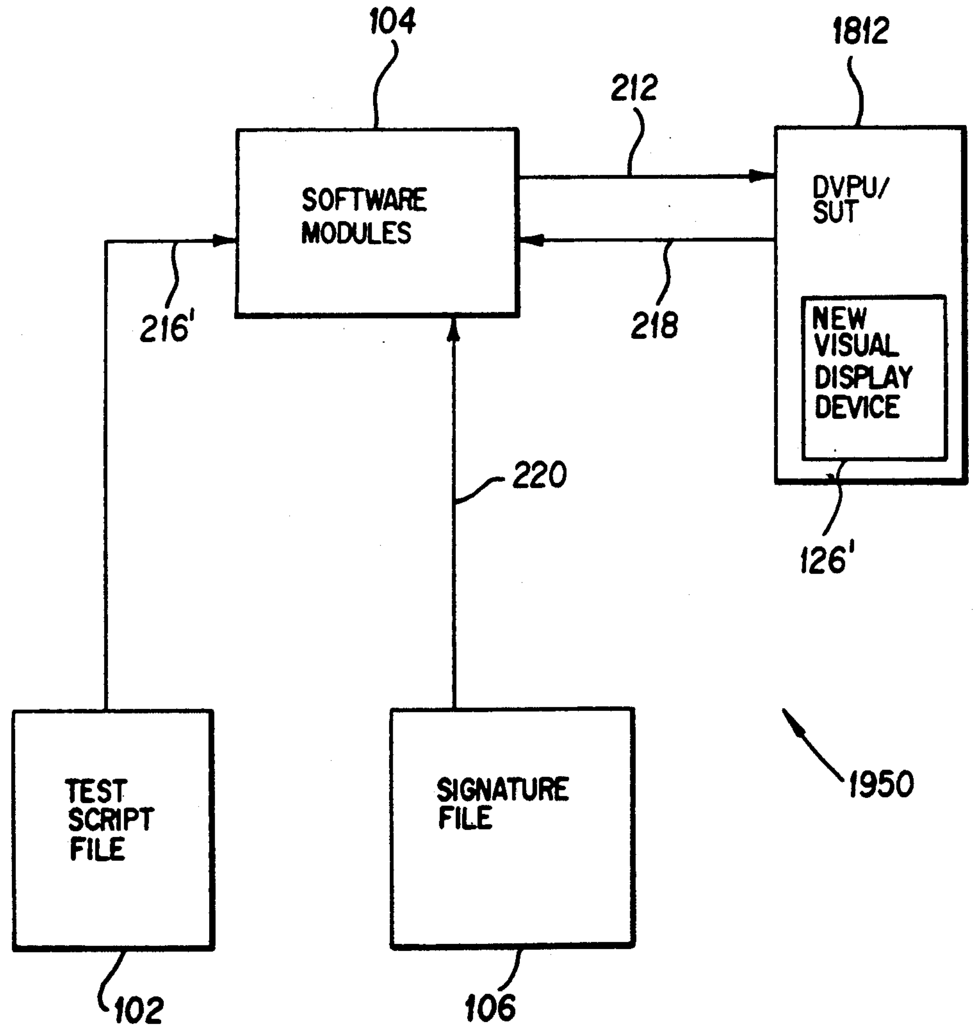
FIG. 19B is a block diagram of the Regeneration Mode of the regression testing software.

Referring now to FIG. 19B, the Regeneration Mode 1950 acts in a similar manner to the Playback Mode 1900, in that composite data from the test script file 102 is sent to the DVPU/SUT 1812 by the software modules 104 via paths 216' and 212. However, no signatures are sent to the DVPU/SUT 1812 from the signature file 106, and the DVPU/SUT 1812 sends new signatures created by the new visual display device to the software modules 104 along path 218. These new signatures, via path 220, can then either replace or be stored separately from the original signatures. The signatures can then be used in Playback Mode 1900 in conjunction with the original test script file 102 to test software application(s) 130 and/or the hardware which is part of the DVPU/SUT 1812. It should be noted that no comparisons of signatures occur during Regeneration Mode 1950.

It should be understood that in a preferred embodiment of the present invention, although the composite data may be in a different format while in different paths of the software modules 104, that it always maintains the same representation throughout. For Example, although the letter "A" may be converted into a symbolic format, it nonetheless maintains its representation as the letter "A." In that sense, the composite data remains consistent throughout the software modules 104.

In addition, it should further be understood that the paths disclosed above comprise a preferred embodiment of the present invention, and that other path configurations could also be used. Also, as used herein, the term "responsive" means that a particular module or step of the invention interacts with or responds to, either directly or indirectly, another module or step of the invention.

B. Architectural Overview

Figure 20:
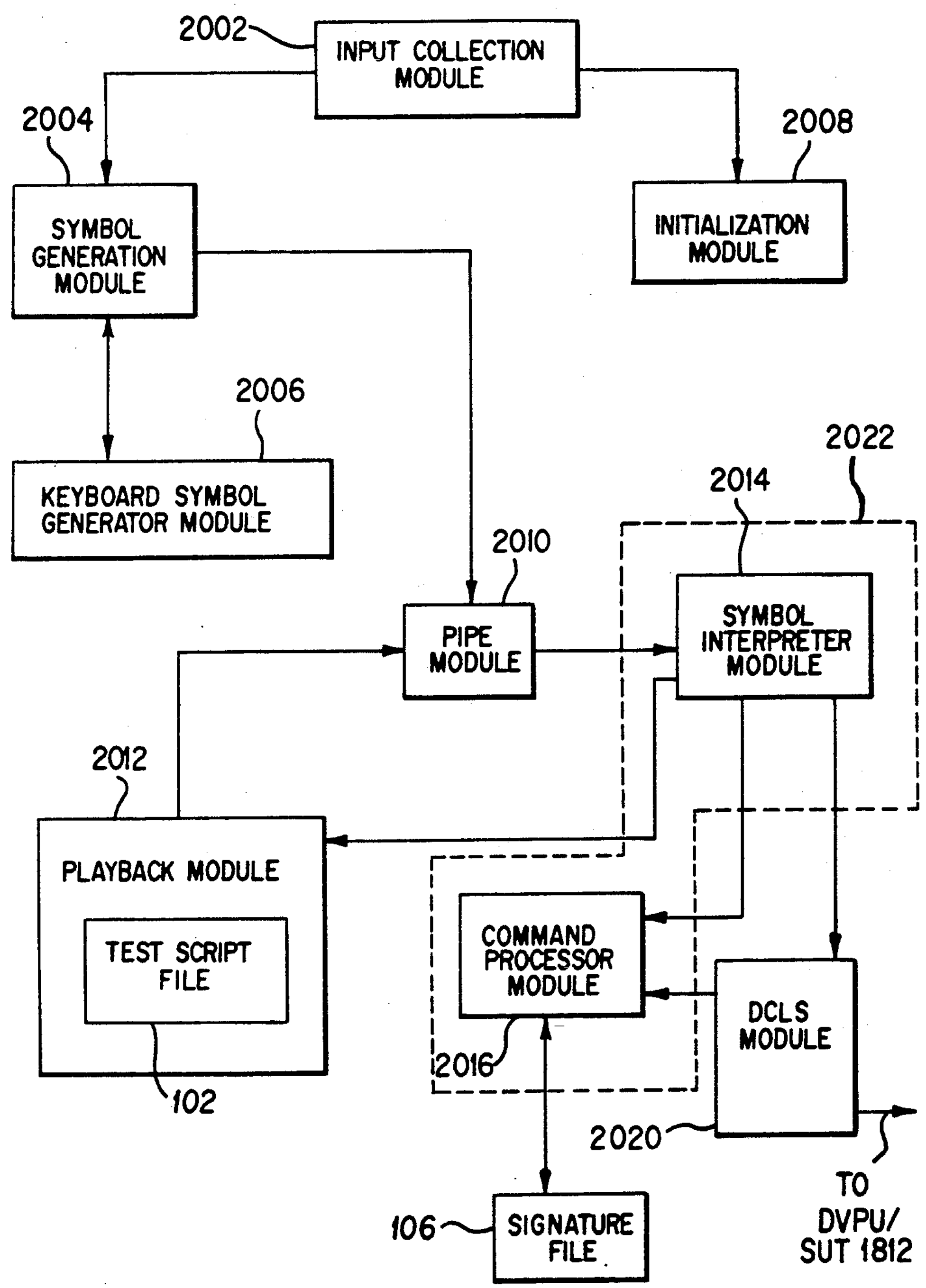
FIG. 20 is a block diagram of the software modules and associated files of the present invention.

An overview of a preferred embodiment of the organization of the software modules 104 is now be described. FIG. 20 is a high level block diagram of the logical arrangement of the software modules 104 and associated files. The arrangement of these software modules 104 is a preferred embodiment, and it should be understood that different arrangements of the modules and their constituent sub-modules can also be implemented.

Referring to FIG. 20, an input collection module 2002 is used to obtain composite data from a user. The input collection module 2002 is capable of obtaining input from any number of input devices 110, including keyboards 21081, a mouse 2110 or other pointer devices, as shown in FIG. 21.

After the composite data has been obtained by the input collection module 2002, it is then sent to a symbol generation module 2004, which determines the type of input device from which the composite data came. If the composite data originated from one of the input devices 10 other than a keyboard 2108, the symbol generation module 2004 converts the composite data into symbolic data. As stated above in the General Overview of the Host section VII(A), this symbolic data provides for a consistent representation of the composite data regardless of which specific input device 10 is used to enter the data.

If the composite data came from a keyboard 2108, then the composite data is directed to a keyboard symbol generator module 2006. The keyboard symbol generator module 2006 takes the composite data from the keyboard, and converts it into symbolic data. In making this conversion, the keyboard symbol generator module 2006 has the ability to convert into symbolic data such "special case" keys as the CTRL and ALT key combinations of various keyboards.

Regarding the embodiment of the software modules 104 discussed above, the input collection module 2002, input distribution module 2004 and keyboard symbol generator module 2006 are modules used during the Record Mode 1810 of the software modules 104. Most of the modules that follow in the description of FIG. 20 are used in all three modes contemplated in a preferred embodiment of the present invention.

After composite data from the input devices 110 has been converted into symbolic data via the keyboard symbol generator module 2006 or the symbol generation module 2004, the composite data (now in symbolic form) is feed into a pipe module 2010 for distribution to a parser 2022. In a preferred embodiment, this pipe module 2010 is necessary when the software modules 104 is running on an operating system which does not have full piping, such as Microsoft DOS. However, in an operating system where full piping is implemented, such as UNIX, the composite data can be piped directly to the parser 2022, without the use of a module such as the pipe module 2010.

In a preferred embodiment, the parser 2022 is a top down recursive descent parser. The functions of this parser 2022 are to determine what type of composite data has been received from the pipe module 2010, and to process this composite data. As stated above, in a preferred embodiment, there are three general types of composite data which the parser 2022 can receive. These three types are DVPU/Host commands, comments, and input data which are neither DVPU/Host commands nor comments (that is, anything else). The parser 2022 checks to see which type of composite data it has received.

In a preferred embodiment, the parser 2022 can be broken up into two main modules, a symbol interpreter module 2014 and a command processor module 2016. The symbol interpreter module 2014 is the portion of the parser 2022 which first receives the composite data from the pipe module 2010, and checks to see which type of composite data it is. It then sends the composite data to the appropriate location depending on its whether the composite data is a command, a comment, or input data.

If the symbol interpreter module 2014 received input data during Record Mode 1810, two events occur. The input data is directed to a DCLS module 2020 (data-communications library set), and it is also directed to a test script file 102 in a playback module 2012 to be later used during Playback Mode 1900. During Playback Mode 1900 or Regeneration Mode 1950, the input data is sent only to the DCLS module 2020.

Upon receiving input data, the DCLS module 2020 sends the input data to the software application(s) 130 residing on the DVPU/SUT 1812. The DCLS module 2020 is the interface module which links the software modules 104 with the DVPU/SUT 1812. All communications between the DVPU/SUT 1812 and the software modules 104 involve the DCLS module 2020.

If the symbol interpreter module 2014 receives a comment, this comment is also directed to the test script file 102 of the playback module 2012. The comment is not sent to the DVPU/SUT 1812, and is only used to allow a user to document the contents of the test script file 102 so that the file can later be analyzed and understood. It should be noted that comments are not used by the software modules 104 during Playback Mode 1900 or Regeneration Mode 1950.

Upon receipt of a DVPU/Host command by the symbol interpreter module 2014, the command is passed to a command processor module 2016. The command processor module 2016 then processes the command passed to it, along with implementing any associated parameters. For those DVPU/Host commands which control the DVPU/SUT 1812, the command processor module 2016 generates appropriate signals to be sent to the DVPU/SUT 1812.

Regarding the processing of the take-signature command, the command processor module 2016 passes the take-signature command to the DVPU/SUT 1812 via DCLS module 2020. During the Record Mode 1810, the command simultaneously is stored in the test script file 102. During the Record Mode 1810 and Regeneration Mode 1950, the DVPU/SUT 1812 then passes the signatures back to the command processor module 2016, and the signatures are then stored in the signature file 106.

When the take-signature command is stored in the test script file 102, a take-signature command marker is stored with it. The purpose of the take-signature command marker is to identify which take-signature command may have caused an error (an error being when a comparison during Playback Mode 1900 between the stored signatures and new signature failed).

In a preferred embodiment of the present invention, the signals sent to the DVPU/SUT 1812 are confirmed by the DVPU/SUT 1812 as having been received. In one embodiment, the DVPU/SUT 1812 sends the DCLS module 2020 an ASCII "+" if the transmission was properly received, and a "−" if it was not properly received. The receipt of a "−" causes the DCLS module 2020 to re-transmit the signal, and/or cause an error message to be generated.

In the Playback Mode 1900, the playback module 2012 takes the composite data in the test script file 102, and sends it to the pipe module 2010, which then sends the composite data to the parser 2022. As noted above, this test script file 102 contains keystrokes, pointer movements, etc., as well as DVPU/Host commands, all of which are in symbolic format. Thus, regarding the format of the data, the parser 2022 need not be concerned as to which mode the software modules 104 is running, since the input received is in the same symbolic format regardless of the mode. Of course, the parser 2022 processes the composite data differently in certain respects during Playback Mode 1900 as opposed to Record Mode 1810. For example, input data received by the parser 2022 during Playback Mode 1900 is not stored again in the test script file 102, as would occur during Record Mode 1810.

As indicated above, input data received by the parser 2022 is sent to the DVPU/SUT 1812. This causes the software application(s) 130 to function as though a user were directly entering the input data to the DVPU/SUT 1812 without routing it through the software modules 104. During Playback Mode 1900, when the parser 2022 receives a take-signature command, the command processor module 2016 is directed to read the appropriate signature(s) in the signature file 106 (that is, those signatures that were originally obtained during the input of that particular take-signature command), and to send those signature(s) to the DVPU/SUT 1812. The DVPU/SUT 1812 then generates a new signature representative of the visual display data presently residing on the visual display device, and compares the new signature with signature(s) sent to the DVPU/SUT 1812. The DVPU/SUT 1812 then sends the results of the comparison back to the DCLS module 2020 of the software modules 104.

In addition to a single test script file 102, an initialization module 2008 containing pre-stored composite data can be utilized by the software modules 104 during Record Mode 1810. The purpose of this is to create a set of composite data which is frequently used by a user, typically for initialization purposes during the Record Mode 1810 operations. This means that the user will not have to enter this set of composite data during each Record Mode 1810 session. By entering a DVPU/Host command during the Record Mode 1810, this pre-stored composite data is sent to the DVPU/SUT 1812, and to the test script file 102, just as though the composite data had been directly input by a user. Of course, the pre-stored composite data must first have been previously entered into the initialization module 2008. In a preferred embodiment, this can be accomplished by using the Record Mode 1810 to create a test script file 102. Once created, this test script file 102 can then be used as the pre-stored composite data in a subsequent execution of the Record Mode 1810.

With regard to Regeneration Mode 1950, as discussed in the General Overview of the Host section VII(A) above, this mode 1950 acts in a similar manner to the Playback Mode 1900. The difference is that rather than sending the DCLS module 2020 the results of the comparison, the DVPU/SUT 1812 sends new signatures representative of the visual display data from the new visual display device. These new signatures are stored in a signature file 106.

C Architecture In More Specific Detail

The software modules 104 are now described in greater detail.

FIG. 21 is a more detailed representation of the input collection module 2002 discussed above. Referring to FIG. 21, it is seen that the software modules 104 accepts input from a number of input devices 101, which can include a keyboard 2108, mouse 2110, tablet 2112, and touch screen 214. While these input devices 10 are contemplated in a preferred embodiment of the present invention, it should be understood that any type of input device can be used.

Activation of one of these input devices 10 by a user induces a get input sub-module 2104 to capture the composite data from the input device 10, and to pass the data to the next module of the software modules 104. The get input sub-module 2104 takes care of the details associated with specific input devices 110, so that the other modules of the software modules 104 need not be concerned with these details.

In a preferred embodiment of the present invention, the get input sub-module 2104 itself comprises a plurality of sub-modules, each one designed to process the input signals generated by specific input devices 10. For example, if it were contemplated that a mouse device 210 would be used as one of the input devices 10, then the get input sub-module 2104 would contain a mouse sub-module. Again, it should be understood that any type of input device 10, and associated input device specific sub-module can be used with the software modules 104.

A front module 2106 is the mechanism which activates the get input module 2104 when it receives interrupts generated by an input device 110. When an input device 10 is activated, the front module 2106 determines which input device 10 was activated, and signals the get input module 2104 to receive the appropriate composite data.

Once the composite data has been obtained by the input collection module 2002 (see FIG. 20), the composite data is then directed to the symbol generation module 2004. A more detailed representation of the input distributor 2004 is shown in FIG. 22.

Figure 22:
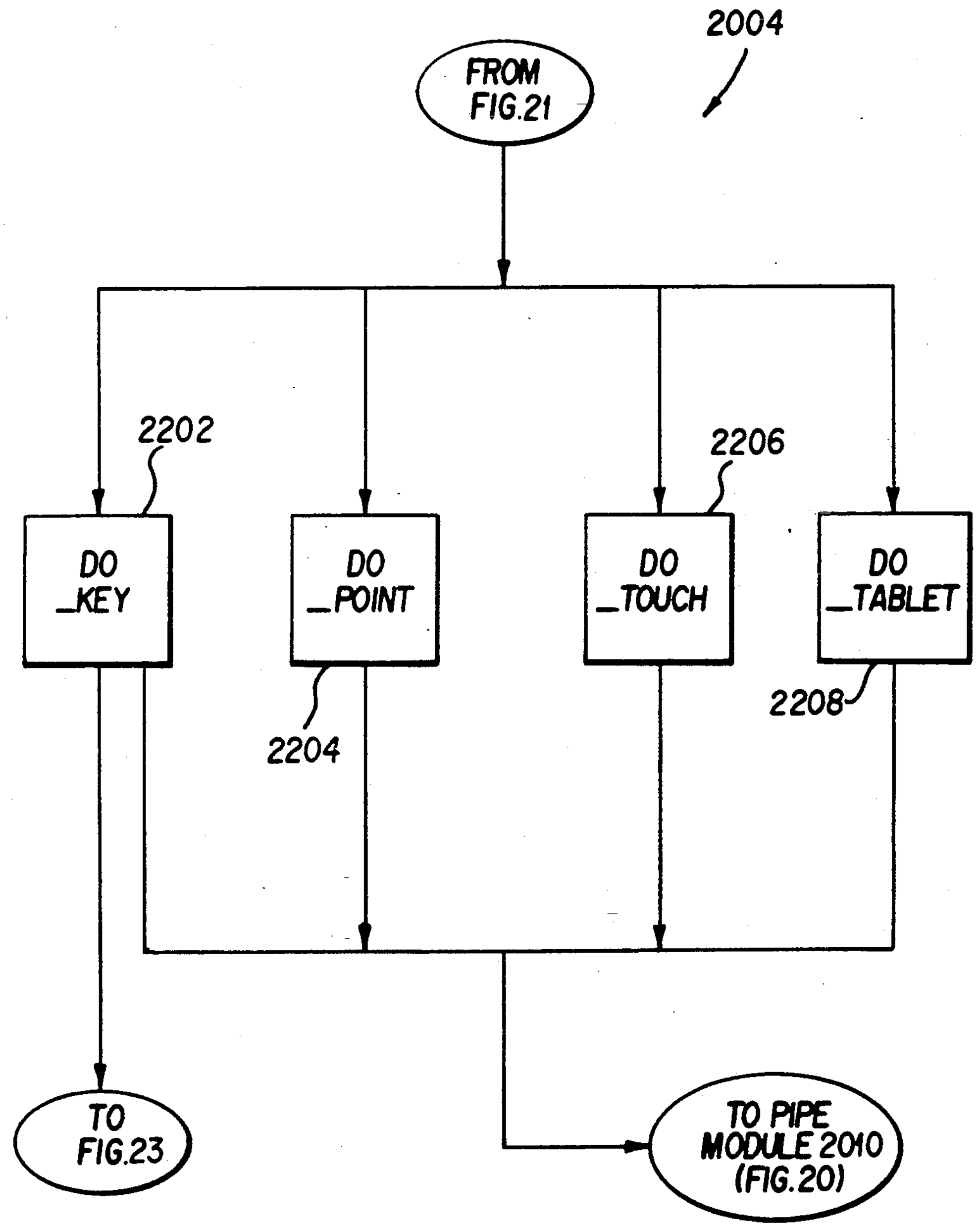
FIG. 22 is a block diagram of the symbol generation module 2004.

Referring now to FIG. 22, depending on the input device 110 (see FIG. 211) from which the composite data originated, one of the do_ sub-modules shown in FIG. 22 converts the composite data into a symbolic format (symbolic data). For example, a do_point module 2204 converts the composite data from a pointer device into symbolic format. Similarly, a do_touch module 2206 converts composite data from a touch screen into symbolic data, and a do_tablet module 2208 converts composite data received from a tablet device such as a digitizer pad into symbolic data. All these do_ sub-modules (2202, 2204, 2206, 2208) shown in FIG. 22 are used in a preferred embodiment of the present invention. It should be understood that any number of do_ sub-modules can be used, the exact number depending upon the number of input devices 110 contemplated for use by the user of the software modules 104.

The composite data is converted into symbolic format so that the data representing a particular event is the same regardless of the type of specific device used. For example, as explained in the General Overview of the Host section VII(A) above, one keyboard may represent the letter "A" with a particular scan code, while a different keyboard may use a different scan code for the same letter. The software modules 104 converts both of those scan codes into the same symbolic data, representative of the letter "A."

In a preferred embodiment, most of the do_ sub-modules do the actual conversion of composite data into symbolic data. The do_key sub-module 2202, however, contains conversion tables for various keyboards for converting the composite data (typically a scan code) from those keyboards into symbolic data. Upon receipt of composite data from a keyboard 2108, the do_key sub-module 2202 sends this composite data along with the appropriate conversion table to the keyboard symbol generator module 2006 (see FIG. 20) for conversion.

Figure 23:
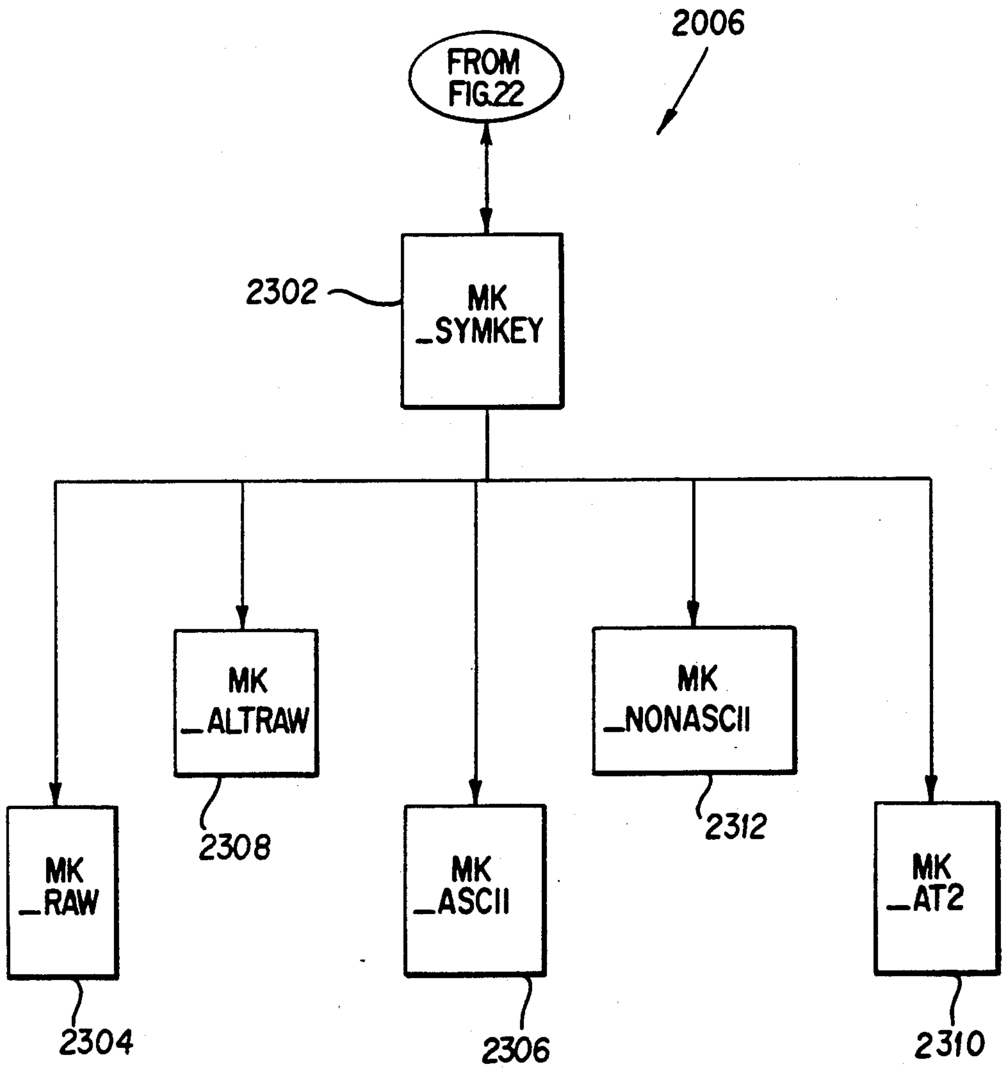
FIG. 23 is a block diagram of the keyboard symbol generator module 2006.

A preferred embodiment of the keyboard symbol generator module 2006 is shown in detail in FIG. 23. This embodiment relates specifically to XT and AT2 microcomputer keyboards manufactured by IBM, and to microcomputer keyboards manufactured by Hewlett Packard. It should be understood that these sub-modules within the keyboard symbol generator module 2006 shown in FIG. 23 represent a preferred embodiment of the present invention, and that other modules can easily be implemented and used if other keyboards are used as input for the software modules 104.

The function of the keyboard symbol generator module 2006 is to process the "special cases" of composite data of various keyboards. A typical example of a "special case" would be control (CTRL) characters. All sub-modules in the keyboard symbol generator module 2006 send the symbolic data back to the do_key sub-module 2202 in the symbol generation module 2004, after converting the composite data to symbolic format.

Referring again to FIG. 23, the composite data from a keyboard 2108 is first sent from the do_key sub-module 2202 to a MK_symkey sub-module 2302. The MK_symkey sub-module 2302 determines which type of special case (if any) the composite data is, then sends the composite data to the appropriate sub-module of the keyboard symbol generator module 2006. The simplest case is where the composite data represents an ASCII character. In that case, the composite data is sent to a MK_ASCII sub-module 2306. This MK_ASCII sub-module 2306 takes in the composite data and converts it into symbolic format. This symbolic format is then sent back to the do_key sub-module 2202, which then sends it to the pipe module 2010.

If the keyboard input was a non-ASCII character such as a CTRL key, or an ALT key, then the composite data would be directed to a MK_non-ASCII sub-module 612.

A MK_altraw sub-module 2308 converts composite data which is generated from pressing down the ALT key, and entering a number. This has the effect of converting the number which was input to the ASCII character which that number represents.

A MK_raw sub-module 2304 converts the non-input data which is not recognizable with regard to which key was pressed (that is, an illegal scan codes), but which is nonetheless converted into symbolic data since it may be recognizable by the DVPU/SUT 1812.

A MK_AT2 sub-module 2310 converts those scan codes which are received from an AT2 keyboard.

Except for the pipe module 2010, those modules previously described in this section relate primarily to the Record Mode 1810 of the software modules 104. The modules referred to below relate to all modes of the software modules 104.

Referring again to FIG. 20, it can be seen that the pipe module 2010 accepts input from modules relating to both the Record Mode (that is, modules 2002, 2004 and 2006) and Playback Mode (that is, module 2012 as shown by FIG. 8). More specifically, composite data from the symbol generation module 2004 (now in symbolic form) and composite data from the test script file 102 feed into the pipe module 2010. The composite data is then sent to the parser 2022. Since the composite data in the test script file 102 was processed through the symbol generation module 2004, the format of the composite data sent to the parser 2022 is the same format for both playback mode 1900 and Record Mode 1810.

Still referring to FIG. 20, the parser 2022 comprises a symbol interpreter module 2014 and a command processor module 2016. As stated above, the symbol interpreter module 2014 interprets whether composite data from the pipe module 2010 is a comment, a DVPU/Host command, or input data. If the composite data is a DVPU/Host command, then the command processor module 2016 receives the command from the symbol interpreter 2014, decides which DVPU/Host command it is, and then processes that command.

Figure 26:
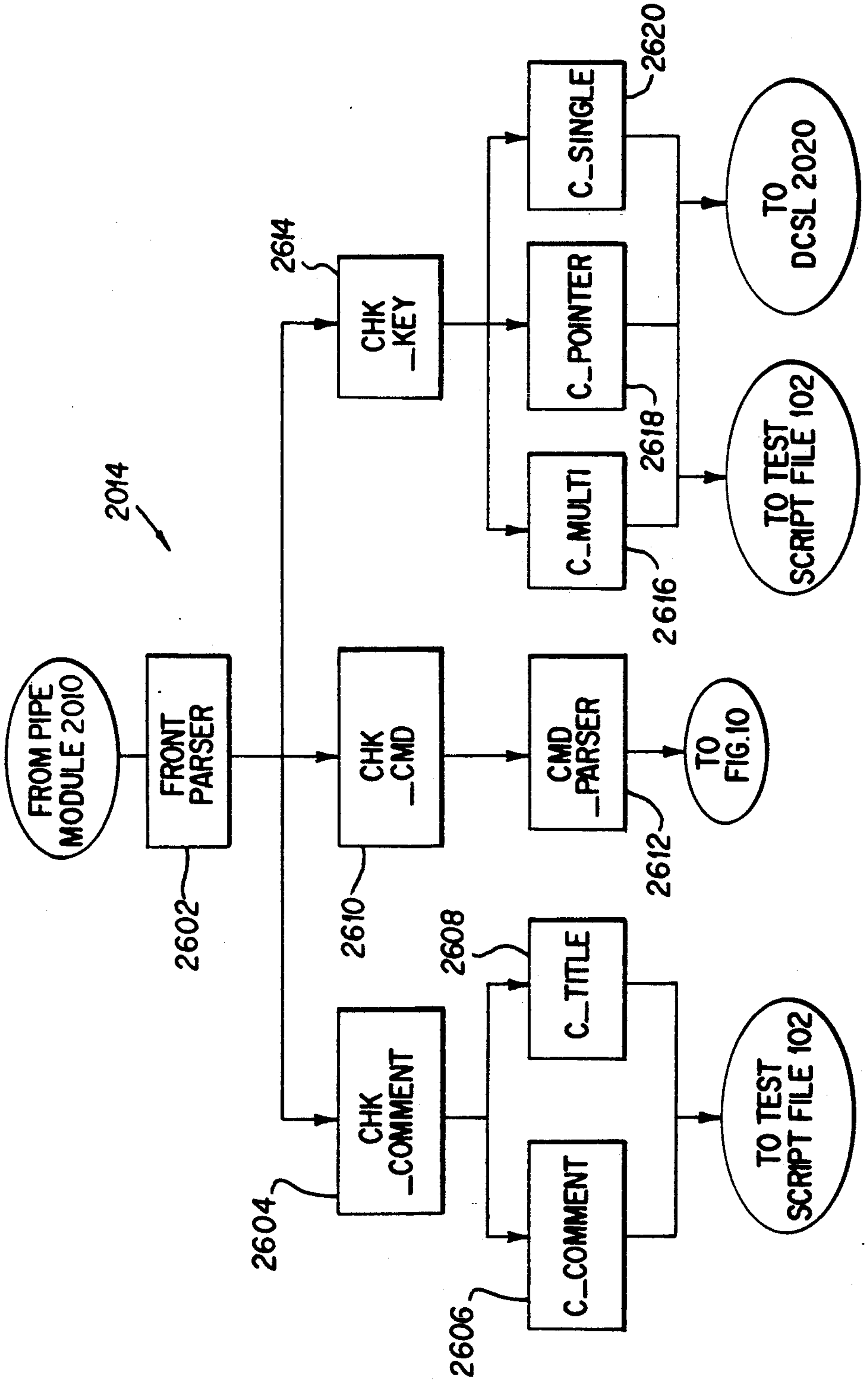
FIG. 26 is a block diagram of the symbol interpreter module 2014.

FIG. 26 shows a detailed representation of a preferred embodiment of the symbol interpreter module 2014. A front parser module 2602 receives the composite data from the pipe module 2010, and distributes this composite data to "CHK" modules (904, 2610, 2614), to determine the type of composite data received.

A CHK_comment sub-module 2604 checks to see if the composite data received is a comment. In a preferred embodiment, a comment can be either a title for a test script file 102, or it can be purely informational material. If the CHK_comment sub-module 2604 determines that the composite data received by the symbol interpreter module 2014 is in fact a comment, then a C_Title sub-module 2608 determines if the comment is a title. If it is a title, then the title is sent to the test script file 102. If the comment is informational material, then a C_comment sub-module 2606 sends the text of the comment to the test script file 102.

A CHK_cmd sub-module 2610 checks the composite data received by the symbol interpreter module 2014 to see if the composite data is a DVPU/Host command. If the CHK_cmd sub-module 2610 determines that a command has been received, it sends the command to a CMD_parser sub-module 2612, which verifies that a correct command was, in fact, received. The CMD_parser sub-module 2612 then sends the command to the appropriate sub-module in the command processor module 2016 for processing.

A CHK_key sub-module 2614 receives the composite data which is neither a DVPU/Host command nor a comment, but which is input data to be sent to the software application(s) 130 residing on the DVPU/SUT 1812. Once the CHK_key sub-module 2614 has determined that the composite data sent to the symbol interpreter module 2014 is input data, it then determines which input device 110 the data has been sent by, and directs the composite data to one of three sub-modules (2616, 2618, 2620), which translate the composite data into a format recognizable by the DVPU/SUT 1812.

As stated in the General Overview of the Host section VII(A) above, a special sequence of keystrokes can be input entered represents a specific keyboard key (for example, <CTRL C>) without conflicting with potential RAM-resident programs on the Host. If the composite data received by the symbol interpreter module 2014 is one of these special sequences, then the CHK_key sub-module 2614 directs the composite data to a C_multi sub-module 2616. The C_multi sub-module 2616 then sends the processed composite data to the DVPU/SUT 1812, as always (in a preferred embodiment), via the DCLS module 2020.

If the input was from a pointer device such as a mouse or a touch screen, then the CHK_key sub-module 2614 sends the composite data to a C_pointer sub-module 2618 for processing. The C_pointer sub-module 2618 then sends the processed composite data to the DVPU/SUT 1812.

If the composite data is neither a special sequence of characters nor from a pointer device, then the composite data is, by default, processed by a C_single sub-module 2620. This is the sub-module which processes single keystrokes. Again, the processed composite data is sent to the DVPU/SUT 1812.

Figure 27:
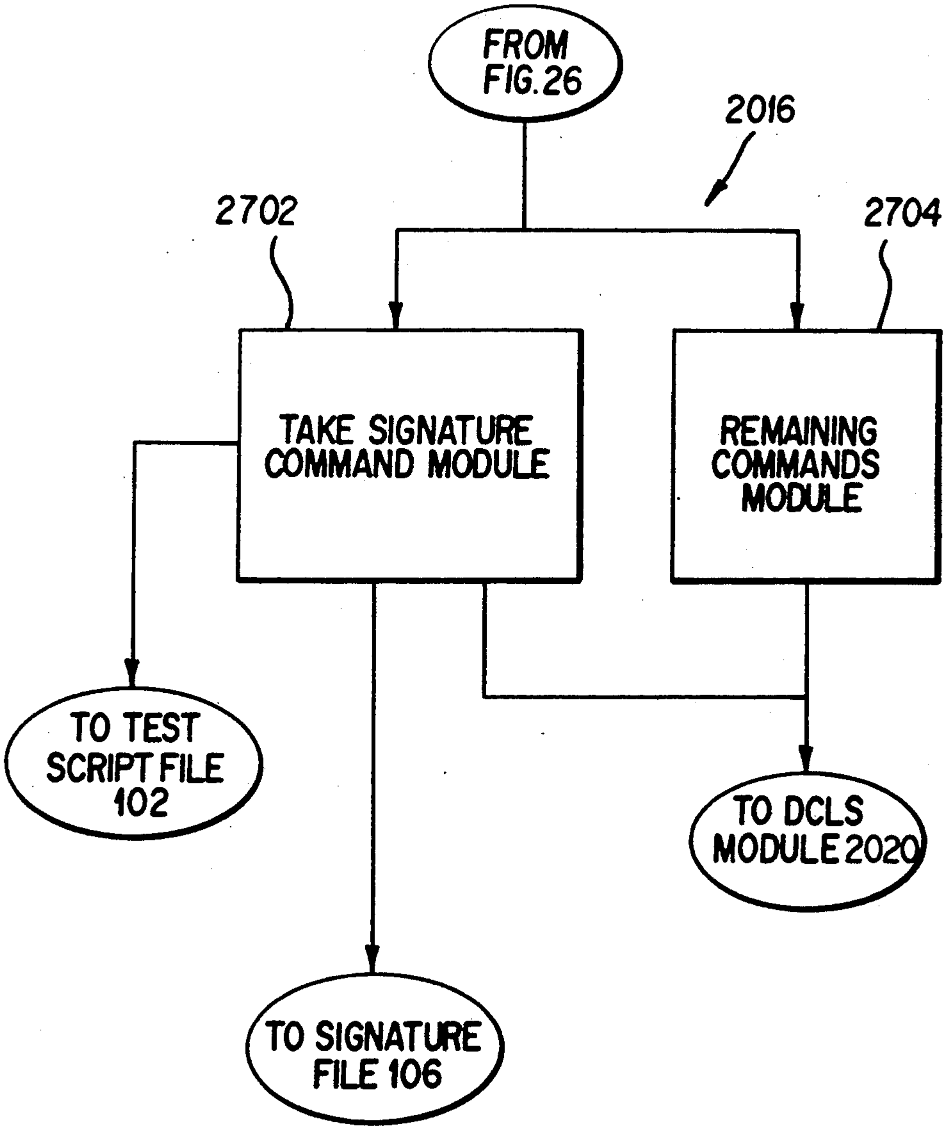
FIG. 27 is a block diagram of the command processor module 2016.
Figure 28:
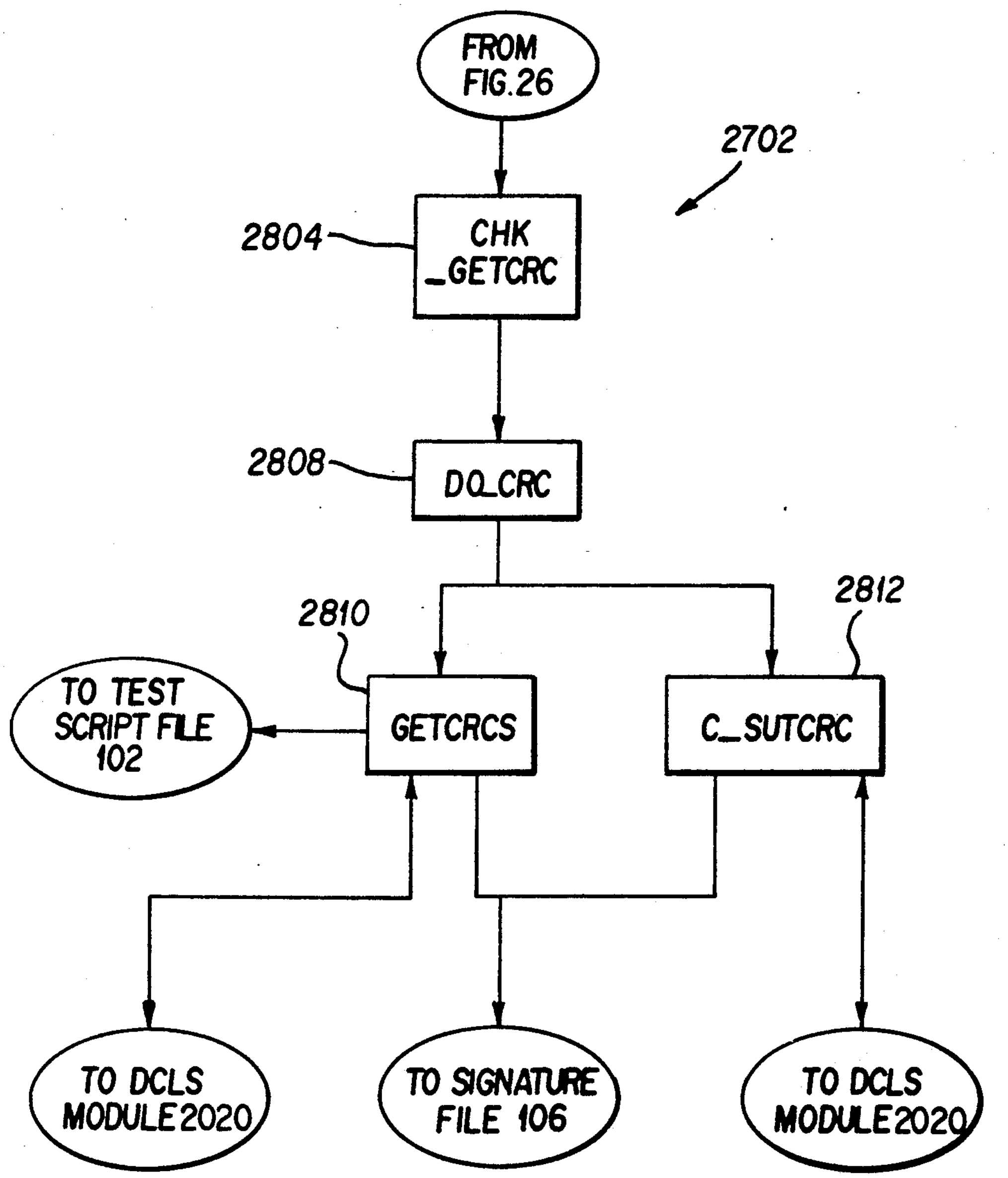
FIG. 28 is a block diagram of the take signature command module 2702.

In the case of comments and input data, the symbol interpreter module 2014 is the final processing module before the composite data is forwarded to its ultimate destination (either the DVPU/SUT 1812 or the test script file 102). DVPU/Host commands, however, are forwarded to the command processor module 2016, a preferred embodiment of which is represented by FIG. 27. Referring now to FIG. 27, the command processor module 2016 can be broken up into two other modules, a take-signature command module 2702, and a remaining commands module 2704. As the name implies, the take-signature command module 2702 processes the take-signature command, while the remaining commands module 2704 processes all DVPU/Host commands other than the take-signature command. FIG. 28 shows a more detailed representation of the take-signature command module 2702.

Referring now to FIG. 28, the sub-module which first processes the take-signature command is a CHK_getcrc sub-module 2804. This sub-module first receives the take-signature command from the CMD_parser module 2612 (see FIG. 26), and then determines whether or not a valid take-signature command has been received. If the take-signature command is valid, the CHK_getcrc sub-module 2804 then processes parameters which were entered by the user relating to the take-signature command. In a preferred embodiment, one such parameter relates to how many signatures representative of the visual display device are to be sent to the software modules 104 to create the histogram, as described in the General Overview of the Host section VII(A) above. Another such parameter used primarily during Playback Mode 1900 sets the amount of time which the software modules 104 waits for a response from the DVPU/SUT 1812, before the comparison test is deemed to have failed.

After the parameters have been processed by the CHK_getcrc sub-module 2804, the take-signature command is then processed by a DO_CRC sub-module 2808, which determines the mode of operation that the software modules 104 is presently in. As stated above, in a preferred embodiment, the three modes of the software modules 104 are Record Mode 1810, Playback Mode 1900, and Regeneration Mode 1950. If the mode is designated as either Record Mode 1810 or Regeneration Mode 1950, then the take-signature command is directed to a getcrcs sub-module 2810.

In Record Mode 1810, the getcrcs sub-module 2810 sends a take-signature command to both the DVPU/SUT 1812 (via DCLS Module 2020) and to the test script file 102. The getcrcs sub-module 2810 then receives the signature(s) from the DVPU/SUT 18121, and saves the signature(s) in the signature file 106. In addition, a take-signature command marker is also inserted into the test script file 102 during Record Mode 1810. This marker enables the software modules 104 to detect which of the take-signature commands caused an error with regard to the comparison of the signature(s) during Playback Mode 1900.

During Playback Mode 1900, a C_SUTCRC sub-module 2812 also sends the take-signature command to the DVPU/SUT 1812. However, in Playback Mode 1900, signature(s) from the signature file 106 are sent to the DVPU/SUT 1812, and comparison results rather than signature(s) are returned.

In a preferred embodiment, the getcrcs sub-module 2810 is also used to compute the histograms of each of the signature results, in order to determine the frequencies of various states of the visual display device. As described above, only the most frequently occurring signature(s) are stored in the signature file 106. Thus, where a visual display device is displaying a blinking cursor, only the signatures representative of when the cursor is on, and when the cursor is off, are stored in the signature file 106.

If the mode is designated as Regeneration Mode 1950, then the take-signature command is directed to the getcrcs sub-module 2810. This sub-module 2810 receives the new signature(s) from the DVPU/SUT 1812 which were produced as a result of the test script from the test script file 102 being sent to the DVPU/SUT 1812. This new signature(s) is then stored in a new file or in the original signature file 106.

In addition to the take-signature command, a preferred embodiment of the present invention contemplates other DVPU/Host commands which can be entered by a user. While some of these commands are listed below, it should be understood that this is not a complete list of such commands, and that other commands having other functions can also be used with the software modules 104. As stated above, the module used in the processing of these commands is the remaining commands module 2704, which is shown in greater detail in FIG. 29.

Figure 29:
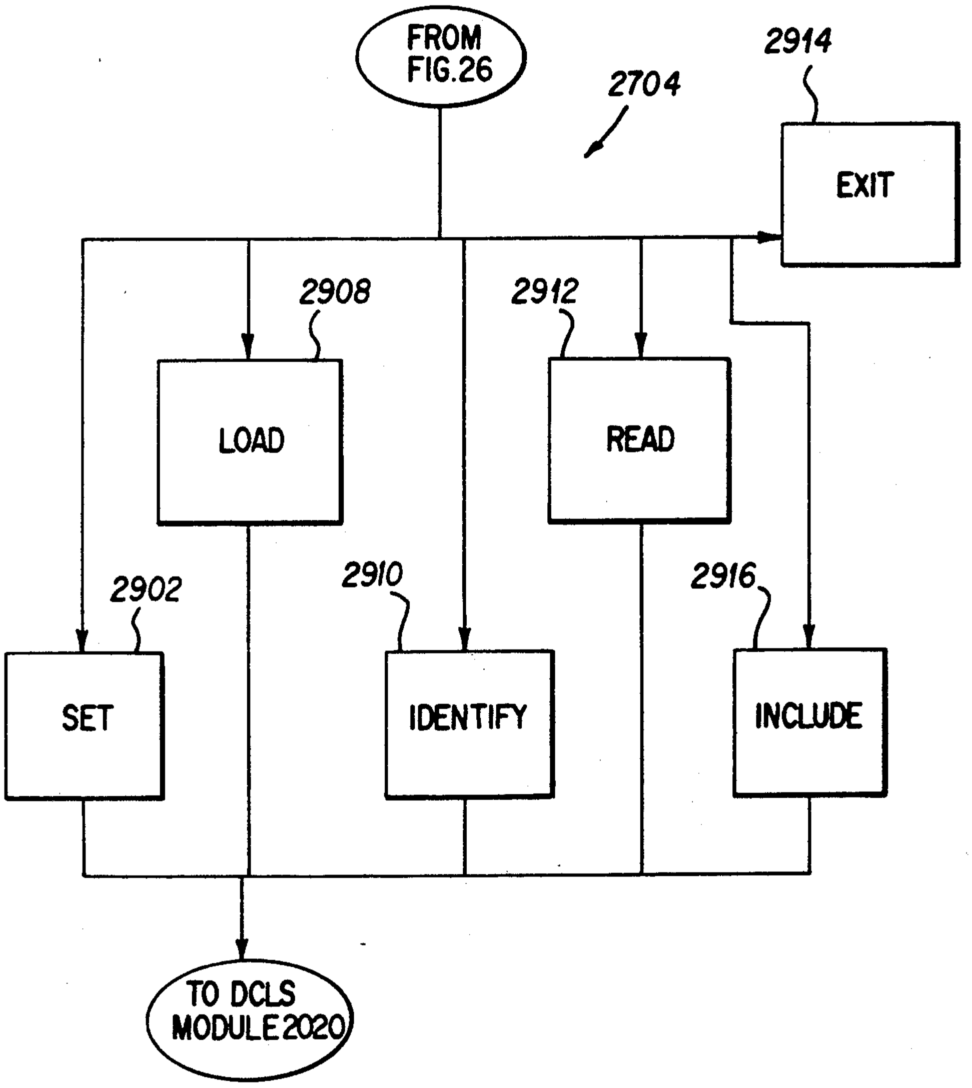
FIG. 29 is a block diagram of the remaining commands module 2704.

Referring now to FIG. 29, one of the DVPU/Host commands contemplated by the software modules 104 is a set command and associated set command module 2902, which allows for the setting of specific options relating to the DVPU/SUT 1812. For example, in a preferred embodiment, when composite data representative of a keystroke is sent to the DVPU/SUT 1812, the duration for which the keystroke was pressed can vary. The set command processed by the set sub-module 2902 allows the apparent length of the duration of the key press to be adjustable. Similar types of delays can also be adjusted for pointer devices. As stated in the General Overview of the Host section VII(A) above, the set command also allows a user to restrict the capture of the representative signature to only certain planes of the visual display device.

An include command and associated include sub-module 2916 allows a user to determine which scan lines are captured on the visual display device. After the command is processed, the output is sent to the DVPU/SUT 1812 (via DCLS Module 2020).

A load command and associated load sub-module 2908 allows for the processing of specific routines which a user can load from the software modules 104, directly into RAM memory in the DVPU/SUT 1812. This allows a sophisticated user to write custom routines, which are not otherwise within the DVPU/SUT 1812.

An identify command and associated identify sub-module 2910 displays to a user the current settings as implemented by the set command.

Figure 24:
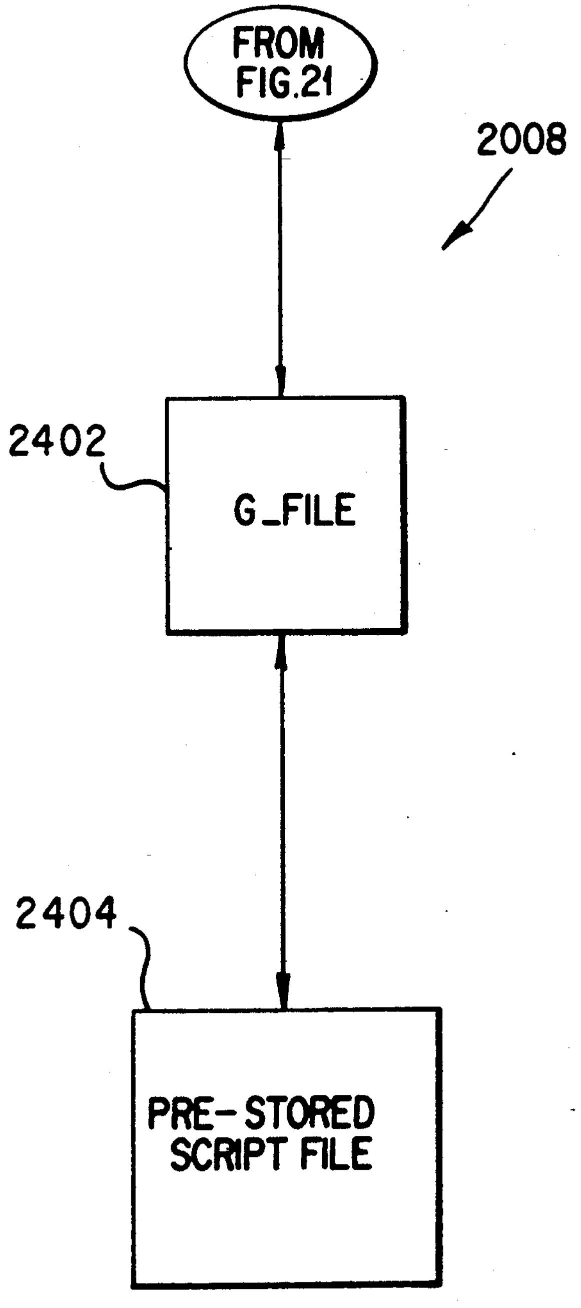
FIG. 24 is a block diagram of the initialization module 2008.
Figure 25:
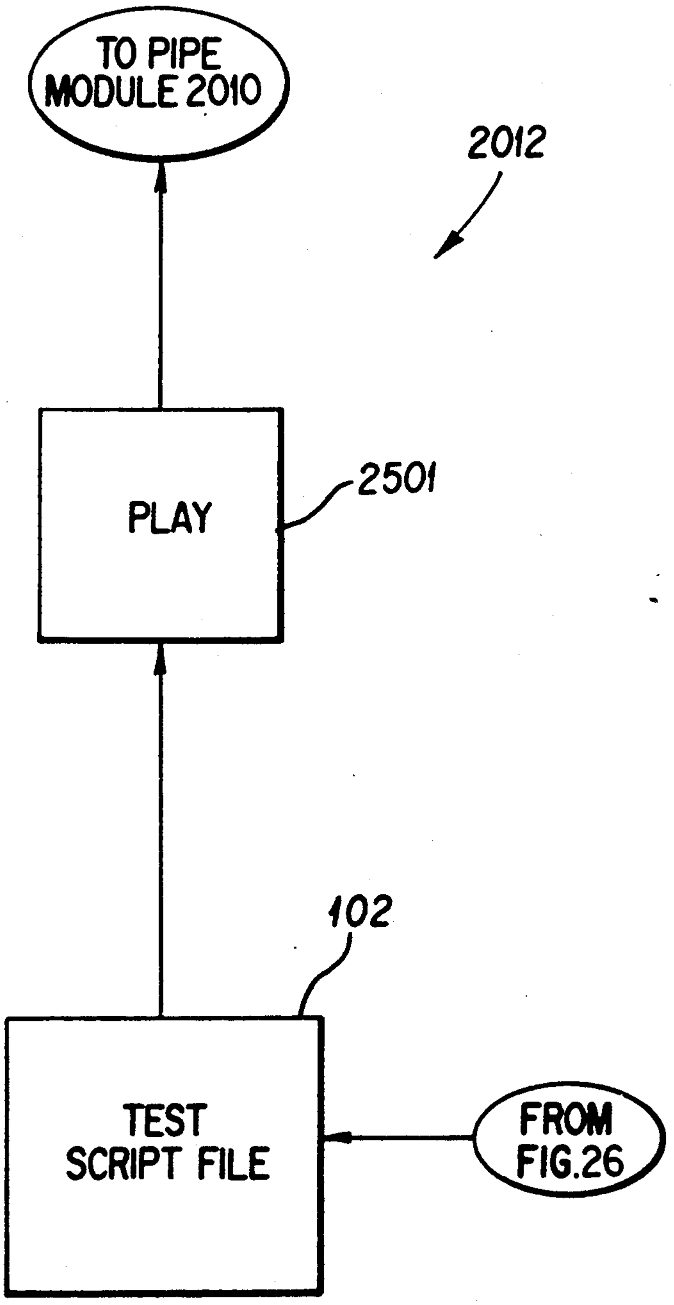
FIG. 25 is a block diagram of the playback module 2012.

The read command and associated read sub-module 2912 causes the pre-stored composite data in the initialization module 2008 to be read into the DVPU/SUT 1812, as described in the Architectural Overview section VII(B) above. In a preferred embodiment, the pre-stored composite data in the initialization module 2008 is copied into the test script file 102 when a user inputs the read command. Thus, the initialization module acts as a kind of macro. Referring to FIG. 24, a G_file sub-module 2402 reads the contents of a pre-stored script file 2404 and sends it to the DVPU/SUT 1812, and to the test script file 102. It should be understood, however, that a pointer to the pre-stored composite data, rather than the pre-stored data can be included into the test script file 102 upon input of the read command. In this way, the only copy of the pre-stored composite data is in the initialization module, where it acts as a kind of subroutine.

The exit command 2914 merely exits from the software modules 104, and returns control to the operating system upon which the software modules 104 operates.

It should be understood that present invention is not limited to its preferred embodiments, and that the examples presented above are merely for the purposes of illustration. The scope of the present invention should therefore be interpreted by the following claims as defined by the forgoing figures and text.

What is claimed is:

1. A system for testing a system under test (SUT) having at least one of computer hardware and software applications residing thereon, the SUT having a software application responsive to stored input data and a visual display device responsive to the software application for generating visual display signals, the testing system comprising:

(a) a host with a memory having the stored input data and having stored signatures of visual display signals; and, (b) an interface device, connected to said host and to the SUT, comprising:

(1) means for sending the stored input data from said host to the SUT, (2) means for comparing new signatures of visual display signals from the visual display device with said stored signatures of visual display signals from said host in a non-intrusive manner, and (3) means for indicating whether the SUT is functioning properly.

2. The system of claim 1, wherein said host comprises means for sending the stored input data and said stored signature of visual display signals to said interface device during a playback mode.

3. The system of claim 1, wherein said host further comprises a software module, and wherein said software module causes said host to retrieve said stored signature of visual display signals from said memory during a playback mode.

4. The system of claim 1, wherein said host further comprises a software module, and wherein said software module causes said host to retrieve the stored input data from said memory during a playback mode.

5. The system of claim 1, wherein said memory comprises means for storing DVPU/Host commands.

6. The system of claim 5, wherein said host further comprises a software module, and wherein said software module causes said host to retrieve said stored DVPU/Host commands from said memory during a playback mode.

7. The system of claim 1, wherein said interface device further comprises a micro-controller sub-system under firmware and hardware control.

8. The system of claim 7, wherein said firmware of said micro-controller sub-system comprises a routine for performing a comparison between said stored visual display signals and said new visual display signals.

9. The system of claim 7, wherein said interface device further comprises a video signature analyzer subsystem.

10. The system of claim 9, wherein said firmware of said micro-controller sub-system comprises a routine for instructing said video signature analyzer sub-system to capture in a non-intrusive manner the visual display signals from the visual display device.

11. A system for testing a system under test (SUT) having at least one of computer hardware and software applications residing thereon, the SUT having a software application responsive to input data and a visual display device responsive to the software application for generating visual display signals, the testing system comprising:

(a) a host for receiving first input data from an input device, said host comprising, (1) first means for storing said first input data as stored input data, (2) second means for sending said first input data to an interface device during a record mode, (3) third means for sending a take-signature command to said interface device during said record mode, and (4) fourth means for storing captured signatures of visual display signals as stored signatures of visual display signals; and (b) said interface device, being connected to said host and to the SUT for sending said first input data to the software application of the SUT for capturing signatures of the visual display signals from the visual display device, said interface device comprising, (1) fifth means for capturing in a non-intrusive manner signatures of the visual display signals of the visual display device in response to said take-signature command, and (2) sixth means, responsive to said fifth means, for sending captured signatures of visual display signals to said fourth means for storage as said stored signatures of visual display signals.

12. The system of claim 11, wherein said host comprises a microcomputer.

13. The system of claim 11, wherein said host has a software module controlling said first means, second means, third means, and/or fourth means during said record mode.

14. The system of claim 11, wherein said interface device further comprises a micro-controller sub-system under firmware and hardware control for controlling said fifth means and/or sixth means during said record mode.

15. A system for testing a system under test (SUT) having at least one of computer hardware and software applications residing thereon, the SUT having a software application responsive to stored input data and a visual display device responsive to the software application, the testing system comprising:

(a) a host with a memory having the stored input data and having first stored signatures of visual display signals; and (b) an interface device, connected to said host and to the SUT, comprising:

(1) means for sending the stored input data from said host to said SUT, (2) means for capturing in a non-intrusive manner second signatures of visual display signals from the visual display device, and (3) means for sending said second signatures of visual display signals to said memory on said host for storage.

16. A system for testing a system under test (SUT) having at least one of computer hardware and software applications residing thereon, the SUT having a software application responsive to stored input data and a visual display device responsive to the software application for generating visual display signals, the testing system comprising:

(a) a host for receiving the first input data from an input device, said host comprising:

(1) first means for storing said first input data as stored input data, (2) second means for sending said first input data to an interface device during a playback mode, (3) third means for sending the first input data to said interface device during a record mode, (4) fourth means for sending a take-signature command to said interface device during said record mode, and (5) fifth means for storing captured signatures of visual display signals as stored signatures of visual display signals during said record mode; and, (b) said interface device, being connected to said host and to the SUT, which sends during said record mode the first input data to the software application of the SUT, which sends during said playback mode the stored input data, and which captures during said playback mode and said record mode signatures of the visual display signals from the visual display device, said interface device comprising, (1) sixth means for capturing in a non-intrusive manner signatures of the visual display signals of the visual display device in response to said take-signature command during said record mode, (2) seventh means for capturing in a non-intrusive manner signatures of the visual display signals of the visual display device during said playback mode, (3) eighth means, responsive to said sixth means, for sending said captured signatures of visual display signals to said fifth means for storage as the stored signatures of visual display signals, and (4) ninth means, responsive to said seventh means and to said second means, for comparing said stored signatures of the visual display signals with captured signatures of the visual display signals, so as to provide an indication as to whether the SUT is functioning properly.

17. The system of claim 16, wherein said host has a software module controlling said first means, third means, fourth means and/or fifth means during said record mode.

18. The system of claim 16, wherein said interface device further comprises means for generating a compact representation of the visual display signals.

19. The system of claim 16, wherein said interface device further comprises means for emulating said input device.

20. The system of claim 16, wherein said interface device further comprises a UART connected to said ninth means and to said host, whereby the results of the comparison are provided to said host.

21. The system of claim 16, wherein the visual display device is a video graphics array.

22. A method for testing a system under test (SUT) having at least one of computer hardware and software applications residing thereon, the SUT having a software application responsive to input data and a visual display device responsive to the software application for generating visual display signals, the testing method being operable in a record mode and a playback mode, said method comprising the steps of:

(a) in the record mode, (1) receiving the input data from an input device, (2) storing the input data from step (1) to thereby form stored input data;

(3) sending the input data from step (1) to the software application on the SUT;

(4) generating visual display signals in response to the input data from step (3); and (5) capturing in a non-intrusive manner signatures of the visual display signals from step (4);

(6) storing said signatures of the visual display signals from step (5); and (b) in the playback mode, (7) sending the stored input data from step (2) to the software application on the SUT;

(8) generating new signatures of the visual display signals in response to the stored input data from step (6);

(9) capturing in a non-intrusive manner said new signatures of the visual display signals from step (7); and

(10) comparing said signatures of the visual display signals from step (5) and said new signature of the visual display signals from step (8) so as to indicate whether or not the SUT is functioning properly.

23. The testing method of claim 22, further comprising a step after said step (4) of storing the visual display signals in a memory on a host.

24. The testing method of claim 22, wherein said step (5) comprises a step of generating a compact representation of the visual display signals.

25. The testing method of claim 22, wherein said step (3) comprises a step of emulating said input device.

26. The testing method of claim 22, wherein said step (6) comprises a step of emulating said input device.

27. A method for testing a system under test (SUT) having at least one of computer hardware and software applications residing thereon, the SUT having a software application responsive to input data and a visual display device responsive to the software application for generating visual display signals, the testing method being operable in a record mode, said method comprising the steps of:

(1) receiving the input from an input device;

(2) storing the input data form step (1) to thereby form stored input data;

(3) sending the input data from step (1) to the software application on the SUT;

(4) generating visual display signals in response to the input data from step (3);

(5) capturing signatures of the visual display signals from step (4) in a non-intrusive manner; and, (6) storing said signatures of the visual display signals from step (5).

28. The testing method of claim 27, wherein said step (5) comprises a step of generating a compact representation of the visual display signals.

29. The testing method of claim 28, wherein said step (3) comprises a step of using a linear feedback shift register for capturing said new signatures of visual display signals.

30. The testing method of claim 27, wherein said step (2) comprises a step of storing the input data on a host, and said step (6) comprises a step of storing said signatures of visual display signals on said host.

31. The testing method of claim 27, wherein said step (5) comprises a step of using a micro-controller sub-system under firmware and hardware control.

32. A method for testing a system under test (SUT) having at least one of computer hardware and software applications residing thereon, the SUT having a software application responsive to input data and a visual display device responsive to the software application for generating visual display signals, the testing method being operable in a regeneration mode, said method comprising the steps of:

(1) sending the stored input data to the software application on the SUT, (2) generating new signatures of visual display signals in response to the stored input data of step (1);

(3) capturing said new signatures of visual display signals of step (2) in a non-intrusive manner; and (4) storing said new signatures of visual display signals.

33. A method for testing a system under test (SUT) having at least one of computer hardware and software applications residing thereon, the SUT having a software application responsive to input data and a visual display device responsive to the software application for generating visual display signals, the testing method being operable in a regeneration mode, said method comprising the steps of:

(1) sending the stored input data to the software application on the SUT, (2) generating new signatures of visual display signals in response to the stored input data of step (1);

(3) capturing said new signatures of visual display signals from step (2);

(4) retrieving stored signatures of visual display signals; and (5) comparing the stored signatures of the visual display signals and said new signatures of the visual display signals, so as to indicate whether or not the SUT is functioning properly.

34. The testing method of claim 33, wherein said step (4) further comprises a step of replacing previously stored signatures of visual display signals with said new signatures of visual display signals.

35. A system for testing a system under test (SUT) having at least one of computer hardware and software applications residing thereon, the SUT having a software application responsive to input data and a visual display device responsive to the software application to generate visual display signals, the testing system comprising:

(a) a host for receiving first input data from an input device, said host comprising, (1) first means for storing said first input data as stored input data, (2) second means for sending said first input data to an interface device during a record mode, (3) third means for sending a take-signature command to said interface device during said record mode, (4) fourth means for storing captured signatures of visual display signals as stored signatures of visual display signals, and (5) software module means for causing said fourth means to store only said captured signatures of the visual display signals having a selected prevalence; and (b) said interface device, being connected to said host and to the SUT for sending said first input data to the software application of the SUT, and comprising:

(1) fifth means for capturing in a non-intrusive manner signatures of the visual display signals of the visual display device in response to said take-signature command, and (2) sixth means, responsive to said fifth means, for sending captured signatures of visual display signals to said fourth means for storage as said stored signatures of visual display signals.

36. The system of claim 35, wherein said software module means comprises histogram means for determining said selected prevalence.

37. A system for testing a system under test (SUT) having at least one of computer hardware and software applications residing thereon, the SUT having a software application responsive to input data and a visual display device responsive to the software application to generate visual display signals, the testing system comprising:

(a) a host for receiving first input data from an input device, said host comprising, (1) first means for storing said first input data as stored input data, (2) second means for sending said first input data to an interface device during a record mode, (3) third means for sending a take-signature command to said interface device during said record mode, and (4) fourth means for storing captured signatures of visual display signals as a stored visual signature of the display signals; and (b) said interface device, being connected to said host and to the SUT for sending said first input data to the software application of the SUT, and comprising:

(1) fifth means for capturing in a non-intrusive manner a selected portion representative of a plane of the visual display signals of the visual display device in response to said take-signature command, and (2) sixth means, responsive to said fifth means, for sending captured signature of the visual display signals to said fourth means for storage as a stored signature of visual display signals.

38. A system for testing a system under test (SUT) having at least one of computer hardware and software applications residing thereon, the SUT having a software application responsive to input data and a visual display device responsive to the software application to generate visual display signals, the testing system comprising:

(a) a host for receiving first input data from an input device, said host comprising, (1) first means for storing said first input data as stored input data, (2) second means for sending said first input data to an interface device during a record mode, (3) third means for sending a take-signature command to said interface device during said record mode, and (4) fourth means for storing captured signatures of visual display signals as a stored visual signature of the display signals; and (b) said interface device, being connected to said host and to the SUT for sending said first input data to the software application of the SUT, and comprising:

(1) fifth means for capturing in a non-intrusive manner signatures of the visual display signals of the visual display device in response to said take-signature command, said fifth means comprising:

(i) a linear feedback shift register which captures said signatures of the visual display signals and (ii) a hardware state machine for controlling said linear feedback shift register, and (2) sixth means, responsive to said fifth means, for sending a captured signature of the visual display signals to said fourth means for storage as said stored signature of visual display signals.

39. The system of claim 38, wherein said hardware state machine is controlled by vertical synchronizing and horizontal synchronizing signals.

40. A system for testing a system under test (SUT) having at least one of computer hardware and software applications residing thereon, the SUT having a software application responsive to stored input data and a visual display device responsive to the software application and which generates visual display signals, the testing system comprising:

(a) a host for receiving first input data from an input device, said host comprising, (1) first means for storing said first input data as stored input data, (2) second means for sending said first input data to an interface device during a playback mode;

(3) third means for sending the first input data to said interface device during a record mode, (4) fourth means for sending a take-signature command to said interface device during said record mode, and (5) fifth means for storing captured signatures of the visual display signals as stored signatures of visual display signals during said record mode, and (6) software module means for causing said fifth means to store only said captured signatures of the visual display signals having a selected prevalence; and (b) said interface device, being connected to said host and to the system under test, which sends during said record mode the first input data to the software application of the system under test, which sends during said playback mode the stored input data, and which captures during said playback mode and said record mode the visual display signals from the visual display device, said interface device comprising, (1) sixth means for capturing in a non-intrusive manner signatures of the visual display signals of the visual display device in response to said take-signature command during said record mode, (2) seventh means for capturing in a non-intrusive manner signatures of the visual display signals of the visual display device during said playback mode, (3) eighth means, responsive to said sixth means, for sending said captured signatures of the visual display signals to said fifth means for storage as the stored signatures of visual display signals, and (4) ninth means, responsive to said seventh means and to said fifth means, for comparing the stored signatures of the visual display signals with captured signatures of the visual display signals, so as to provide an indication as to whether the system under test is functioning properly.

41. The system of claim 40, wherein said software module comprises histogram means for determining said selected prevalence.

42. A system for testing a system under test (SUT) having at least one of computer hardware and software applications residing thereon, the SUT having a software application responsive to stored input data and a visual display device responsive to the software application and which generates visual display signals, the testing system comprising:

(a) a host for receiving the first input data from an input device, said host comprising, (1) first means for storing the first input data as the stored input data, (2) second means for sending the stored input data to an interface device during a playback mode;

(3) third means for sending the first input data to said interface device during a record mode, (4) fourth means for sending a take-signature command to said interface device during said record mode, and (5) fifth means for storing captured signatures of the visual display signals as stored signatures of the visual display signals during said record mode; and, (b) said interface device, connected to said host and to the system under test, which sends during said record mode the first input data to the software application of the system under test, which sends during said playback mode the stored input data, and which captures during said playback mode and said record mode the visual display signals from the visual display device, said interface device comprising, (1) sixth means for capturing in a non-intrusive manner signatures of the visual display signals of the visual display device in response to said take-signature command during said record mode, (2) seventh means for capturing in a non-intrusive manner signatures of the visual display signals of the visual display device during said playback mode, (3) eighth means, responsive to said sixth means, for sending said captured signatures of the visual display signals to said fifth means for storage as stored signatures of the visual display signals, (4) ninth means, responsive to said seventh means and to said fifth means, for comparing said stored signatures of the visual display signals with captured signatures of the visual display signals, so as to provide an indication as to whether the system under test is functioning properly, and (5) tenth means for capturing a selected portion of signatures of the visual display signals representative of a plane.

43. A method for testing a system under the test (SUT) having at least one of computer hardware and software applications residing thereon, the SUT having a software application responsive to input data stored input data and visual display device responsive to the software application and which generates visual display signals, the testing method being operable in a record mode and a playback mode, said method comprising the steps of:

in the record mode, (1) receiving the input data from an input device, (2) storing the input data from step (1) to thereby form stored input data, (3) sending the input data from step (1) to the software application on the SUT, (4) generating visual display signals in response to the input data from step (3), (5) capturing in a non-intrusive manner signatures of the visual display signals from step (4); and (6) storing in a memory on a host signatures of the visual display signals having a selected prevalence, and in the playback mode, (7) sending the stored input data from step (2) to the software application on the SUT, (8) generating new signatures of the visual display signals in response to the stored input data from step (7), (9) capturing in a non-intrusive manner said new signatures of the visual display signals from step (7), and

(10) comparing said signatures of the visual display signals from step (6) and said new signature of the visual display signals from step (9) so as to indicate whether or not the SUT is functioning properly.

44. The testing method of claim 43, further comprising a step of using a histogram for determining said selected prevalence.

45. A method for testing a system under the test (SUT) having at least one of computer hardware and software applications residing thereon, the SUT having a software application responsive to input data stored input data and visual display device responsive to the software application and which generates visual display signals, the testing method being operable in a record mode and a playback mode, said method comprising the steps of:

in the record mode, (1) receiving the input data from an input device;

(2) storing the input data from step (1) to thereby form stored input data, (3) sending the input data from step (1) to the software application on the system under test;

(4) generating visual display signals in response to the input data from step (3); and (5) capturing in a non-intrusive manner a selected portion of the visual display signals from step (4) representative of a plane of the new visual display signal;

in the playback mode, (6) sending the stored input data from step (2) to the software application on the system under test;

(7) generating new visual display signals in response to the stored input data from step (6);

(8) capturing in a non-intrusive manner said new visual display signals from step (7); and (9) comparing the visual display signals from step (5) and said new visual display signals from step (8) so as to indicate whether or not the system under test is functioning properly.

46. A method for testing a system under the test (SUT) having at least one of computer hardware and software applications residing thereon, the SUT having a software application responsive to input data stored input data and visual display device responsive to the software application and which generates visual display signals, the testing method being operable in a record mode and a playback mode, said method comprising the steps of:

in the record mode, (1) receiving the input data from an input device;

(2) storing the input data from step (1) to thereby form stored input data;

(3) sending the input data from step (1) to the software application on the system under test;

(4) generating visual display signals in response to the input data from step (3); and (5) capturing in a non-intrusive manner signatures of the visual display signals from step (4);

in the playback mode, (6) sending the stored input data from step 2) to the software application on the system under test;

(7) generating new signatures of the visual display signals in response to the stored input data from step (6);

(8) capturing in a non-intrusive manner a selected portion of said new signatures of the visual display signals from step (7) representative of a plane of the new signatures of the visual display signals; and, (9) comparing signatures of the visual display signals from step (5) and said new signatures of the visual display signals from step (8) so as to indicate whether or not the SUT is functioning properly.

* * * * *